(12) United States Patent
Fukuhara

(10) Patent No.: US 8,879,840 B2
(45) Date of Patent: Nov. 4, 2014

(54) IMAGE PROCESSOR, IMAGE PROCESSING METHOD, AND PROGRAM FOR SHIFT-CHANGING DEPTH DATA OF AN IMAGE

(75) Inventor: Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 13/582,569

(22) PCT Filed: Mar. 14, 2011

(86) PCT No.: PCT/JP2011/055923
§ 371 (c)(1),
(2), (4) Date: Sep. 4, 2012

(87) PCT Pub. No.: WO2011/118435
PCT Pub. Date: Sep. 29, 2011

(65) Prior Publication Data
US 2012/0328192 A1   Dec. 27, 2012

(30) Foreign Application Priority Data

Mar. 26, 2010  (JP) ................................ 2010-072503

(51) Int. Cl.
| | |
|---|---|
| G06K 9/36 | (2006.01) |
| H04N 13/00 | (2006.01) |
| H04N 19/61 | (2014.01) |
| H04N 19/146 | (2014.01) |
| H04N 19/64 | (2014.01) |
| H04N 19/46 | (2014.01) |
| H04N 19/124 | (2014.01) |
| H04N 19/115 | (2014.01) |
| H04N 19/597 | (2014.01) |
| H04N 19/176 | (2014.01) |

(52) U.S. Cl.
CPC ..... *H04N 19/00842* (2013.01); *H04N 13/0059* (2013.01); *H04N 19/00781* (2013.01); *H04N 19/00169* (2013.01); *H04N 19/00545* (2013.01); *H04N 13/0011* (2013.01); *H04N 19/0009* (2013.01); *H04N 19/0006* (2013.01); *H04N 19/00769* (2013.01); *H04N 2213/003* (2013.01); *H04N 13/0048* (2013.01); *H04N 19/00278* (2013.01)
USPC ....................................................... 382/166

(58) Field of Classification Search
None
See application file for complete search history.

(56) References Cited

U.S. PATENT DOCUMENTS 5,729,669 A * 3/1998 Appleton ....................... 345/422
6,055,330 A   4/2000 Eleftheriadis et al.
(Continued)

FOREIGN PATENT DOCUMENTS

JP  2002 152776        5/2002
JP  2002-152776 A      5/2002
(Continued)

OTHER PUBLICATIONS

International Search Report Issued May 17, 2011 in PCT/JP11/55923 Filed Mar. 14, 2011.
(Continued)

*Primary Examiner* — Bhavesh Mehta
*Assistant Examiner* — Feng Niu
(74) *Attorney, Agent, or Firm* — Oblon, Spivak, McClelland, Maier & Neustadt, L.L.P.

(57) ABSTRACT

An image processing apparatus includes circuitry configured to encode image data and depth data according to a predetermined encoding system and configured to perform both rate control of a code generation amount from encoding the image data and rate control of a code generation amount from encoding the depth data. The circuitry is also configured to shift-change the depth data based on a difference between the bit depth of the depth data and the bit depth of the image data.

19 Claims, 38 Drawing Sheets

(56) References Cited

U.S. PATENT DOCUMENTS

| | | | |
|---|---|---|---|
| 6,348,919 B1* | 2/2002 | Murphy | 345/421 |
| 8,199,165 B2* | 6/2012 | Samadani et al. | 345/625 |
| 8,488,868 B2* | 7/2013 | Tam et al. | 382/154 |
| 2006/0050383 A1 | 3/2006 | Takemoto et al. | |
| 2007/0064124 A1* | 3/2007 | Kirani et al. | 348/234 |
| 2008/0181305 A1* | 7/2008 | Cho et al. | 375/240.12 |
| 2008/0198920 A1 | 8/2008 | Yang et al. | |
| 2008/0247670 A1* | 10/2008 | Tam et al. | 382/298 |
| 2009/0087111 A1* | 4/2009 | Noda et al. | 382/238 |
| 2010/0195716 A1* | 8/2010 | Klein Gunnewiek et al. | 375/240.08 |
| 2011/0085028 A1* | 4/2011 | Samadani et al. | 348/51 |

FOREIGN PATENT DOCUMENTS

| | | |
|---|---|---|
| JP | 2004-274642 A | 9/2004 |
| JP | 2006-140618 A | 6/2006 |
| JP | 2007-28439 A | 2/2007 |
| JP | 2007-166277 A | 6/2007 |
| JP | 2008 193530 | 8/2008 |
| JP | 2008-193530 A | 8/2008 |
| JP | 2008-544681 A | 12/2008 |
| WO | 2004 071102 | 8/2004 |

OTHER PUBLICATIONS

Extended European Search Report issued Dec. 3, 2013 in Patent Application No. 11759241.0.

Yannick Morvan et al., "Joint Depth/Texture Bit-allocation for Multi-view Video Compression", 26. Picture Coding Symposium, XP-030080430, Nov. 7, 2007, 4 pages.

PoLin Lai et al., "Improving View Rendering Quality and Coding Efficiency by Suppressing Compression Artifacts in Depth-Image Coding", Visual Communications and Image Processing, XP-030081732, Jan. 20, 2009, 10 pages.

Japanese Office Action issued Feb. 13, 2014 in Patent Application No. 2010-072503.

Combined Office Action and Search Report issued May 6, 2014 in Chinese Patent Application No. 201180014823.4 (with English translation).

* cited by examiner

US 8,879,840 B2

IMAGE PROCESSOR, IMAGE PROCESSING METHOD, AND PROGRAM FOR SHIFT-CHANGING DEPTH DATA OF AN IMAGE

TECHNICAL FIELD

The invention relates to an image processing apparatus, method, and program, and more particularly to an image processing apparatus, method, and program which can improve encoding efficiency.

BACKGROUND ART

Recently, a stereoscopically visible image which can respond to so-called 3D (three dimensions) (hereinafter, referred to as 3D image) is becoming widespread. Movies that use stereoscopically visible 3D images are actively produced for example. The 3D images make a big difference from conventional so-called 2D (two dimensions) images which can give only a planar view. Therefore, it is a very useful to use such a 3D image in filmmaking.

Moreover, video contents (for example, a movie and the like) that use the 3D images are compressed with high efficiency in accordance with the MVC (Multi-view Video Coding) standard that is the extended format of MPEG-4 AVC like video contents of 2D images, and then recorded, for example, in a Blu-Ray Disc or the like or distributed over a network. Moreover, development of household appliances that can respond to reproduction of the 3D images has been started. That is, an environment in which the 3D images can be enjoyed even within households has been being built.

The most widespread stereoscopic vision at this moment is a stereo image which uses binocular parallax of human eyes. This system has a mechanism in which the user feels the parallax while separately seeing video contents for left eye and video contents for right eye, thereby stereoscopically perceiving an object within an image.

However, regarding the stereoscopic vision using binocular parallax, an amount of parallax is generally set beforehand to realize a stereoscopic vision from any directions. In order to realize the stereoscopic vision from any directions, data information (Depth_Map) in a depth direction of each object within an image needs to be extracted from image data.

The research that automatically extracts rough depth information by using a technique which processes or analyzes image data is actively conducted (for example, Non-patent documents 1 and 2). The stereoscopic image viewed not only from two eyes but also from a plurality of free viewpoints becomes able to be generated by using such a technology, or a technology which extracts depth information of an object within images taken by a plurality of cameras, which is considered to be relatively easy.

CITATION LIST

Non-Patent Documents

Non-Patent Document 1: "Fast Approximate Energy Minimization via Graph Cuts" IEEE Transactions on Pattern Analysis and Machine Intelligence, vol. 23, No. 11, November 2001,
Non-Patent Document 2: "Stereo Matching Using Belief Propagation" IEEE Transactions on Pattern Analysis and Machine Intelligence, vol. 25, No. 7, July 2003

SUMMARY OF THE INVENTION

Problems to be Solved by the Invention

However, while an original data amount generated from two-eye stereoscopic images is limited, there is a concern that a total of multi-eye (three or more) image data and depth data thereof becomes a huge amount of data. When the data amount increases, load and time for processes such as transmission, recording, or reproduction are also likely to increase.

The invention is provided to solve such a problem, and it is intended to encode image data and depth data which can give a stereoscopic vision more efficiently.

Solutions to Problems

An aspect of the present invention is an image processing apparatus including: an encoding unit that encodes image data and depth data according to a predetermined encoding system, the depth data indicating positions in a depth direction over an entire area within an image of the image data and allowing an image having parallaxes and being stereoscopically visible to be generated from the image of the image data; and a rate control unit that performs both a rate control of a code generation amount in encoding the image data by the encoding unit and a rate control of a code generation amount in encoding the depth data by the encoding unit, by using both an encoding result of the image data by the encoding unit and an encoding result of the depth data by the encoding unit.

The image processing apparatus may further include: a detection unit that detects a bit depth of the image data; and a shift changing unit that shift-changes the depth data by an amount corresponding to a difference between the bit depth of the image data detected by the detection unit and a bit depth of the depth data.

The shift changing unit may shift up the depth data by an amount of the difference and perform zero-filling which fills coefficients of value "0" in lower position bits than the depth data which is shifted up.

The shift changing unit may delete data corresponding to an amount of the difference, from a lowest bit of the depth data, and shift down upper bits of the depth data which are not deleted, by the amount of the difference.

The image processing apparatus may further include: a multiplexing unit that multiplexes coded data of the image data, and shift change information that indicates a shift amount of the shift changing performed by the shift changing unit.

The encoding unit may include: an orthogonal transformation unit which performs orthogonal transformation on the image data and the depth data for each macro block with a predetermined size; and an entropy encoding unit that performs entropy encoding on coefficient data obtained through the orthogonal transformation on the image data and the depth data by the orthogonal transformation unit.

The encoding unit may include: a wavelet transformation unit that performs wavelet transformation on the image data and the depth data; a division unit that divides coefficient data, obtained through the wavelet transformation on the image data and the depth data by the wavelet transformation unit, in units of a code block with a predetermined size; a development unit that develops the coefficient data of each code block, obtained through the division by the division unit, in bit-planes; and an entropy encoding unit that performs entropy encoding on the bit-planes of the coefficient data of the image data and the depth data, the bit-planes being developed by the development unit and rearranged in the order of importance.

The encoding unit may further include: a shift changing unit that shift-changes the depth data by an amount corresponding to a difference between a bit depth of coefficient data of the image data and a bit depth of coefficient data of the depth data obtained through the wavelet transformation performed by the wavelet transformation unit.

The image processing apparatus may further include: a multiplexing unit that multiplexes coded data of the image data, and shift change information that indicates a shift amount of the shift changing performed by the shift changing unit.

The image data may be component image data including brightness Y, color difference Cb, and color difference Cr, and the depth data may be bitmap data of grey scale.

An aspect of the present invention is an information processing method for an image processing apparatus, the method including: by an encoding unit of the image processing apparatus, encoding image data and depth data according to a predetermined encoding system, the depth data indicating positions in a depth direction over an entire area within an image of the image data and allowing an image having parallaxes and being stereoscopically visible to be generated from the image of the image data; and by a rate control unit of the image processing apparatus, performing a rate control of a code generation amount in encoding the image data and a rate control of a code generation amount in encoding the depth data, by using both an encoding result of the image data and an encoding result of the depth data.

An aspect of the present invention is a program causing a computer to function as: an encoding unit that encodes image data and depth data according to a predetermined encoding system, the depth data indicating positions in a depth direction over an entire area within an image of the image data and allowing an image having parallaxes and being stereoscopically visible to be generated from the image of the image data; and a rate control unit that performs both a rate control of a code generation amount in encoding the image data by the encoding unit and a rate control of a code generation amount in encoding the depth data by the encoding unit by using both an encoding result of the image data by the encoding unit and an encoding result of the depth data by the encoding unit.

An aspect of the present invention is an image processing apparatus including: a separation unit that separates shift change information from multiplex data obtained by multiplexing: coded data obtained by encoding image data; coded data which is obtained by shift changing depth data by a predetermined shift amount and encoding the shift-changed depth data, the depth data indicating positions in a depth direction over the entire area within an image of the image data and allowing an image having parallaxes and being stereoscopically visible to be generated from the image of the image data; and shift change information which indicates the shift amount; a decoding unit that decodes the coded data according to a predetermined decoding system; and a shift changing unit that shift-changes depth data which has been shift-changed after being decoded by the decoding unit, in a direction opposite to a direction of the shift-changing, by the shift amount indicated by the shift change information separated by the separation unit.

The shift changing unit may delete data corresponding to the shift amount from a lowest bit of the depth data, and shift down upper bits of the depth data which are not deleted by the shift amount.

The shift changing unit may shift up the depth data by the shift amount, and perform zero-filling which inserts coefficients of value "0" as lower position bits than the depth data which has been shifted up.

The decoding unit may include: an entropy decoding unit that performs on entropy decoding on coded data obtained by encoding image data, and coded data which is obtained by shift changing depth data and encoding the shift-changed depth data; and an inverse orthogonal transformation unit that performs inverse orthogonal transformation on coefficient data obtained by the orthogonal transformation of the image data and on coefficient data obtained by orthogonal transformation of the depth data, the coefficient data being obtained by entropy decoding by the entropy decoding unit.

The decoding unit may include: an entropy decoding unit that performs entropy decoding on coded data obtained by encoding image data, and coded data obtained by shift-changing depth data and encoding the shift-changed depth data; a bit-plane synthesis unit that synthesizes the bit-planes of coefficient data, the coefficient data being obtained through the entropy decoding performed by the entropy decoding unit and being developed in the bit-planes; a code block synthesis unit that synthesizes the coefficient data for each code block with a predetermined size, which is obtained by synthesizing by the bit-plane synthesis unit; and a wavelet inverse transformation unit that performs wavelet inverse transformation on the coefficient data for each sub-band obtained through the synthesis by the code block synthesizing unit and obtains the image data and the depth data.

Another aspect of the present invention is an information processing method for an image processing apparatus, the method including: by a separation unit of the image processing apparatus, separating shift change information from multiplex data obtained by multiplexing: coded data obtained by encoding image data; coded data which is obtained by shift-changing the depth data by a predetermined shift amount and encoding the shift-changed depth data, the depth data indicating positions in a depth direction over an entire area within an image of the image data and allowing an image having parallaxes and being stereoscopically visible to be generated from the image of the image data; and the shift change information that indicates the shift amount; by a decoding unit of the image processing apparatus, decoding the coded data according to a predetermined decoding system; and by a shift changing unit of the image processing apparatus, shift-changing depth data which has been shift-changed after being decoded, in a direction opposite to a direction of the shift-changing, by the shift amount indicated by the shift change information separated from the coded data.

Another aspect of the present invention is a program causing a computer to function as: a separation unit that separates shift change information from multiplex data obtained by multiplexing: coded data obtained by encoding image data; coded data which is obtained by shift-changing depth data by a predetermined shift amount and encoding the shift-changed depth data, the depth data indicating positions in a depth direction over an entire area within an image of the image data and allowing an image having parallaxes and being stereoscopically visible to be generated from the image of the image data; and the shift change information that indicates the shift amount; a decoding unit that decodes the coded data according to a predetermined decoding system; and a shift changing unit that shift-changes shift-changed depth data obtained through decoding by the decoding unit in a direction opposite to a direction of the shift-changing, by the shift amount indicated by the shift change information separated by the separation unit.

According to one aspect of the invention, image data and depth data are encoded according to a predetermined encoding system, the depth data indicating positions in a depth direction over the entire area within an image of the image data and allowing an image having parallaxes and being stereoscopically visible to be generated from the image of the image data. In the aspect, a rate control is performed to control both a rate of a code generation amount in encoding the image data and a rate of a code generation amount in encoding the depth data by using both an encoding result of the image data and an encoding result of the depth data.

According to another aspect, from multiplex data obtained by multiplexing: coded data obtained by encoding image data; coded data which is obtained by shift changing depth data by a predetermined shift amount and encoding the shift-changed depth data, the depth data indicating positions in a depth direction over the entire area within an image of the image data and allowing an image having parallaxes and being stereoscopically visible to be generated from the image of the image data; and shift change information which indicates the shift amount, the shift change information is separated, the coded data is decoded according to a predetermined decoding system, the depth data, which is shift-changed after decoding, is shift-changed in a reverse direction to a direction of the shift-changing, by the shift amount indicated by the shift change information separated from the coded data.

Effects of the Invention

According to the invention, data transmission can be performed. In particular, data can be transmitted to suppress error propagation to the following data while suppressing an increase in an unnecessary delay.

MODE FOR CARRYING OUT THE INVENTION

Hereafter, modes (hereafter, referred to as embodiments) to implement the invention are described in the following order.

1. First embodiment (image encoding apparatus and image decoding apparatus)
2. Second embodiment (image encoding apparatus and image decoding apparatus)
3. Third embodiment (image encoding apparatus and image decoding apparatus)
4. Fourth embodiment (personal computer)

<1. First Embodiment>

[Configuration of Image Encoding Apparatus]

Figure 1:
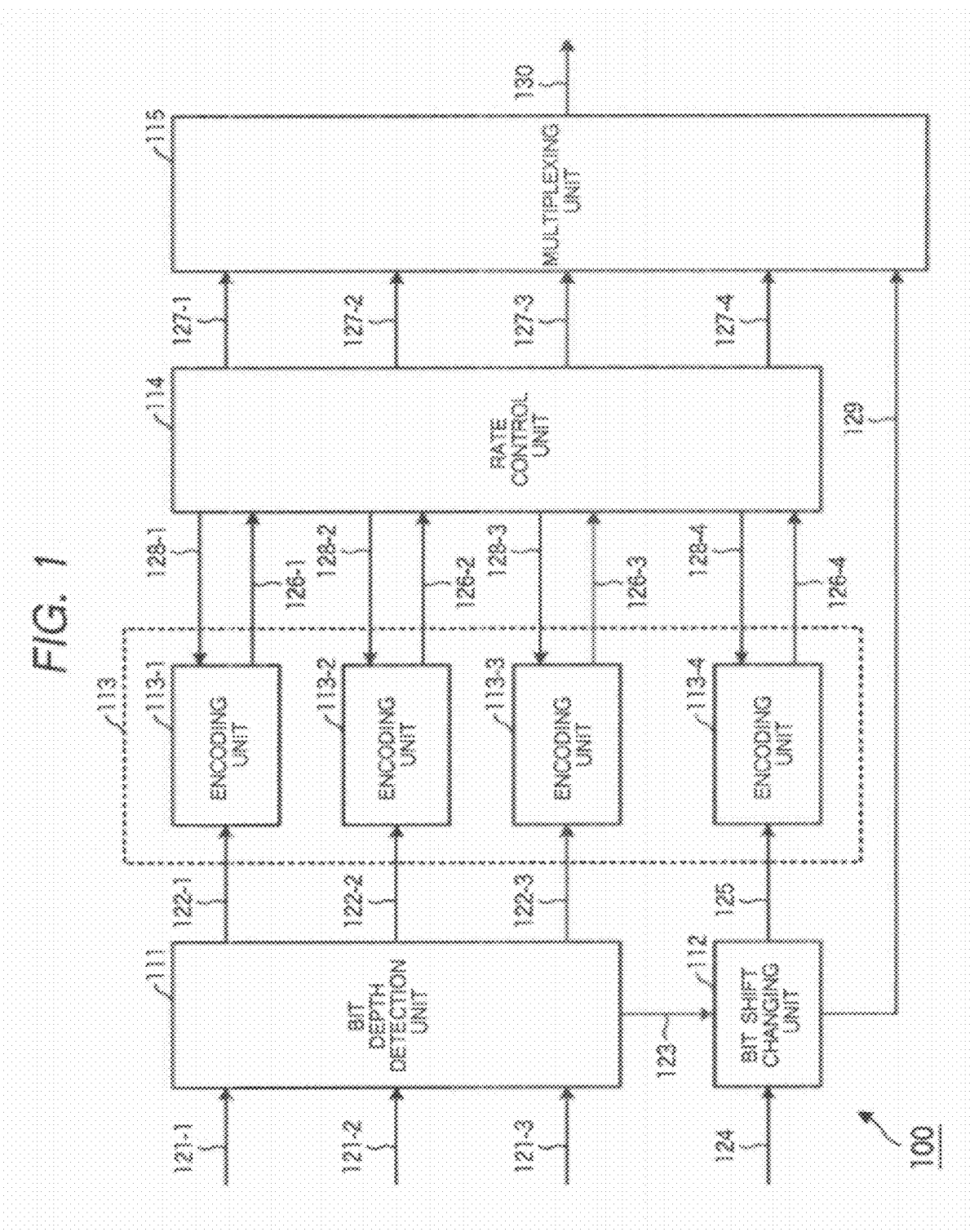
FIG. 1 is a block diagram illustrating an example of the main configuration of an image encoding apparatus to which the invention is applied.

FIG. 1 is a block diagram illustrating an example of the main configuration of an image encoding apparatus to which the invention is applied.

An image encoding apparatus 100 shown in FIG. 1 is an apparatus to encode image data of a planar image, and depth data which indicates positions, in the direction of depth of the planar image (back and forth direction of the planar image), of entire pixels of the planar image according to a predetermined encoding system.

The planar image can be converted into an image (hereafter, referred to as a 3D image) responding to so-called 3D (Dimension (three dimensions)) having parallaxes by using depth data. Since positions in the depth direction of all the parts in the planar image are indicated in the depth data, a 3D image generating apparatus, which generates a 3D image from a planar image, can easily generate a 3D image which can be viewed stereoscopically from any directions as long as it is viewed within a range in which the planar image is viewed.

As illustrated in FIG. 1, the image encoding apparatus 100 includes a bit depth detection unit 111, a bit shift changing unit 112, encoding units 113-1 to 113-4, a rate control unit 114, and a multiplexing unit 115.

Image data is supplied to the image encoding apparatus 100 as component image data including three components, that is, brightness data Y (arrow 121-1), color difference data Cb (arrow 121-2), and color difference data Cr (arrow 121-3).

The bit depth detection unit 111 detects a bit depth of each of the brightness data Y, the color difference data Cb, and the color difference data Cr. The bit depth of each arbitrary data unit can be detected. The bit depth detection unit 111 supplies the brightness data Y, the color difference data Cb, and the color difference data Cr, which have been subjected to detection, to the encoding units 113-1 to 113-3. Moreover, the bit depth detection unit 111 supplies the detection results to the bit shift changing unit 112 (arrow 123).

In addition, depth data D is supplied to the image encoding apparatus 100 (arrow 124). The bit shift changing unit 112 shift-changes bits of the depth data D so that the bit depth of the depth data D matches the bit depth of the component image data.

For example, when the bit depth of the component image data detected by the bit depth detection unit 111 is M bits, and when the bit depth of the depth data D is N bits (M>N), the bit shift changing unit 112 shifts up the depth data D by (M−N) bits. At this point, the bit shift changing unit 112 inserts, for example, bits of value "0" in lower (M−N) bits of the depth data D.

In addition, in the description below, the shift changing may include shift changing of zero bits, that is, an operation of shifting no bits as well as shift up in a direction of increasing bits and shift down in a direction of deleting bits. When the shift changing is performed, the bit shift changing unit 112 supplies the shift-changed depth data D', to the encoding unit 113-4 (arrow 125).

The encoding unit 113-1 encodes the brightness data Y according to a predetermined method, and supplies the generated coded data to the rate control unit 114 (arrow 126-1). Similarly, the encoding unit 113-2 encodes the color difference data Cb according to a predetermined method, and supplies the generated coded data to the rate control unit 114 (arrow 126-2). Similarly, the encoding unit 113-3 encodes the color difference data Cr according to a predetermined method, and supplies the generated coded data to the rate control unit 114 (arrow 126-3). Moreover, the encoding unit 113-4 encodes the depth data D' according to a predetermined method, and supplies the generated coded data to the rate control unit 114 (arrow 126-4).

The method of the encoding process performed by the encoding units 113-1 to 113-4 is arbitrary.

The rate control unit 114 performs a rate control for each encoding process based on each of data amounts of the coded data of the brightness data Y, the coded data of the color difference data Cb, the coded data of the color difference data Cr, and the coded data of the depth data D'.

The rate control unit 114 supplies rate control information for controlling the rate of the coded data of the brightness data Y to the encoding unit 113-1 (arrow 128-1). Similarly, the rate control unit 114 supplies rate control information for controlling the rate of the coded data of the color difference data Cb to the encoding unit 113-2 (arrow 128-2). Similarly, the rate control unit 114 supplies rate control information for controlling the rate of the coded data of the color difference data Cr to the encoding unit 113-3 (arrow 128-3). In addition, the rate control unit 114 supplies rate control information for controlling the rate of the coded data of the depth data D' to the encoding unit 113-4 (arrow 128-4).

Each of the encoding units 113-1 to 113-4 performs the rate control for the encoding process, referring to the rate control information supplied from the rate control unit 114.

Moreover, the rate control unit 114 supplies the coded data of the brightness data Y which has been used for the rate control, to the multiplexing unit 115 (arrow 127-1). Similarly, the rate control unit 114 supplies the coded data of the color difference data Cb which has been used for the rate control, to the multiplexing unit 115 (arrow 127-2). Moreover, the rate control unit 114 supplies the coded data of the color difference data Cr which has been used for the rate control to the multiplexing unit 115 (arrow 127-3). In addition, the rate control unit 114 supplies the coded data of the depth data D' which has been used for the rate control, to the multiplexing unit 115 (arrow 127-4).

Moreover, the bit shift changing unit 112 supplies bit shift change information that indicates a shift amount of the depth data to the multiplexing unit 115 (arrow 129).

The multiplexing unit 115 multiplexes each coded data supplied from the rate control unit 114 and the bit shift change information supplied from the bit shift changing unit 112, and outputs the resultant to the outside of the image encoding apparatus 100 as one code stream (multiplex data) (arrow 130). In addition, the multiplexing method may be arbitrary as long as it allows each data to be correctly separated by an image decoding apparatus to be described below.

The multiplex data output from the image encoding apparatus 100 is recorded in a recording medium, and, for example, transmitted over a network.

In addition, in the above, although the description has been made in connection with a case where the brightness data Y is encoded by the encoding unit 113-1, the color difference data Cb is encoded by the encoding unit 113-2, the color difference data Cr is encoded by the encoding unit 113-3, and the depth data D' is encoded by the encoding unit 113-4, case is not limited thereto, but the encoding units 113-1 to 113-4 may be configured as one encoding unit 113. In other words, the brightness data Y, the color difference data Cb, the color difference data Cr, and the depth data D' may be encoded by one encoding unit 113. In this case, the encoding unit 113 may encode each data time-divisionally, or may encode each data collectively.

[Configuration of 3D Image]

Figure 2:
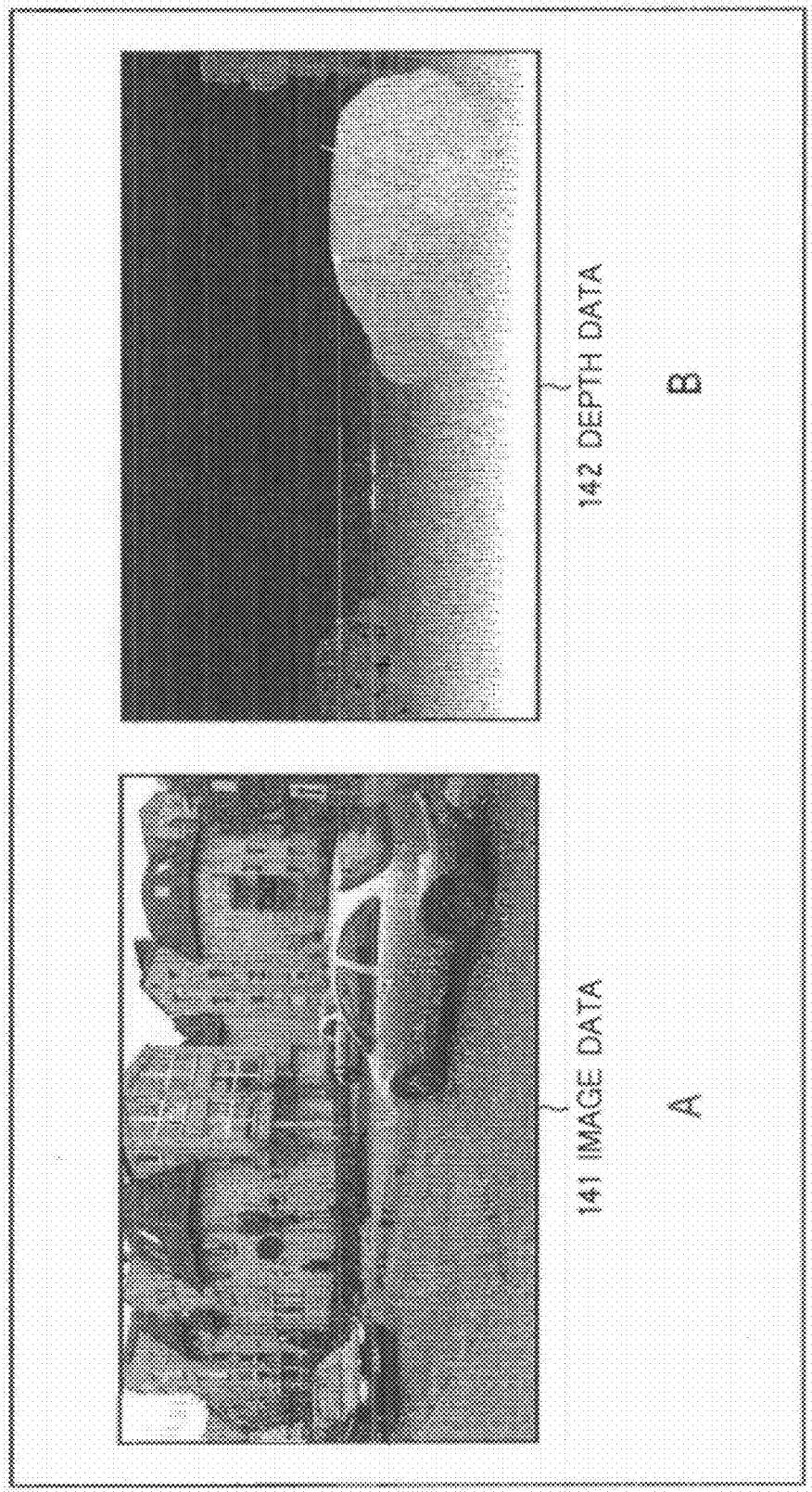
FIG. 2 is a block diagram illustrating an example of the configuration of a 3D image.

FIG. 2 is a block diagram illustrating an example of the configuration of a 3D image.

Image data 141 illustrated in FIG. 2A is component image data, for example, including YCbCr, and is supplied to the image encoding apparatus 100 as three systems as described above.

Depth data 142 illustrated in FIG. 2B is depth data of the image data 141. As illustrated in FIG. 2B, the depth data 142 is information which indicates positions in the depth direction over the entire area of the image data 141 in the form of a predetermined number of bits for each predetermined range, for example, for each pixel, or for each block. Therefore, the depth data 142 can be generally indicated as bitmap data of grey scale. The number of gradations of the bitmap data becomes the bit depth of depth data 142.

The depth data 142 is assumed to be essentially attached to the image data 141 which is input to the image encoding apparatus 100.

[Example of Shift Up]

Figure 3:
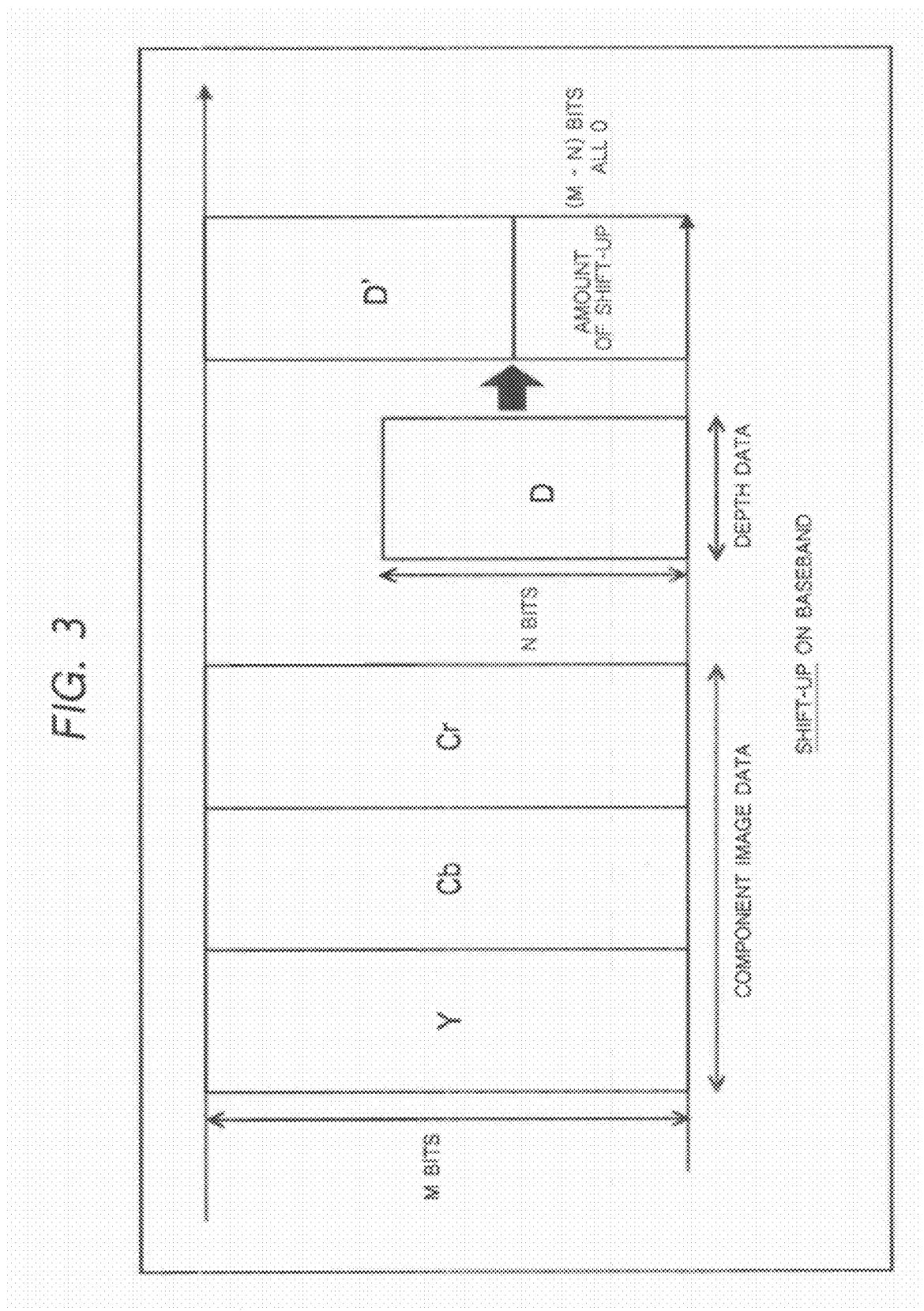
FIG. 3 is a diagram describing an example of a shift-up operation.

FIG. 3 is a diagram describing an example of the shift up operation as an example of a process performed by the bit shift changing unit 112.

As illustrated in FIG. 3, the bit depths of the brightness data Y, the color difference data Cb, and the color difference data Cr are each M bits, and the bit depth of the depth data D is N bits. Moreover, it is assumed that M>N. Since the bit shift changing unit 112 aligns the most significant bit position of each data (bit depth) by shift changing the depth data D. That is, the bit shift changing unit 112 shifts up the entire depth data D by (M−N) bits (depth data D'). At this point, the bit shift changing unit 112 inserts a bit string of (M−N) bits which all have value "0" as lower bits of the depth data D' at bit positions lower than the depth data D (zero filling). That is, in the configuration of the depth data D', all of the lower (M−N) bits have value "0", and upper N bits are configured by the depth data D. The depth data D' is data with a bit depth of M bits.

In addition, for M=N, the bit shift changing unit 112 outputs the depth data D without performing shift changing. That is, in this case, it becomes depth data D'=depth data D.

Moreover, for M<N, the bit shift changing unit 112 shifts down the depth data D. That is, in this case, the bit depth of the depth data D becomes shallow. The bit shift changing unit 112 deletes the (N−M) bits at the lower positions of the depth data D for example, and shifts down the remaining M bits at the upper positions.

Of course, the bit shift changing unit 112 may shift up the image data. However, a visual influence of the change in the depth data is smaller than that of the change in the image data. Moreover, there are many cases where the depth data is low in accuracy. In addition, when the image data is shifted up, the following case may be considered: an image may not be processed at the latter stage of the process, or the load is increased at the latter stage even if the image process is possible. Therefore, for M<N, the bit shift changing unit 112 shifts down the depth data D which is less important than the image data.

Actually, for this reason, both the bit depth and the resolution of the depth data D are generally lower than those of the image data.

[Configuration of Image Decoding Apparatus]

Figure 4:
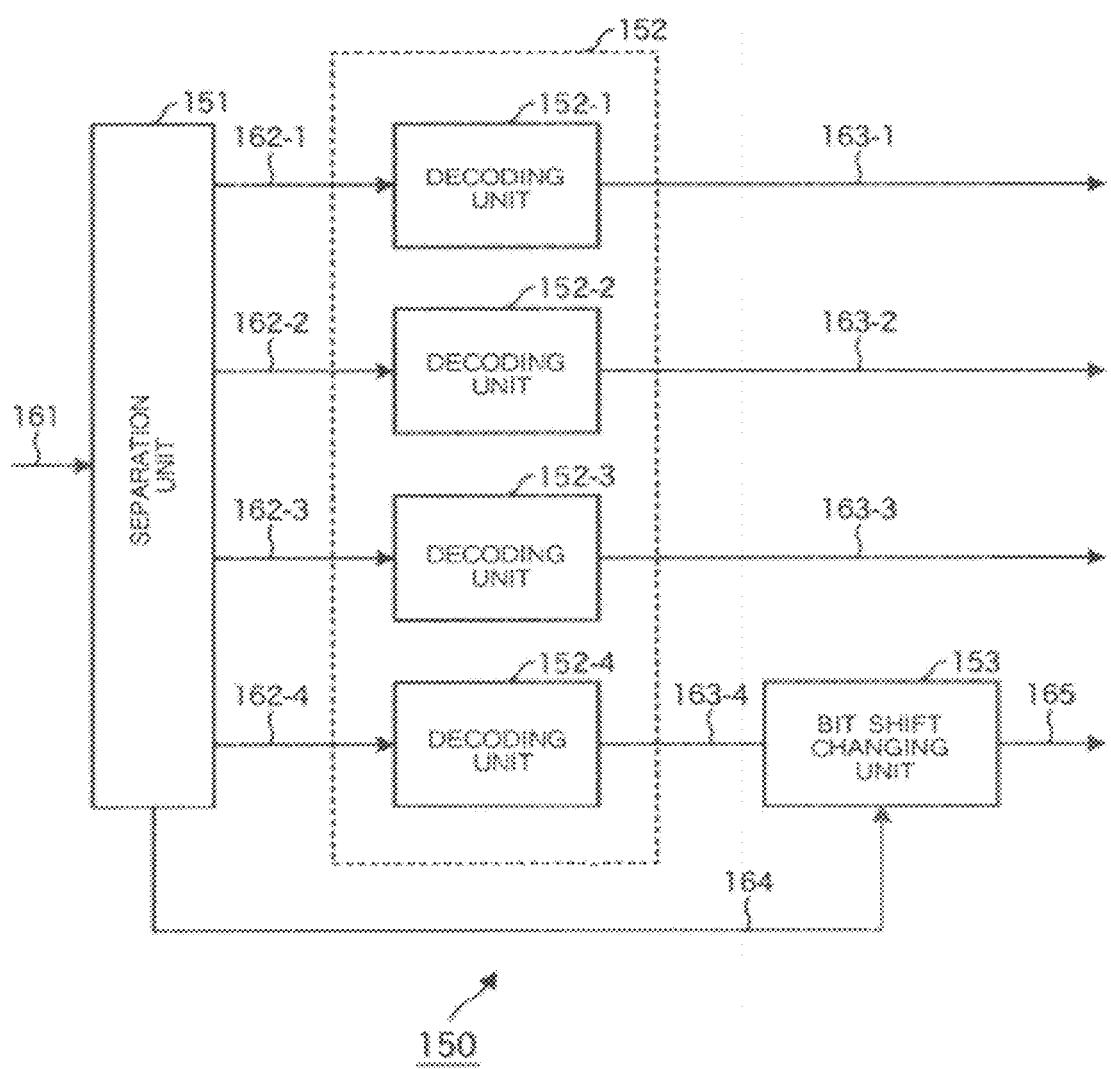
FIG. 4 is a block diagram illustrating an example of the main configuration of an image decoding apparatus to which the invention is applied.

FIG. 4 is a block diagram illustrating an example of the main configuration of an image decoding apparatus to which the invention is applied.

An image decoding apparatus 150 shown in FIG. 4 is an apparatus that decodes the coded data encoded by the image encoding apparatus 100 shown in FIG. 1 by a predetermined decoding system corresponding to the encoding system adopted in the image encoding apparatus 100.

The image decoding apparatus 150 acquires the multiplex data (code stream) output from the image encoding apparatus 100 illustrated in FIG. 1 (arrow 161). The transmission path of the multiplex data may be arbitrary and may be transmitted from the image encoding apparatus 100 to the image decoding apparatus 150, for example, via a recording medium, a network, or other devices. Moreover, for example, the image encoding apparatus 100 and the image decoding apparatus 150 are integrally formed as one apparatus, and connected to each other via an internal bus. In the configuration, the multiplex data may be transmitted from the image encoding apparatus 100 to the image decoding apparatus 150 through this internal bus. Moreover, the multiplex data may be transmitted from the image encoding apparatus 100 to the image decoding apparatus 150 through wireless communication.

As illustrated in FIG. 4, the image decoding apparatus 150 may include a separation unit 151, decoding units 152-1 to 152-4, and a bit shift changing unit 153.

The separation unit 151 separates the acquired multiplex data into the coded data of the brightness data Y, the coded data of the color difference data Cb, the coded data of the color difference data Cr, the coded data of the depth data D', and the bit shift change information.

The separation unit 151 supplies the coded data of the brightness data Y to the decoding unit 152-1 (arrow 162-1), supplies the coded data of the color difference data Cb to the decoding unit 152-2 (arrow 162-2), supplies the coded data of the color difference data Cr to the decoding unit 152-3 (arrow 162-3), and supplies the coded data of the depth data D' to the decoding unit 152-4 (arrow 162-4).

The decoding unit 152-1 decodes the coded data of the brightness data Y, and outputs obtained brightness data Y to the outside of the image decoding apparatus 150 (arrow 163-1). The decoding unit 152-2 decodes the coded data of the color difference data Cb, and outputs obtained color difference data Cb to the outside of the image decoding apparatus 150 (arrow 163-2). The decoding unit 152-3 decodes the coded data of the color difference data Cr, and outputs obtained color difference data Cr to the outside of the image decoding apparatus 150 (arrow 163-3). The decoding unit 152-4 decodes the coded data of the depth data D' and supplies obtained depth data D' to the bit shift changing unit 153 (arrow 163-4).

Moreover, the separation unit 151 supplies the bit shift change information to the bit shift changing unit 153 (arrow 164).

The bit shift changing unit 153 shifts the depth data D' supplied from the decoding unit 152-4 in the opposite direction to a direction of the shifting which has been performed in the image encoding apparatus 100 by an amount corresponding to the number of bits indicated by the bit shift change information. That is, the bit shift changing unit 153 performs a bit shift change on the depth data D' by a shift amount indicated by the bit shift change information, and generates the depth data D.

For example, when the depth data D has been shifted up by (M−N) bits in the image encoding apparatus 100, the bit shift changing unit 153 shifts down the depth data D' by (M−N) bits, and generates the depth data D.

The bit shift changing unit 153 outputs the generated depth data D to the outside of the image decoding apparatus 150 (arrow 165).

The image data and the depth data output from the image decoding apparatus 150 are supplied to other devices for example so as to be processed then. For example, it is converted into a 3D image in an image processing apparatus or the like, or edited in an image editing device or the like.

The above description is made in connection with a case where the coded data of the brightness data Y is decoded by the decoding unit 152-1, the coded data of the color difference data Cb is decoded by the decoding unit 152-2, the coded data of the color difference data Cr is decoded by the decoding unit 152-3, and the coded data of the depth data D' is decoded by the decoding unit 152-4. Without being limited thereto, a decoding unit 152 may be used in place of the decoding units

152-1 to 152-4. That is, the coded data of the brightness data Y, the coded data of the color difference data Cb, the coded data of the color difference data Cr, and the coded data of the depth data D' may be decoded by one decoding unit 152. In this case, the decoding unit 152 may decode each coded data time-divisionally or may decode each coded data collectively.

[Example of Shift Down]

Figure 5:
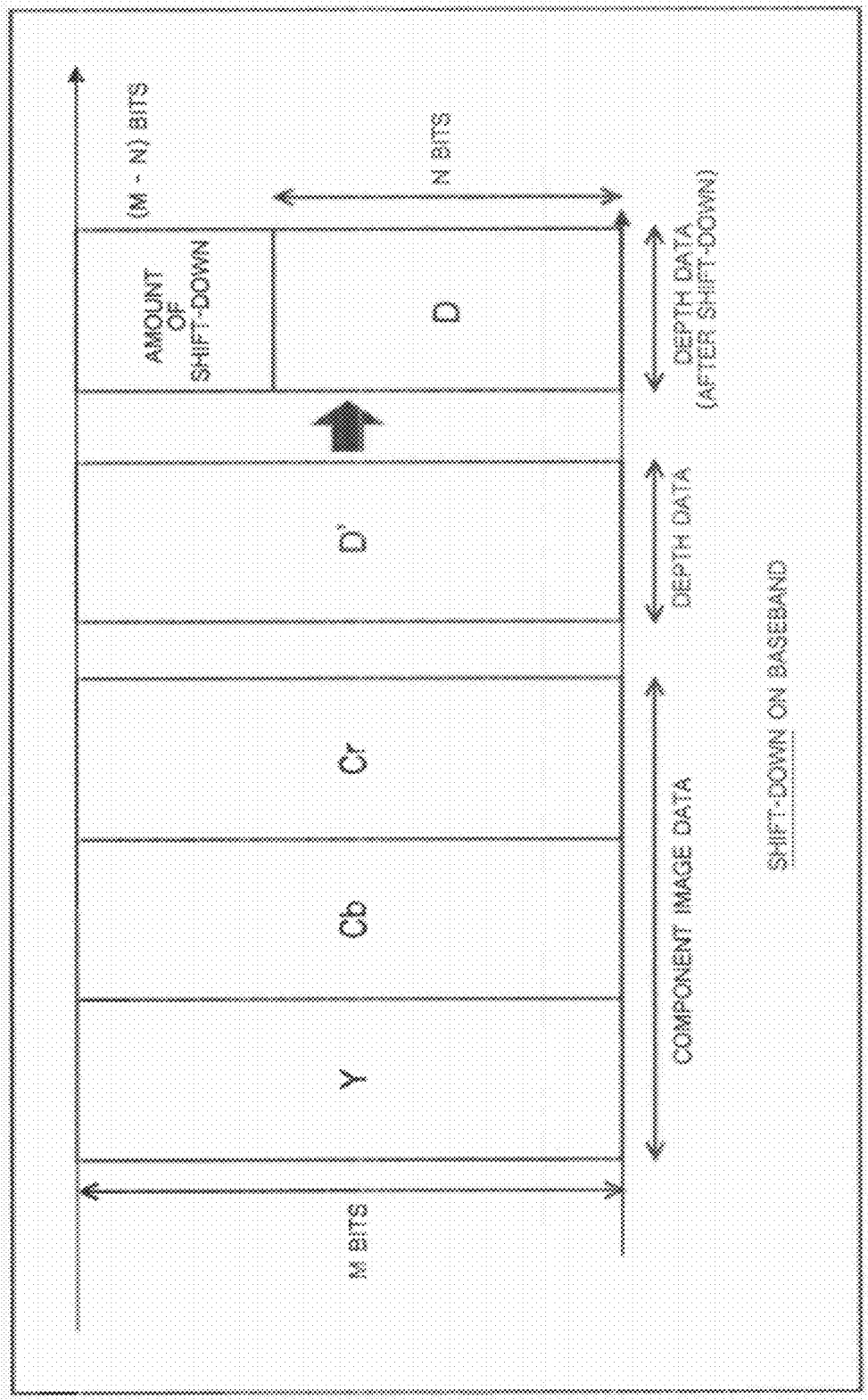
FIG. 5 is a diagram describing an example of a shift-down operation.

FIG. 5 is a diagram describing an example of a shift down operation as an example of the process performed by the bit shift changing unit 153.

As illustrated in FIG. 5, the bit depths of the brightness data Y, the color difference data Cb, and the color difference data Cr are each M bits, and the bit depth of the depth data D is N bits. Moreover, M>N is assumed. In addition, the depth data D is assumed to be shifted up to M bits in the image encoding apparatus 100 (bit shift changing unit 112) (Depth data D').

The bit shift changing unit 153 shift-changes the depth data D' based on the bit shift change information and restores it to the depth data D of the original bit depth (N bits). A shift amount ((M−N) bits) of the shift changing performed by the bit shift changing unit 112 is indicated in bit shift change information.

The bit shift changing unit 153 deletes the entire (M−N) bits at the lower bit positions within the depth data D' based on the information, and shifts down the upper N bits of the depth data D' by an amount corresponding to the (M−N) bits. In this way, the depth data D with a bit depth of N bits is restored.

In addition, for M=N, the bit shift changing unit 112 does not perform the shift changing. In other words, since the shift amount indicated in the bit shift change information is 0 bit, the bit shift changing unit 153 outputs the depth data D' without performing the shift changing. In other words, in this case, it becomes depth data D=depth data D'.

Moreover, for M<N, the bit shift changing unit 112 shifts down the depth data D by an amount corresponding to (N−M) bits. Therefore, the shift amount indicated in bit shift change information is (N−M) bits. In this case, since the change is the shift down, such a purport is described in the bit shift change information. The method of indicating the direction of such a shift change is arbitrary. For example, the shift down may be indicated by a sign as in the expression "−(N−M) bits". Alternatively, information that indicates the fact shift down was performed is indicated separately from the shift amount as in the expression "shift down" and "(N−M) bits".

For example, the bit shift changing unit 153 shifts up the depth data D' by (N−M) bits. At this point, the bit shift changing unit 153 fills lower bits of the depth data D', which has been shifted up, with 0. In other words, in this case, the restored depth data D is different, in a precise sense, in value from the depth data D which has not yet shift-changed by the bit shift changing unit 112. However, since the degree of importance of the depth data D is low and actually the depth data has a small visual influence, the bit shift changing unit 153 outputs the restored depth data D as the result of the shift changing.

The above description has been made in connection with a case where the image data is component image data of YCbCr, but the image data is not limited thereto. The image data may be any data, for example, it may be component image data of RGB, or data other than component image data. Moreover, the form of the depth data D may be also arbitrary, and may not be bitmap data. This is also the same in the following description.

[Flow of Image Encoding Process]

Next, the flow of the process executed by each apparatus described above is described. First of all, an example of the flow of an image encoding process executed by the image encoding apparatus 100 is described referring to the flowchart of FIG. 6.

When the image encoding process is begun, in step S101, the image encoding apparatus 100 acquires the image data (brightness data Y, color difference data Cb, and color difference data Cr). In step S102, the bit depth detection unit 111 detects the bit depths of the image data (brightness data Y, color difference data Cb, and color difference data Cr) acquired in step S101.

In step S103, the image encoding apparatus 100 acquires depth data D corresponding to the acquired image data. In step S104, the bit shift changing unit 112 shift-changes the depth data D acquired in step S103 by using the bit depth of the image data detected in step S102, and causes the bit depth of the depth data D to match the bit depth of the image data.

In step S105, the encoding unit 113 (or, encoding units 113-1 to 113-4) encodes the image data and the depth data D.

In step S106, the rate control unit 114 controls the rate of each encoding performed in step S105 based on the encoding results of the image data and the depth data performed in step S105.

For example, when a data generation amount of a certain component image is larger than a target value, control data is output to suppress a generation amount. On the other hand, when the data generation amount of the image is smaller than the target value, the control data is output to promote the generation amount of data. As a result, since a total amount of codes of the component image and the depth data may be stably maintained.

In step S107, the multiplexing unit 115 multiplexes the bit shift change information that indicates the shift amount of the shift changing in step S104 and each coded data obtained as a result of the process of step S105, and generates the multiplex data (code stream).

In step S108, the multiplexing unit 115 outputs the multiplex data, generated in step S107, to the outside of the image encoding apparatus 100.

In step S109, the image encoding apparatus 100 determines whether to end or not to end the image encoding process, and returns the process to step S101 and repeats the subsequent steps when it is determined not to end the process.

Moreover, the image encoding apparatus 100 ends the image encoding process when it is determined to end the image encoding process in step S109, for example, for a reason that the supply of the image data as an encoding target is stopped.

[Flow of Image Decoding Process]

Figure 7:
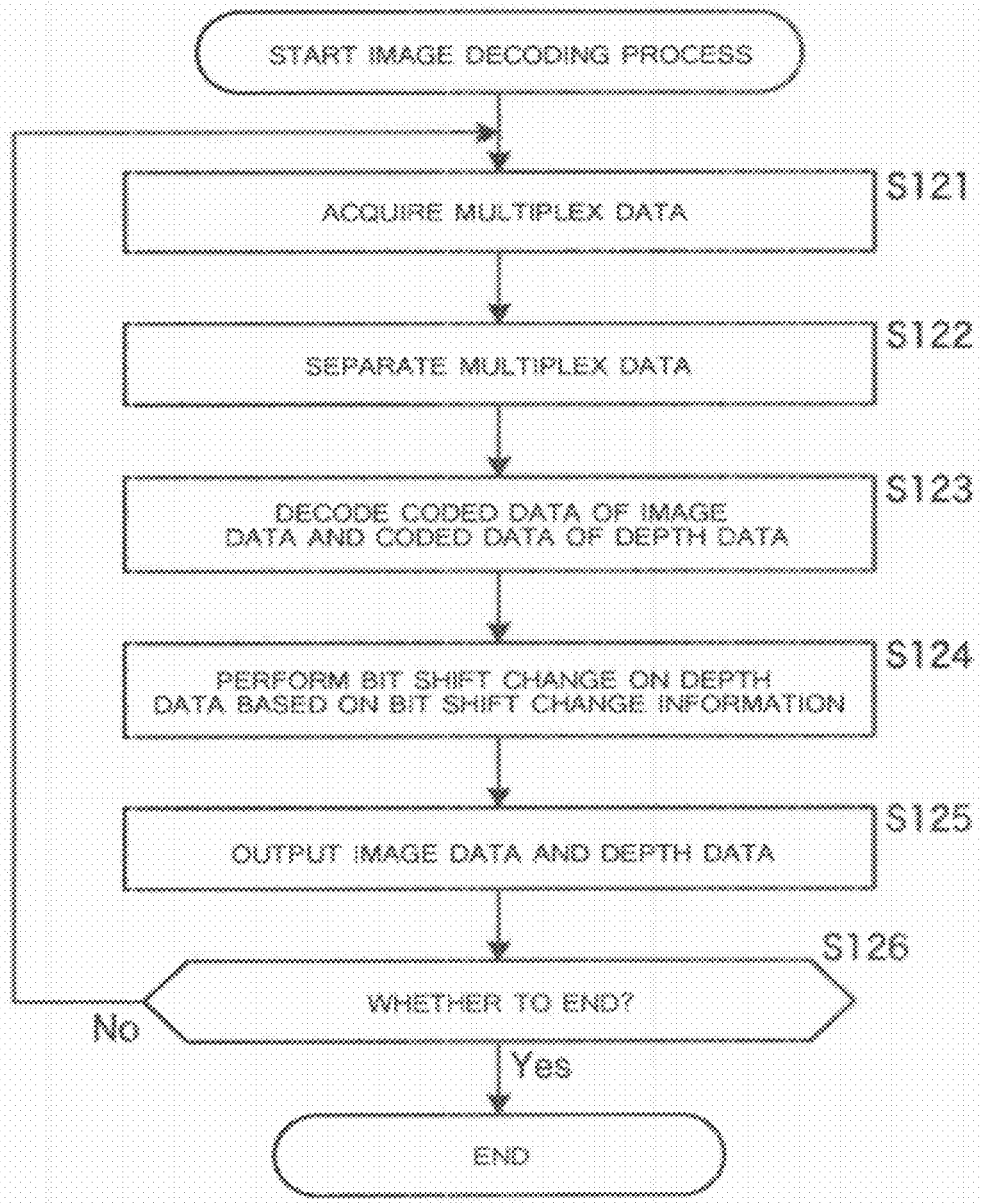
FIG. 7 is a flowchart describing an example of the flow of an image decoding process.

Next, an example of the flow of an image decoding process executed by the image decoding apparatus 150 is described referring to the flowchart of FIG. 7.

When the image decoding process is begun, in step S121, the image decoding apparatus 150 acquires the multiplex data (code stream). In step S122, the separation unit 151 separates the multiplex data which has been acquired in step S121 into the coded data of the brightness data Y, the coded data of the color difference data Cb, the coded data of the color difference data Cr, the coded data of the depth data D, and the bit shift change information by the method corresponding to the multiplexing by the multiplexing unit 115.

In step S123, the decoding unit 152 (decoding units 152-1 to 152-4) decodes each of the coded data of the brightness data Y, the coded data of the color difference data Cb, the coded data of the color difference data Cr, and the coded data of the depth data D.

In step S124, the bit shift changing unit 153 performs a bit shift change on the depth data based on the bit shift change information.

In step S125, the image decoding apparatus 150 outputs the image data and the depth data.

In step S126, the image decoding apparatus 150 determines whether to or not to end the image decoding process, and returns the process to step S121 and repeats the subsequent steps when it is determined not to end the decoding process.

Moreover, when it is determined to end the image decoding process in step S126 for a reason, for example, the supply of the multiplex data is stopped, the image decoding apparatus 150 ends the image decoding process.

As described above, the image encoding apparatus 100 collectively performs the rate control on both the coded data of the image data and the coded data of the depth data after causing the bit depth of the depth data to match the bit depth of the image data unlike a conventional technology which encodes the image data and the depth data separately.

The rate control unit 114 improves flexibility in selecting a ratio between the rates of each encoding and can allocate a suitable rate to each encoding by comprehensively performing the rate control on the coded data of the image data and the coded data of the depth data. For example, the rate allocated to the depth data which is less important may be decreased and the rate allocated to the image data which is more important may be increased. Of course, the opposite is also possible. Moreover, the ratio may change depending on situations.

In addition, since the bit depth of the depth data is adjusted to match the bit depth of the image data, a mathematic operation of the rate control becomes easy. Therefore, the rate control unit 114 may perform the rate control at higher speed. Moreover, since a mathematic operation for the rate control becomes easy, the rate control unit 114 can suitably perform the rate control and improve the encoding efficiency.

Since the encoding efficiency improves, the image quality of the decoded image obtained by decoding the coded data also improves. That is, the image encoding apparatus 100 can encode an image so that a decoded image with higher image quality can be obtained.

Moreover, the image decoding apparatus 150 can speedily and more suitably decode the multiplex data, which has been encoded by the image encoding apparatus 100 and then multiplexed, by performing the decoding process in the way described above. Moreover, the image decoding apparatus 150 can speedily and suitably decode and shift-change the depth data.

[Configuration of Encoding Unit]

Next, a concrete example of the encoding unit included in the image encoding apparatus 100 of FIG. 1 is described. The encoding system of the encoding unit 113 of the image encoding apparatus 100 of FIG. 1 (or, encoding units 113-1 to 113-4) is arbitrary. For example, it may be MPEG (Moving Picture Experts Group)-2, MPEG-4, AVC (Advanced Video Coding), or the like, or may be JPEG (Joint Photographic Experts Group), JPEG2000, or the like.

Figure 8:
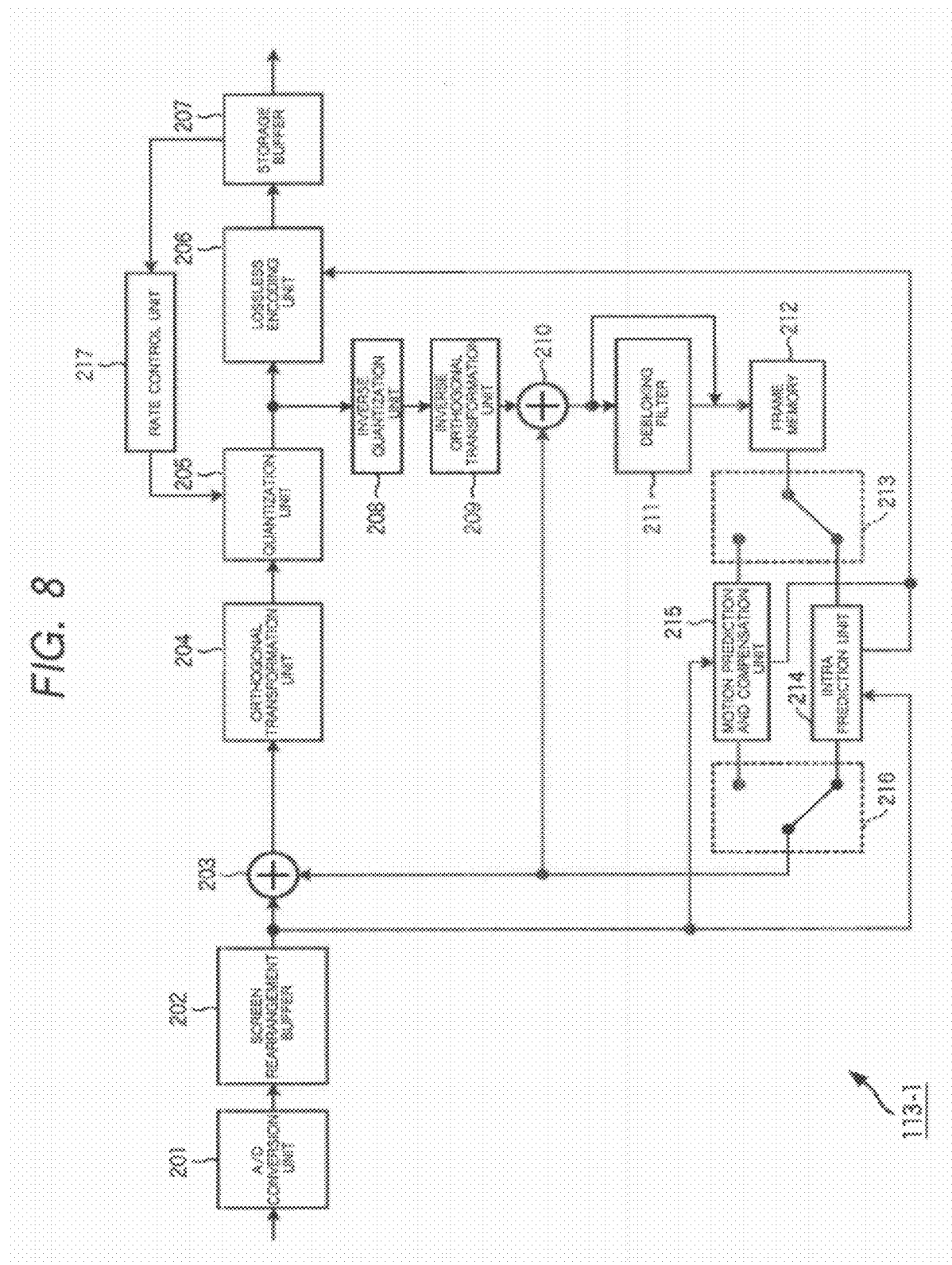
FIG. 8 is a block diagram describing an example of the main configuration of an encoding unit of FIG. 1.

As an example, a description will be made in connection with a case where the encoding system of the encoding units 113-1 to 113-4 is AVC. FIG. 8 is a block diagram describing an example of the main configuration of the encoding unit 113-1 of FIG. 1.

For example, the encoding unit 113-1 shown in FIG. 8 encodes an image in accordance with H.264 and MPEG-4 Part 10 (hereafter, referred to as H.264/AVC) systems.

In the example of FIG. 8, the encoding unit 113-1 includes an A/D (Analog/Digital) conversion unit 201, a screen rearrangement buffer 202, an operation unit 203, an orthogonal transformation unit 204, a quantization unit 205, a lossless encoding unit 206, and a storage buffer 207. Moreover, the encoding unit 113-1 includes an inverse quantization unit 208, an inverse orthogonal transformation unit 209, and an operation unit 210. In addition, the encoding unit 113-1 further includes a deblocking filter 211 and a frame memory 212. Moreover, the encoding unit 113-1 includes a selection unit 213, an intra prediction unit 214, a motion prediction and compensation unit 215, and a selection unit 216. In addition, the encoding unit 113-1 includes a rate control unit 217.

The A/D conversion unit 201 performs A/D conversion on the input image data, outputs the resultant to the screen rearrangement buffer 202, and stores it. The screen rearrangement buffer 202 rearranges the order of frames of the image which are stored in order of display according to the GOP (Group of Picture) structure so that the frames of image are rearranged in order for encoding. The screen rearrangement buffer 202 supplies the image, the frames of which have been rearranged, to the operation unit 203, the intra prediction unit 214, and the motion prediction and compensation unit 215.

The operation unit 203 subtracts a predictive image supplied from the selection unit 216 from the image read from the screen rearrangement buffer 202, and outputs difference information to the orthogonal transformation unit 204. For example, for the image to undergo the intra encoding, the operation unit 203 adds the predictive image supplied from the intra prediction unit 214 to the image read from the screen rearrangement buffer 202. Moreover, for the image to undergo the inter encoding, for example, the operation unit 203 adds the predictive image supplied from the motion prediction and compensation unit 115 to the image read from the screen rearrangement buffer 202.

The orthogonal transformation unit 204 performs orthogonal transformation such as discrete cosine transformation and Karhunen-Loeve transformation on the difference information supplied from the operation unit 203, and supplies the transformation coefficient to the quantization unit 205. The quantization unit 205 quantizes the transformation coefficient output from the orthogonal transformation unit 204. The quantization unit 205 supplies the quantized transformation coefficient to the lossless encoding unit 206.

The lossless encoding unit 206 performs lossless encoding such as variable length coding and arithmetic coding on the quantized transformation coefficient.

The lossless encoding unit 206 acquires information that indicates the intra prediction from the intra prediction unit 214, and acquires information or the like, which indicates the inter prediction mode from the motion prediction and compensation unit 215. Hereafter, the information that indicates the intra prediction is called intra prediction mode information. Moreover, the information that indicates information mode that indicates the inter prediction is called inter prediction mode information hereafter.

The lossless encoding unit 206 encodes the quantized transformation coefficient, and sets a filter coefficient, the intra prediction mode information, the inter prediction mode information, and a quantization parameter, and the like as a portion of header information of the coded data (Multiplexing). The lossless encoding unit 206 supplies the coded data, which is obtained through the encoding, to the storage buffer 207 and allows it to be stored.

For example, the lossless encoding process such as the variable length coding and the arithmetic coding is performed in the lossless encoding unit 206. An example of the variable length coding stipulated in the H.264/AVC system includes CAVLC (Context-Adaptive Variable Length Coding). An example of the arithmetic coding includes CABAC (Context-Adaptive Binary Arithmetic Coding).

The storage buffer 207 temporarily stores the coded data supplied from the lossless encoding unit 206, outputs it as a coded image, which has been encoded according to the H.264/AVC system, at predetermined timing to, for example, a recording apparatus or a transmission path which is not illustrated.

Moreover, the transformation coefficient quantized in the quantization unit 205 is supplied to the inverse quantization unit 208. The inverse quantization unit 208 inverse-quantizes the quantized transformation coefficient by using a method corresponding to the quantization method of the quantization unit 205, and supplies the obtained transformation coefficient to the inverse orthogonal transformation unit 209.

The inverse orthogonal transformation unit 209 performs inverse orthogonal transformation on the supplied transformation coefficient by using a method corresponding to the orthogonal transformation process performed by the orthogonal transformation unit 204. The output which has passed through the inverse orthogonal transformation is supplied to the operation unit 210.

The operation unit 210 adds the predictive image supplied from the selection unit 216 to the inverse orthogonal transformation result supplied from the inverse orthogonal transformation unit 209, that is, the restored difference information, and obtains partially decoded image (decoded image). For example, when the difference information corresponds to the image to undergo the intra encoding, the operation unit 210 adds the predictive image supplied from the intra prediction unit 214 to the difference information. Moreover, when the difference information corresponds to the image to undergo the inter encoding, for example, the operation unit 210 adds the predictive image supplied from the motion prediction and compensation unit 215 to the difference information.

The addition result is supplied to the deblocking filter 211 or the frame memory 212.

The deblocking filter 211 removes block distortion of the decoded image by performing an appropriate deblocking filtering process, and improves the image quality by performing an appropriate loop filtering process by using a Wiener filter. The deblocking filter 211 classifies each pixel into classes, and performs an appropriate filtering process for each class. The deblocking filter 211 supplies a result of the filtering process to the frame memory 212.

At predetermined timing, the frame memory 212 outputs a reference image that has been stored, to the intra prediction unit 214 or the motion prediction and compensation unit 215 through the selection unit 213.

For example, for the image to undergo the intra encoding, the frame memory 212 supplies the reference image to the intra prediction unit 214 through selection unit 213. Moreover, for the image to undergo the inter encoding, for example, the frame memory 212 supplies the reference image to the motion prediction and compensation unit 215 through the selection unit 213.

In the encoding unit 113-1, for example, I picture, B picture, and P picture output from the screen rearrangement buffer 202 are supplied to the intra prediction unit 214 as images used for the intra prediction (called intra process). Moreover, B picture and P picture read from the screen rearrangement buffer 102 are supplied to the motion prediction and compensation unit 215 as images used for the inter prediction (called inter process).

For the image to under to intra encoding, the selection unit 213 supplies the reference image supplied from the frame memory 212 to the intra prediction unit 214, and for the image to undergo inter encoding, the selection unit 213 supplies the reference image to the motion prediction and compensation unit 215.

The intra prediction unit 214 performs the intra prediction (in-screen prediction) to generate the predictive image by using pixel values within the screen. The intra prediction unit 214 performs the intra prediction in a plurality of modes (intra prediction mode).

The intra prediction mode includes a mode that generates the predictive image based on the reference image supplied from the frame memory 212 through the selection unit 213. Moreover, the intra prediction mode is a mode that generates the predictive image by using the image itself (pixel values of a process target block) used for the intra prediction and read from the screen rearrangement buffer 202.

The intra prediction unit 214 generates the predictive image in all the intra prediction modes, evaluates each predictive image, and selects an optimal mode. When an optimal intra prediction mode is selected, the intra prediction unit 214 supplies the predictive image generated in the optimal mode to the operation unit 103 through the selection unit 216.

Moreover, as described above, the intra prediction unit 214 suitably supplies intra prediction mode information, which indicates the adopted intra prediction mode, to the lossless encoding unit 206.

The motion prediction and compensation unit 215 calculates a motion vector for the image to undergo the inter encoding, by using the input image supplied from the screen rearrangement buffer 202 and the decoded image, which becomes a reference frame, supplied from the frame memory 212 through selection unit 213. The motion prediction and compensation unit 215 performs a compensation process according to the calculated motion vector, and generates the predictive image (inter predictive image information).

The motion prediction and compensation unit 215 performs the inter prediction process for all candidate inter prediction modes, and generates the predictive image. The motion prediction and compensation unit 215 supplies the generated predictive image to the operation unit 203 through the selection unit 216.

The motion prediction and compensation unit 215 supplies motion vector information that indicates the calculated motion vector or the inter prediction mode information that indicates the adopted inter prediction mode to the lossless encoding unit 206.

For the image to undergo the intra encoding, the selection unit 216 supplies the output of the intra prediction unit 214 to the operation unit 203. For the image to undergo the inter encoding, the selection unit 216 supplies the output of the motion prediction and compensation unit 215 to the operation unit 203.

The rate control unit 217 controls the rate of the quantization operation of the quantization unit 205 so as not to cause overflow or underflow, based on the compressed image stored in the storage buffer 207.

[Macro Block]

Figure 9:
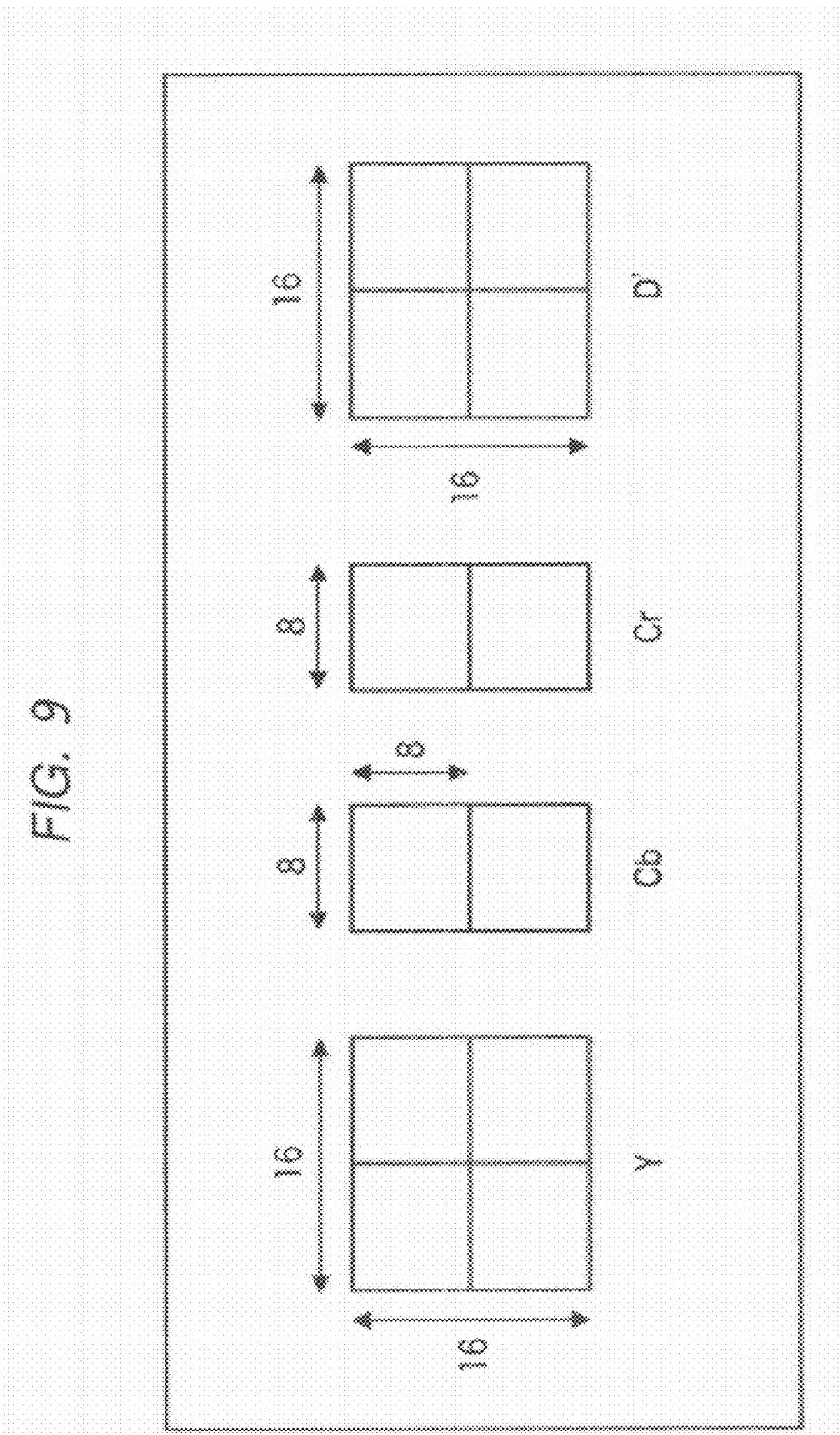
FIG. 9 is a diagram illustrating an example of a macro block.

FIG. 9 is a diagram that illustrates an example of a macro block. As illustrated in FIG. 9, for example, when Y:Cb:Cr=2:1:1, the macro block of the depth data D is set to have the same size (16×16) as the macro block of the brightness data Y. In this way, the depth data is added to the component image data, so that four component images may be generated. The size of the macro block is arbitrary.

Since the encoding units 113-2 to 113-4 have each the same configuration as the encoding unit 113-1, a description thereof is not repeated.

The configuration of the encoding unit 113-1 described referring to FIG. 8 can be applied to the configuration of the encoding unit 113.

[Configuration of Decoding Unit]

Figure 10:
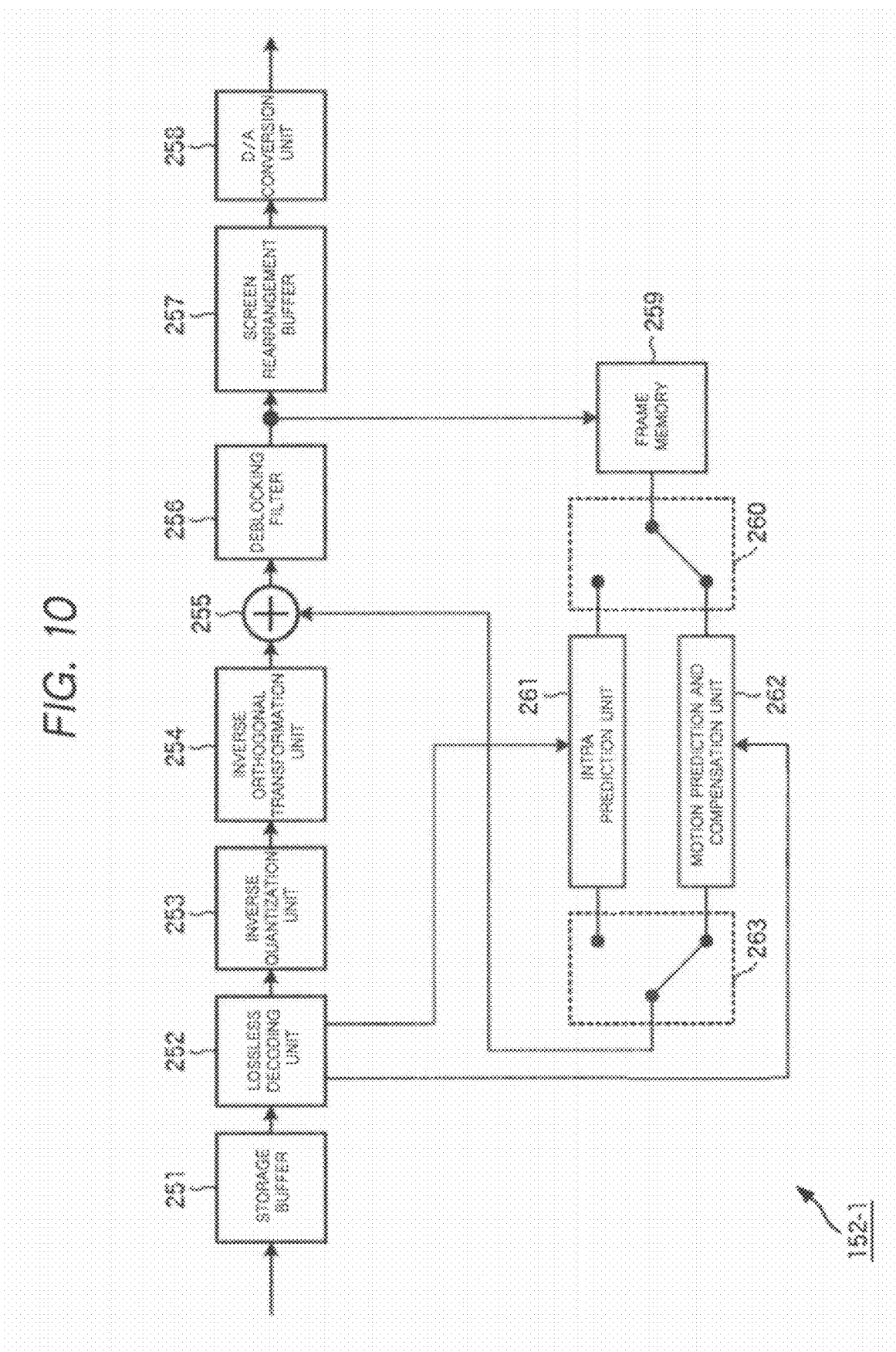
FIG. 10 is a block diagram describing an example of the main configuration of a decoding unit of FIG. 4.

FIG. 10 is a block diagram describing an example of the main configuration of the decoding unit of FIG. 4.

As illustrated in FIG. 10, the decoding unit 152-1 includes a storage buffer 251, a lossless decoding unit 252, an inverse quantization unit 253, an inverse orthogonal transformation unit 254, an operation unit 255, a deblocking filter 256, a screen rearrangement buffer 257, a D/A conversion unit 258, a frame memory 259, a selection unit 260, an intra prediction unit 261, a motion prediction and compensation unit 262, and a selection unit 263.

The storage buffer 251 stores the coded data that has been transmitted. The coded data is data obtained as a result of encoding by the encoding unit 113-1. The lossless decoding unit 252 decodes the coded data read from the storage buffer 251 at predetermined timing by a method corresponding to the encoding system of the lossless encoding unit 206 of FIG. 8.

The inverse quantization unit 253 inverse-quantizes the coefficient data, which is obtained as a result of the decoding performed by the lossless decoding unit 252, by a method corresponding to the quantization system of the quantization unit 205 of FIG. 8. The inverse quantization unit 253 supplies the inverse-quantized coefficient data to the inverse orthogonal transformation unit 254. The inverse orthogonal transformation unit 254 obtains decoding residual data corresponding to residual data existing before the orthogonal transformation is performed in the encoding unit 113-1, by performing inverse orthogonal transformation on the coefficient data by using a system corresponding to the orthogonal transformation method of the orthogonal transformation unit 204 of FIG. 8.

The decoding residual data obtained through the inverse orthogonal transformation is supplied to the operation unit 255. Moreover, the predictive image is supplied from the intra prediction unit 261 or the motion prediction and compensation unit 262 to the operation unit 255 through the selection unit 263.

The operation unit 255 adds the decoding residual data and the predictive image to obtain the decoded image data corresponding to the image data which has existed before the predictive image is subtracted by the operation unit 203 of the encoding unit 113-1. The operation unit 255 supplies the decoded image data to the deblocking filter 256.

The deblocking filter 256 removes the block distortion from the decoded image, then supplies the resultant to the frame memory 259, stores it, and supplies it to the screen rearrangement buffer 257.

The screen rearrangement buffer 257 rearranges the image. That is, the order of frames arranged in the order of encoding which is the result of the permutation by the screen rearrangement buffer 202 of FIG. 8 is permuted back to the order of original display. The D/A conversion unit 258 performs D/A conversion on the image supplied from the screen rearrangement buffer 257, outputs the resultant to the display (not illustrated), and allows it to be displayed.

The selection unit 260 reads the image to undergo the inter process and the image used as a reference, from the frame memory 259, and supplies the images to the motion prediction and compensation unit 262. Moreover, the selection unit 260 reads the image to be used in the intra prediction from the frame memory 259, and supplies the image to the intra prediction unit 261.

Information or the like which indicates the intra prediction mode obtained by decoding the header information is suitably supplied from the lossless decoding unit 252 to the intra prediction unit 261. The intra prediction unit 261 generates the predictive image based on this information, and supplies the generated predictive image to the selection unit 213.

The motion prediction and compensation unit 262 acquires, from the lossless decoding unit 252, information (prediction mode information, motion vector information, and reference frame information) obtained by decoding the header information. When the information that indicates the inter prediction mode is supplied, the motion prediction and compensation unit 262 generates the predictive image based on the inter motion vector information output from the lossless decoding unit 252, and supplies the generated predictive image to the selection unit 263.

The selection unit 263 selects the predictive image generated by the motion prediction and compensation unit 262 or the intra prediction unit 261, supplies the selected predictive image to the operation unit 255.

Since the decoding units 152-2 to 152-4 may have the same configuration as the decoding unit 152-1, a description thereof will not be repeated.

The configuration of the decoding unit 152-1 described referring to FIG. 10 may be applied as the configuration of the decoding unit 152.

[Flow of Encoding Process]

Figure 11:
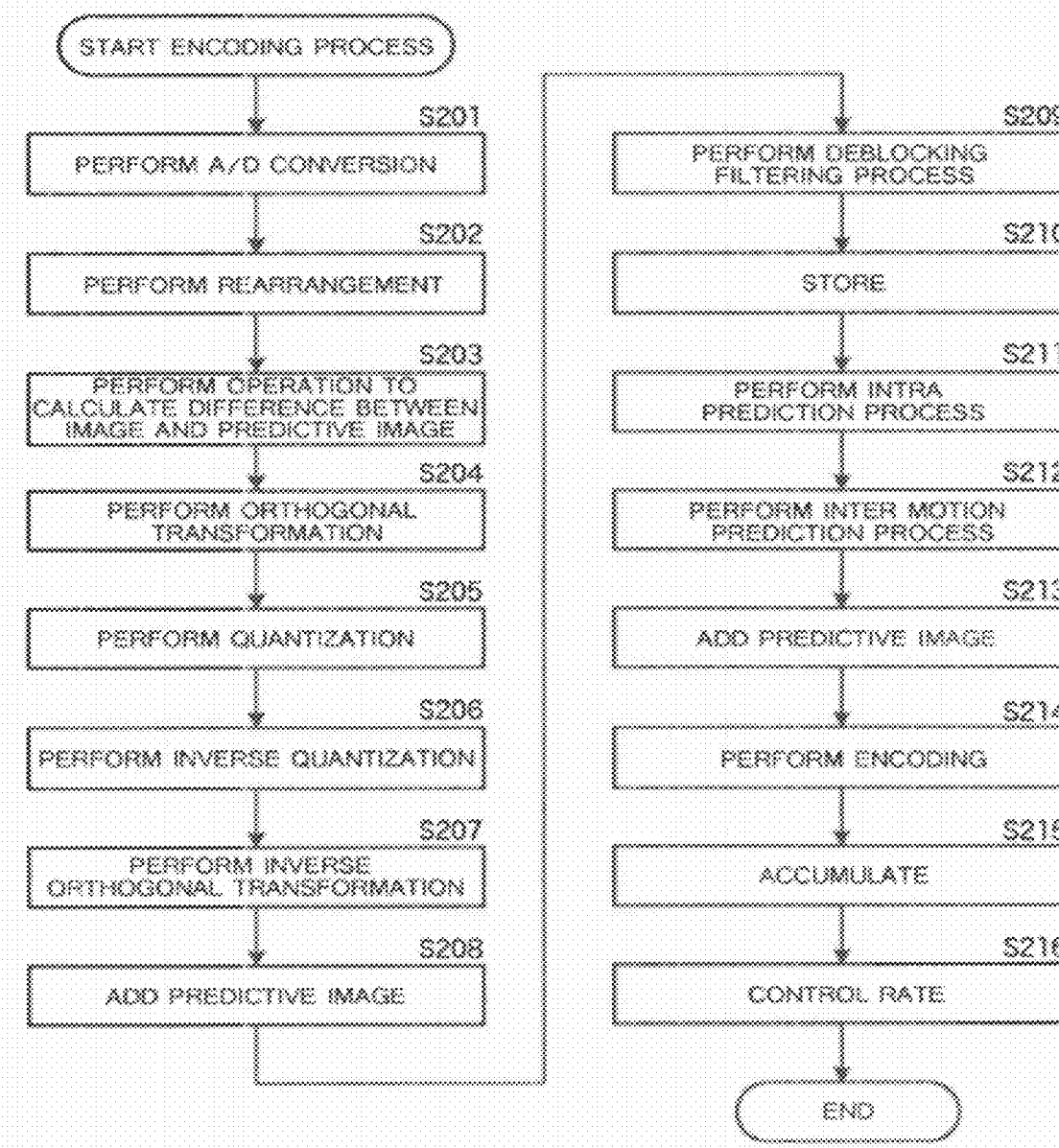
FIG. 11 is a flowchart describing an example of the flow of an encoding process.

Next, an example of the flow of an encoding process executed by the encoding unit 113-1 is described referring to the flowchart of FIG. 11. This encoding process corresponds to step S105 and step S106 in FIG. 6.

Then the encoding process is begun, in step S201, the A/D conversion unit 201 performs A/D conversion on an image which is input. In step S202, the screen rearrangement buffer 202 stores the image supplied from the A/D conversion unit 201, and permutes the images so that the images arranged in order of display is rearranged to be in order for encoding.

In step S203, the operation unit 203 calculates a difference between the image permuted in step S202 and the predictive image obtained by the prediction process to be described below. The predictive image is supplied from the motion prediction and compensation unit 215 for inter prediction, and from the intra prediction unit 214 for the intra prediction, to the operation unit 203 through the selection unit 216.

The difference data has a reduced amount of data compared to the original image data. Therefore, the data amount may be compressed compared to the case of encoding the image as it is.

In step S204, the orthogonal transformation unit 204 performs orthogonal transformation on the difference information supplied from the operation unit 203. Specifically, the orthogonal transformation such as discrete cosine transformation and the Karhunen-Loeve transformation is performed, so that transformation coefficient is output. In step S205, the quantization unit 205 quantizes the transformation coefficient.

This quantized difference information is locally decoded as follows. That is, in step S206, the inverse quantization unit 208 inverse-quantizes the transformation coefficient, which has been quantized by the quantization unit 205, with a characteristic corresponding to the characteristic of the quantization unit 205. In step S207, the inverse orthogonal transformation unit 209 performs the inverse orthogonal transformation on the transformation coefficient, which has been inverse-quantized by the inverse quantization unit 208, with a characteristic corresponding to the characteristic of the orthogonal transformation unit 204.

In step S208, the operation unit 210 adds the predictive image, which is input through the selection unit 216, to the locally decoded difference information, and generates a locally decoded image (image corresponding to the input of the operation unit 203). In step S209, the deblocking filter 211 filters the image output from the operation unit 210. As a result, the block distortion is removed. In step S210, the frame memory 212 stores the filtered image. In addition, even an image which has not been filtered by the deblocking filter 211 is supplied to and stored in the frame memory 212 from the operation unit 210.

In step S211, the intra prediction unit 214 performs the intra prediction process in the intra prediction mode. In step S212, the motion prediction and compensation unit 215 performs the motion prediction and compensation process in the inter prediction mode.

In step S213, the selection unit 216 decides the optimal prediction mode based on each cost function value output from the intra prediction unit 214 and the motion prediction and compensation unit 215. In other words, the selection unit 216 selects either the predictive image generated by the intra prediction unit 214 or the predictive image generated by the motion prediction and compensation unit 215.

Moreover, selection information of this predictive image is supplied to the intra prediction unit 214 or the motion prediction and compensation unit 215. When the predictive image of the optimal intra prediction mode is selected, the intra prediction unit 214 supplies information (that is, the intra prediction mode informational) that indicates an optimal intra prediction mode to the lossless encoding unit 206.

When the predictive image of an optimal inter prediction mode is selected, the motion prediction and compensation unit 215 outputs information that indicates an optimal inter prediction mode, and, if necessary, information corresponding to the optimal inter prediction mode to the lossless encoding unit 206. Examples of the information corresponding to the optimal inter prediction mode include motion vector information, flag information, and reference frame information, and the like.

In step S214, the lossless encoding unit 206 encodes the quantized transformation coefficient output from the quantization unit 205. That is, the lossless encoding such as the variable length coding and the arithmetic coding is performed on the difference picture (second difference image in the case of inter).

The lossless encoding unit 206 encodes information on the prediction mode of the predictive image selected by the process of step S213, and adds the difference information to the header information of the coded data obtained by encoding the difference image.

In other words, the lossless encoding unit 206 encodes information or the like corresponding to the optimal inter prediction mode supplied from the motion prediction and compensation unit 215, or the intra prediction mode information supplied from the intra prediction unit 214 and adds the coded information to the header information.

In step S215, the storage buffer 207 stores the coded data output from the lossless encoding unit 206. The coded data stored in the storage buffer 207 is suitably read, and transmitted to the decoding side through the transmission path.

In step S216, the rate control unit 217 controls the rate of the quantization operation of quantization unit 205 so that overflow or underflow does not occur, based on the compressed image stored in the storage buffer 207 and the rate control information supplied from the rate control unit 114.

When the process of step S216 ends, the encoding process ends. The encoding unit 113-1 repeats such an encoding process for every process unit of the encoding process.

The encoding units 113-2 to 113-4 also perform the similar process. Moreover, the similar encoding process is also performed even when the encoding unit 113 is used.

[Flow of Decoding Process]

Figure 12:
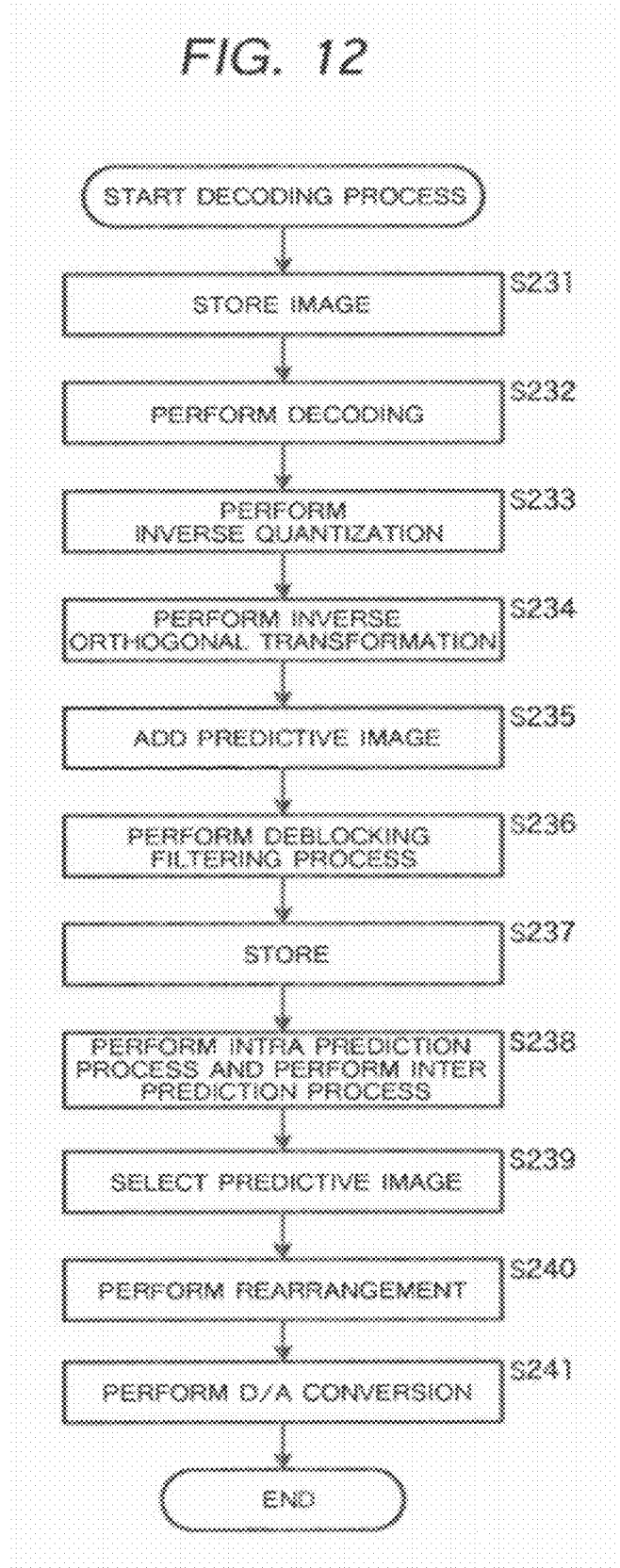
FIG. 12 is a flowchart describing an example of the flow of a decoding process.

Next, an example of the flow of a decoding process executed by the decoding unit 152-1 of FIG. 10 is described referring to the flowchart of FIG. 12. This decoding process corresponds to step S123 in FIG. 7.

When the decoding process is begun, in step S231, the storage buffer 251 stores the coded data transmitted. In step S232, the lossless decoding unit 252 decodes the coded data supplied from the storage buffer 251. That is, I picture, P picture, and B picture encoded by the lossless encoding unit 206 of FIG. 8 are decoded.

At this point, the motion vector information, the reference frame information, the prediction mode information (intra prediction mode or inter prediction mode), the flag information, and the like are decoded.

That is, when the prediction mode information is the intra prediction mode information, the prediction mode information is supplied to the intra prediction unit 261. When the prediction mode information is the inter prediction mode information, the motion vector information that corresponds to the prediction mode information is supplied to the motion prediction and compensation unit 262.

In step S233, the inverse quantization unit 253 inverse-quantizes the transformation coefficient decoded by the lossless decoding unit 252 with a characteristic corresponding to the characteristic of the quantization unit 205 of FIG. 8. In step S234, the inverse orthogonal transformation unit 254 performs the inverse orthogonal transformation on the transformation coefficient that has been inverse-quantized by the inverse quantization unit 253 with a characteristic corresponding to the characteristic of the orthogonal transformation unit 204 of FIG. 8. As a result, the difference information corresponding to the input of the orthogonal transformation unit 204 of FIG. 8 (that is, the output of operation unit 203) becomes decoded.

In step S235, the operation unit 255 adds the predictive image to the difference information obtained by the process of step S234. As a result, the original image data is obtained by the decoding.

In step S236, the deblocking filter 256 filters the decoded image data supplied from the operation unit 255. As a result, the block distortion is removed.

In step S237, the frame memory 259 stores the filtered decoded image data.

In step S238, the intra prediction unit 261 performs the intra prediction process. Moreover, the motion prediction and compensation unit 262 performs the inter prediction process. In step S239, the selection unit 263 selects either one of the generated two predictive images.

In step S240, the screen rearrangement buffer 257 changes the sequence of the frames of the decoded image data. That is, the order of the frames of the decoded image data, which has been permuted for encoding by the screen rearrangement buffer 202 of FIG. 8 is permuted again so as to be arranged in the order of original display.

In step S241, the D/A conversion unit 258 performs D/A conversion on the decoded image data which has undergone the frame permutation by the screen rearrangement buffer 257. This decoded image data is output, for example, to a display (not illustrated in the drawing) so that the image is displayed.

When the process of step S241 ends, the decoding process ends. The decoding unit 152-1 repeats such a decoding process for every process unit of the decoding process.

The decoding units 152-2 to 152-4 perform the similar process. Moreover, even in the case of using the decoding unit 152, the similar encoding process is performed.

As described above, an encoding apparatus/a decoding apparatus of the AVC system may be used as the encoder unit 113 (or encoder units 113-1 to 113-4) and the decoder unit 152 (or decoder units 152-1 to 152-4). In this case, the image encoding apparatus 100 can more efficiently encode the depth data and the image data which can give a stereoscopic vision. Moreover, the image decoding apparatus 150 can decode the coded depth data and the coded image data which can give a stereoscopic vision speedily and more suitably.

[Configuration of Encoding Unit]

Figure 13:
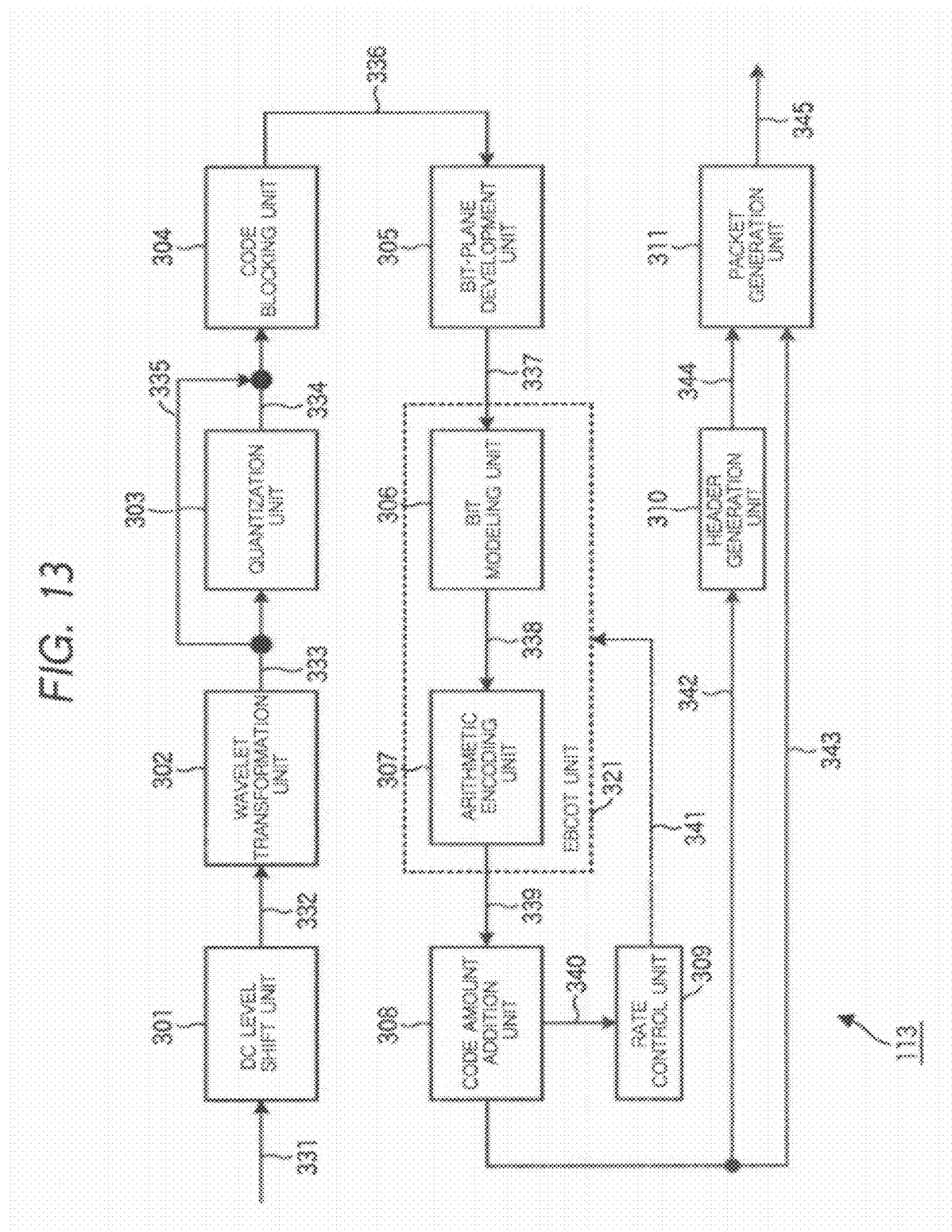
FIG. 13 is a block diagram illustrating other example of the configuration of the encoding unit of FIG. 1.

FIG. 13 illustrates an example in a case where an encoder that encodes according to the JPEG2000 system is used as the encoding unit 113 of FIG. 1. Referring to FIG. 13, described is a case in which the brightness data Y, the color difference data Cb, the color difference data Cr, and the depth data D' are collectively encoded to produce one system of code stream (coded data), that is, in which the encoding unit is configured by using one encoding unit 113.

As illustrated in FIG. 13, the encoding unit 113 includes a DC level shift unit 301, a wavelet transformation unit 302, a quantization unit 303, a code blocking unit 304, and a bit-plane development unit 305.

The DC level shift unit 301 performs the level shift on the DC component of the image data input to the encoding unit 113 like arrow 331 to efficiently perform the wavelet transformation at the latter stage. For example, RGB signals have positive values (integers without a sign). Then, the DC level shift unit 301 attempts to achieve an improvement in compression efficiency by performing the level shift that reduces the dynamic range of the original signal to half by using that. Therefore, when signals of integer values with a sign (positive and negative) like color difference data Cb and color difference data Cr of YCbCr signals are used as original signals, the level shift is not performed.

The wavelet transformation unit 302 is achieved by a filter bank which is usually configured by using a low-pass filter and a high-pass filter. Moreover, since a digital filter usually exhibits impulse response having a plurality of tap lengths (filter coefficients), the wavelet transformation unit 302 has a buffer which buffers an input image only by filtering beforehand.

When the wavelet transformation unit 302 acquires the image data output from the DC level shift unit 301 as indicated by arrow 332 by a data amount equal to or more than a minimum requirement, the wavelet transformation unit 302 filters the image data which has undergone the DC level shift by using a predetermined wavelet transformation filter, and generates wavelet coefficients. In addition, the wavelet transformation unit 302 performs a filtering process which separates the image data into low band components and high band components for each of a vertical direction and a horizontal direction of an image.

Next, the wavelet transformation unit 302 recursively repeats such a filtering process a predetermined number of times on sub-bands classified as the low band components for each of the vertical direction and horizontal direction. This is because most of energy of the image concentrates on the low band components as illustrated in FIG. 14 for example.

Figure 14:
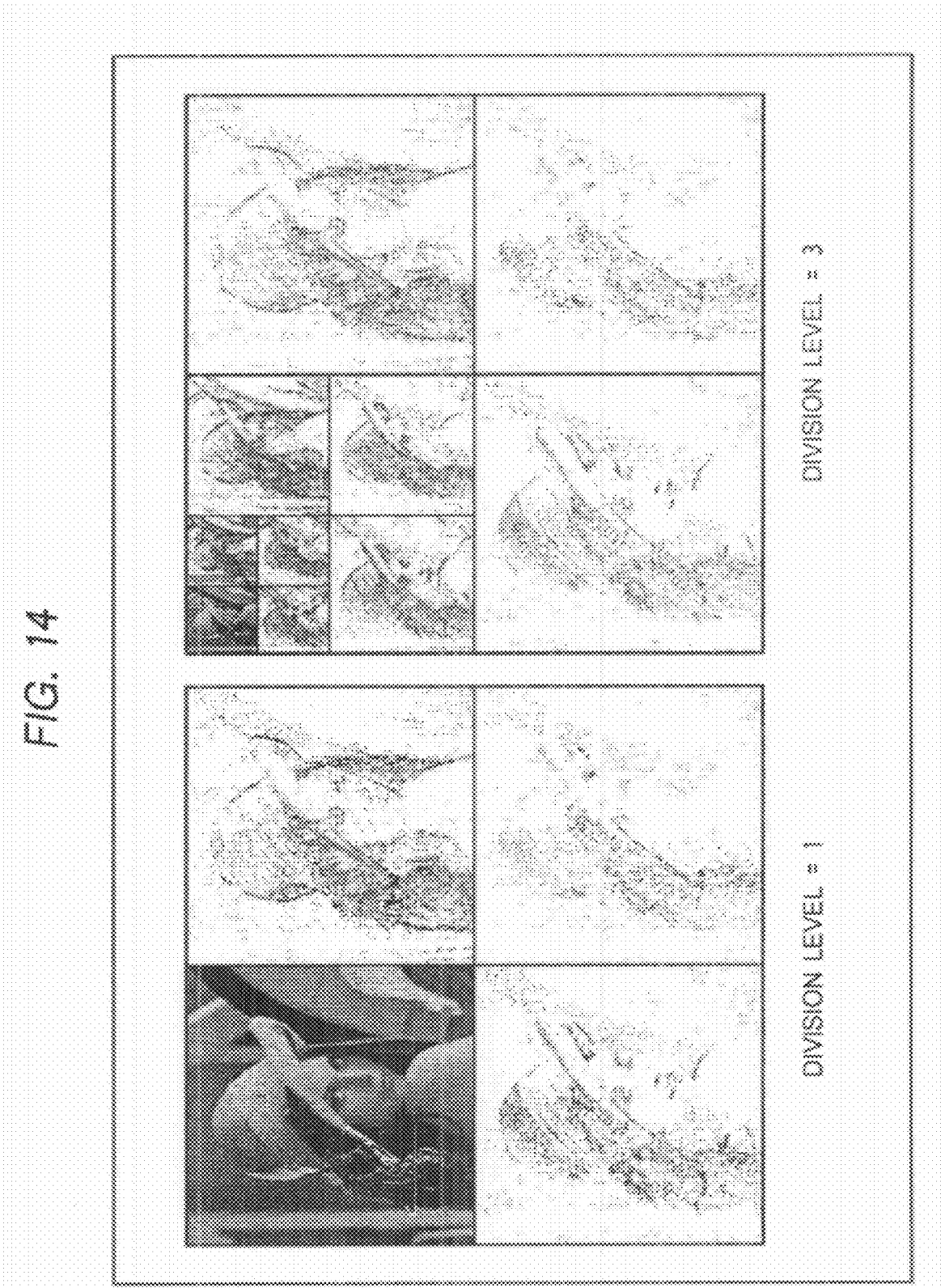
FIG. 14 is a diagram illustrating an example of the configuration of a sub-band.

FIG. 14 is a diagram illustrating an example of the configuration of sub-bands. As illustrated in FIG. 14, most of the energy of the image concentrates on the low band components even in a state in which a division level number is 1 and in a state in which the division level number is 3.

Figure 15:
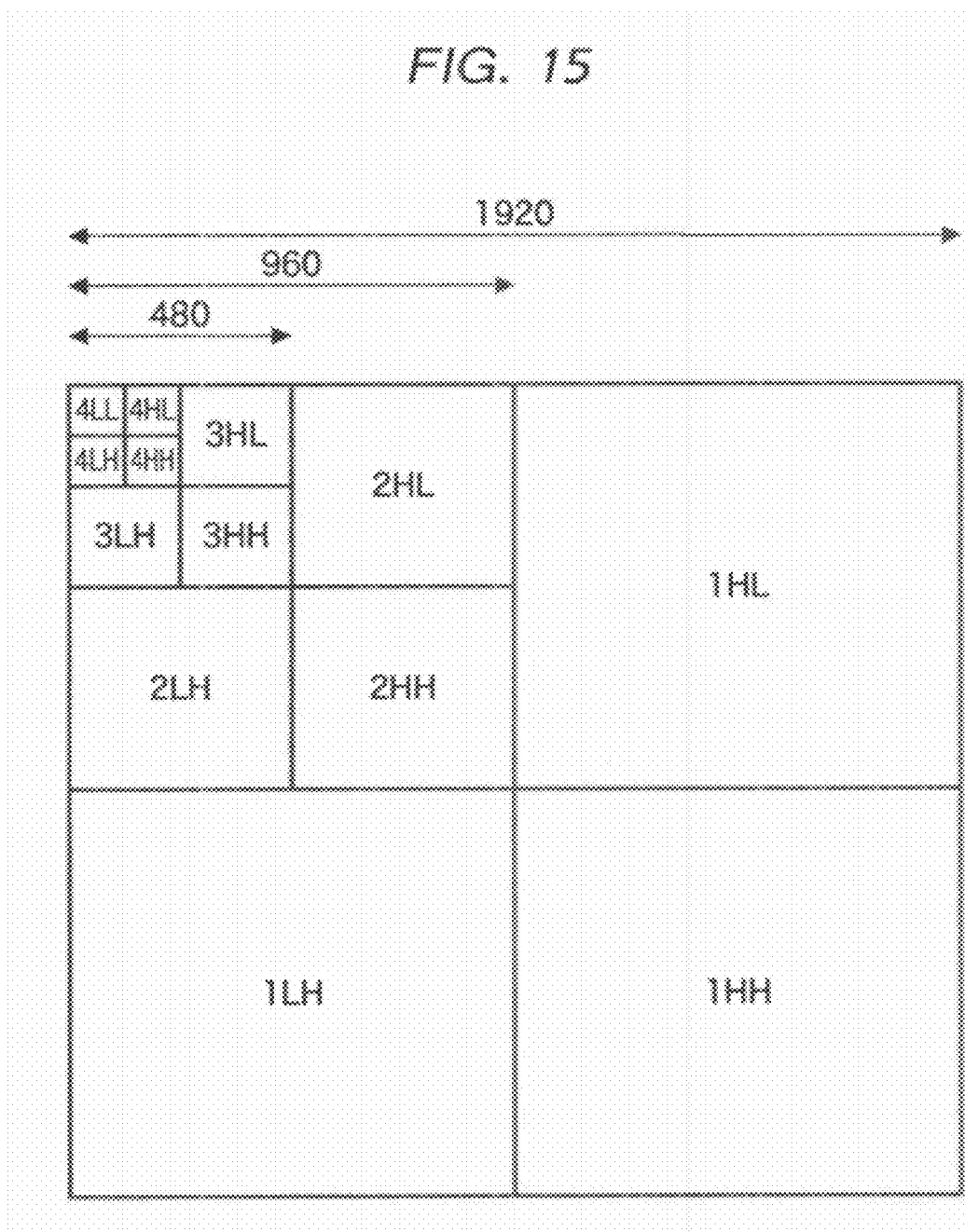
FIG. 15 is a diagram illustrating an example of the configuration of a sub-band.

FIG. 15 is a diagram that illustrates an example of the configuration of sub-bands generated by a wavelet transformation process in the case of a division number of 4.

In this case, the wavelet transformation unit 302 first filters the entire image, and generates sub-bands 1LL (not illustrated) and 1HL, 1LH, and 1HH. Next, the wavelet transformation unit 302 filters generated sub-band 1LL again, and generates 2LL (not illustrated) and 2HL, 2LH, and 2HH. In addition, the wavelet transformation unit 302 filters the generated sub-band 2LL again, and generates 3LL, 3HL, 3LH, and 3HH. In addition, the wavelet transformation unit 302 filters the generated sub-band 3LL again, and generates 4LL, 4HL, 4LH, and 4HH.

Thus, when the analysis filtering is performed up to division level number 4, thirteen sub-bands are generated. As illustrated in FIG. 15, when the division level number advances to one level higher rank, the size of the sub-band becomes ½ in both the vertical direction and the horizontal direction.

That is, when baseband image data of an image of 1920 pixels in the horizontal direction is subjected to the analysis filtering once, 4 sub-bands (1LL, 1HL, 1LH, 1HH) each with 960 pixels in the horizontal direction are generated. In addition, when the sub-band 1LL is subjected to the analysis filtering once, four sub-bands (2LL, 2HL, 2LH, 2HH) each with 480 pixels in the horizontal direction are generated. In addition, when the sub-band 2LL is subjected to the analysis filtering, four sub-bands (3LL, 3HL, 3LH, 3HH) each with 240 pixels in the horizontal direction are generated. In addition, when the sub-band 3LL is subjected to the analysis filtering once, four sub-bands (4LL, 4HL, 4LH, 4HH) each with 120 pixels in the horizontal direction are generated.

The division level number of the wavelet transformation is arbitrary.

The wavelet transformation unit 302 supplies the wavelet coefficient obtained by the filtering, to the quantization unit 303 as indicated by arrow 333 for every sub-band. The quantization unit 303 quantizes the supplied wavelet coefficient. The quantization method is arbitrary, but the scalar quantization that divides by a quantization step size is a generally used method. The quantization unit 303 supplies the quantized coefficient obtained by the quantization to the code blocking unit 304 as indicated by arrow 334. At subsequent stages, a quantization coefficient is supplied instead of the wavelet coefficient. However, the quantization coefficient is treated basically in the same manner as the wavelet coefficient. Therefore, hereinafter, the description of that point is omitted as long as it is not necessary, and coefficients are simply referred to as coefficient or coefficient data.

When the encoding unit 113 encodes the image data according to a lossless encoding system which allows the original data to be perfectly restored by a decoding process, the process of the quantization unit 303 is omitted, and the output of the wavelet transformation unit 302 is supplied to the code blocking unit 304 as indicated by arrow 335.

Figure 16:
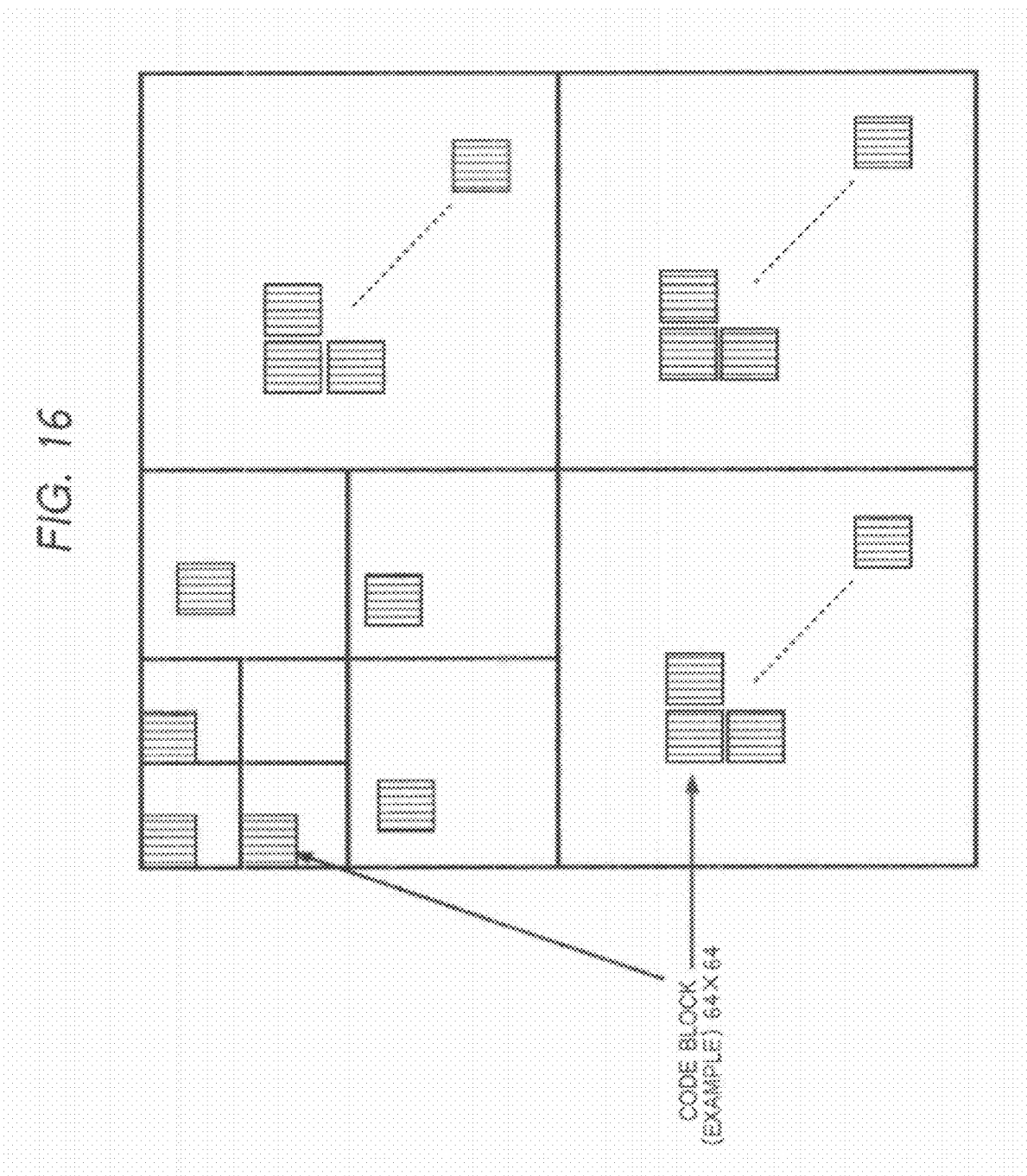
FIG. 16 is a diagram illustrating an example of a code block within each sub-band.

In the code blocking unit 304, the wavelet coefficient is divided into code blocks with a predetermined size in units of a process unit for entropy encoding. FIG. 16 illustrates a positional relationship between the code blocks in each sub-band. For example, code blocks each having a size of about 64×64 pixels are generated in each sub-band after division. Each processing unit at the latter stage performs a process on each code block.

The code blocking unit 304 supplies each code block to a bit-plane development unit 305 as indicated by arrow 336.

The bit-plane development unit 305 develops the coefficient data in bit-planes at respective bit positions.

The bit-plane is obtained by dividing (or slicing) a group of coefficients made up of a predetermined number of wavelet coefficients in units of a bit, that is, for each bit position. That is, the bit-planes is a set of bits (coefficient bits) at the same bit position within a same coefficient group.

Figure 17:
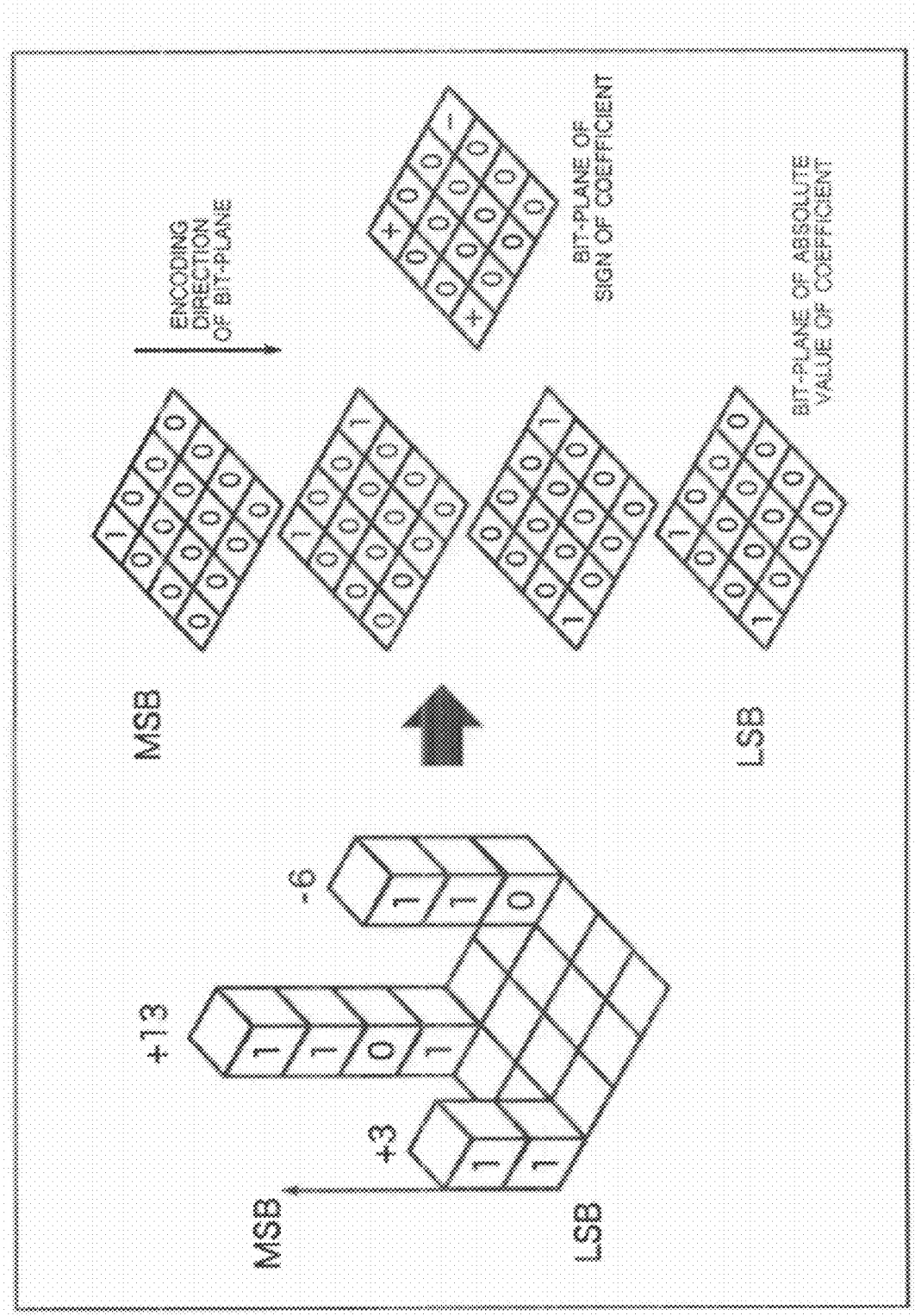
FIG. 17 is a diagram describing an example of a bit-plane.

FIG. 17 illustrates a concrete example thereof. A left diagram in FIG. 17 illustrates 4 coefficients in the 4 coefficients in the horizontal direction, that is, 16 coefficients in total. Among the 16 coefficients, the coefficient with the maximum absolute value is 13 which is expressed as 1101 in binary. The bit-plane development unit 305 develops such a coefficient group in four bit-planes (absolute value bit-planes) that indicate absolute values and one bit-plane (sign bit-plane) which indicates signs. That is, the coefficient group in the left diagram of FIG. 17 is developed in four bit-planes of absolute values and one bit-plane of signs, as illustrated in the right diagram of FIG. 17. Here, each element of the bit-planes of the absolute values takes the value of 0 or 1. Moreover, each element of the bit-plane that indicates a sign takes a value that indicates the value of the coefficient is positive, a value which indicates the value of the coefficient is zero, or a value that indicates that the value of the coefficient is negative.

In addition, the encoding unit 113 further includes a bit modeling unit 306, an arithmetic encoding unit 307, a code amount addition unit 308, a rate control unit 309, a header generation unit 310, and a packet generation unit 311.

The bit-plane development unit 305 supplies the developed bit-planes to the bit modeling unit 306 as indicated by arrow 337.

The bit modeling unit 306 and the arithmetic encoding unit 307 function as an EBCOT (Embedded Coding with Optimized Truncation) unit 321, and performs the entropy encoding called EBCOT stipulated by the JPEG2000 standard on the input coefficient data. The EBCOT is a technique which encodes while measuring an amount of statistics of the coefficients in the block for block with a predetermined size.

The bit modeling unit 306 performs bit modeling on the coefficient data according to the procedure stipulated by the JPEG2000 standard, and supplies information on control information, symbols, and context, and the like to the arithmetic encoding unit 307 as indicated by arrow 338. The arithmetic encoding unit 307 performs arithmetic encoding on the bit-planes of coefficients.

The size of the code block in length and width is expressed as a power of two from 4 to 256, and 32×32, 64×64, 128×32, and the like are usually used. The coefficient values are expressed by signed binary of n bits in which bit 0 to bit (n-2) represent LSB to MSB, respectively. The remaining one bit represents a sign. The encoding of the code block is performed in descending order of bit position from the MSB bit-plane, according to the following three kinds of encoding passes.

(1) Significant Propagation Pass
(2) Magnitude Refinement Pass
(3) Cleanup Pass

Figure 18:
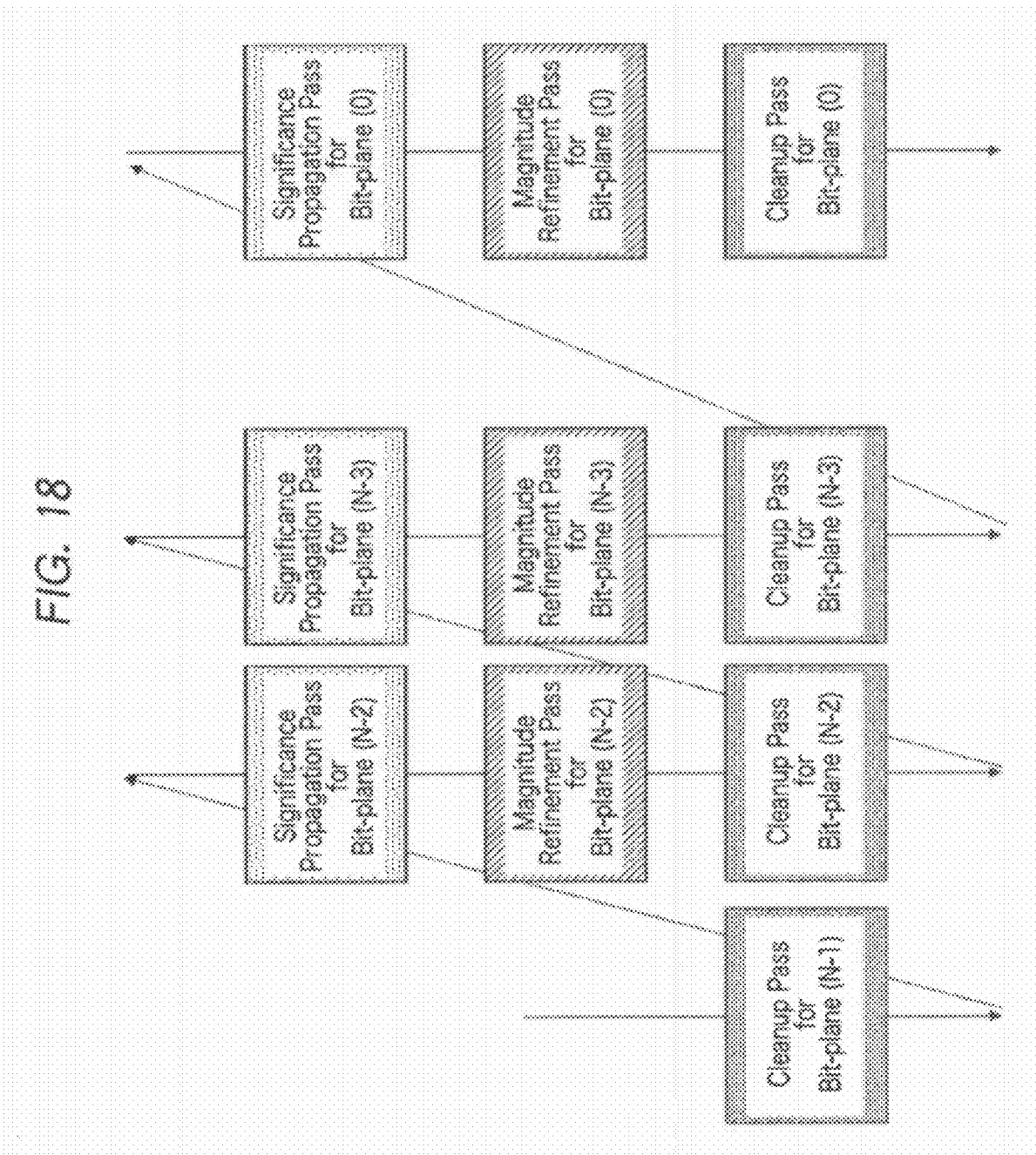
FIG. 18 is a diagram describing an example of encoding passes.

The order of using three encoding passes is illustrated in FIG. 18. First, Bit-plane (n-1) (MSB)is encoded by Cleanup Pass. Continuously, sequentially toward the LSB side, the encoding of each bit-plane is performed by using three encoding passes in the order of Significant Propagation Pass, Magnitude Refinement Pass, and Cleanup Pass.

However, information on the number of the bit-plane, when counted from the MSB side, in which value "1" actually appears first, is written in the header, and the bit-planes of all zeros consecutive from the MSB side (referred to as zero bit-planes) are not encoded. The trade-off between the amount of codes and the image quality is taken by repeatedly encoding by using three kinds of encoding passes in such order, and breaking off the encoding at an arbitrary pass of an arbitrary bit-plane (Rate control).

Figure 19:
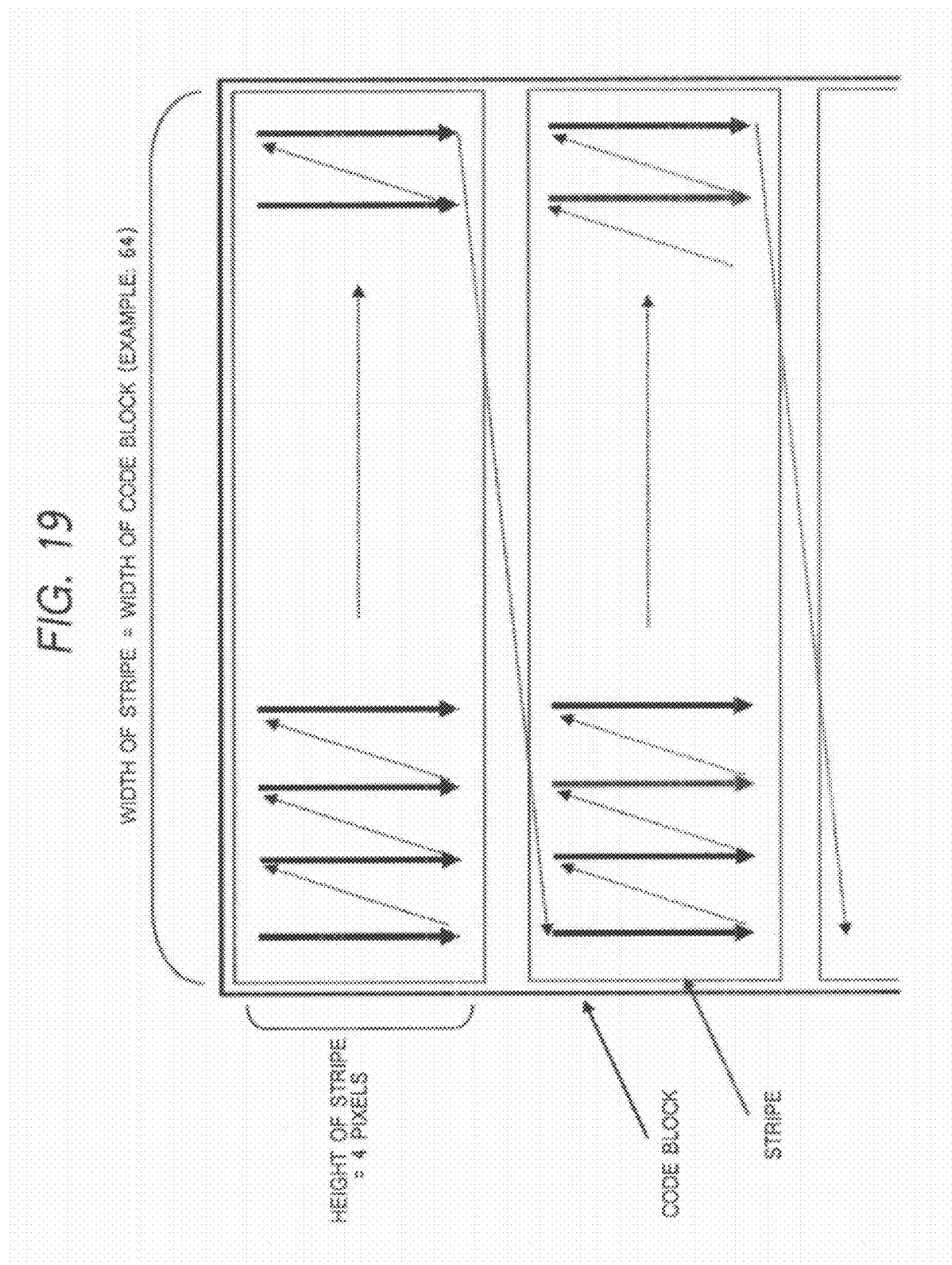
FIG. 19 is a diagram describing an example of scanning coefficients.

Next, scanning of coefficients is described referring to FIG. 19. The code block is divided into stripes in units of four coefficients in height. The width of the stripe is equal to the width of the code block. The order of scanning within one code bock is the order in which all coefficients can be read. That is, the coefficients are taken in a direction from the top stripe to the bottom stripe within one code bock, in a direction from the leftmost column to the rightmost column in one stripe, and in a direction from top to bottom in one column. All coefficients within one code block are processed in this order of scanning by each encoding pass.

Hereafter, three encoding passes are described. All parts of the following description are described in the written standard of JPEG-2000 (Reference: ISO/IEC 15444-1, Information technology-JPEG2000, Part 1: Core coding system).

(1) Significance Propagation Pass (SP Pass):

In Significance Propagation Pass that encodes a certain bit-plane, values of a bit-plane of non-significant coefficients in which at least one coefficient near 8 is significant are encoded by the arithmetic coding. When the value of the bit-plane which has been subjected to the encoding is 1, an MQ-encoding to indicate whether the sign is a plus sign (+) or a minus sign (−) is continuously performed.

Here, the term "significance" peculiar to JPEG2000 is described. The term "significance" means an encoder's state for each coefficient. The value of the significance is initially set to 0 which indicates being non-significant, changes to 1 which indicates being significant when 1 is encoded by the coefficient, and is maintained at 1 after that. Therefore, the significance can be referred to as a flag that indicates whether information of an effective digit has been already encoded. If the value becomes significant at a certain bit-plane, the state (being significant) is maintained for all the subsequent bit-planes.

(2) Magnitude Refinement Pass (MR Pass):

In Magnitude Refinement Pass that encodes a bit-plane, the value of the bit-plane of significant coefficients which have not yet been encoded by Significance Propagation Pass which encodes a bit-plane is MQ-encoded.

(3) Cleanup Pass (CU Pass):

In Cleanup Pass that encodes a bit-plane, the value of the bit-plane of the non-significant coefficients which have not been encoded by the Significance Pass that encodes a bit-plane is MQ-encoded. When the value of the bit-plane which has been encoded is 1, the bit-plane is continuously MQ-encoded to indicate whether the sign is + or − (Sign information).

In addition, in the MQ-encoding of the three encoding passes, ZC (Zero Coding), RLC (Run-Length Coding), SC (Sign Coding), and MR (Magnitude Refinement) are used properly used depending on cases. The arithmetic coding called the MQ-encoding is used here. MQ-encoding is a learning-type binary arithmetic coding stipulated in JBIG2 (reference: ISO/IEC FDIS 14492, "Lossy/Lossless Coding of Bi-level Images", March 2000).

Referring back to FIG. 13, the arithmetic encoding unit 307 supplies the generated code stream to the code amount addition unit 308 as indicated by arrow 339. The code amount addition unit 308 counts a code amount of the code stream and accumulates it.

Next, the code amount addition unit 308 supplies the code stream of the header creating unit 310 and the packet generation unit 311 as indicated by arrows 342 and 343, and also supplies a cumulative value of the code amount to the rate control unit 309 as indicated by arrow 340. The rate control unit 309 compares a target code amount supplied from the rate control unit 114 (see FIG. 1) and the supplied cumulative value of the code amount, and controls the EBCOT unit 321 to allow the following bit-plane to be encoded as indicated by arrow 341 when the cumulative value is smaller than the target code amount.

The EBCOT unit 321 encodes a bit-plane which is next important according to the control, and supplies the generated code stream to the code amount addition unit 308. The code amount addition unit 308 counts the code amount of the code stream, accumulates it, and supplies the cumulative value to the rate control unit 309.

The above-mentioned process is repeated until the cumulative value reaches the target code amount. And, when the cumulative value reaches the target code amount, the rate control unit 309 controls the EBCOT unit 321, and ends the encoding process.

The packet generation unit 311 packages the supplied coded code stream into packets. The header generation unit 310 generates the header information of the packet, and supplies the header information to the packet generation unit 311 as indicated by arrow 344. The packet generation unit 311 generates the packets using the header information.

Figure 20:
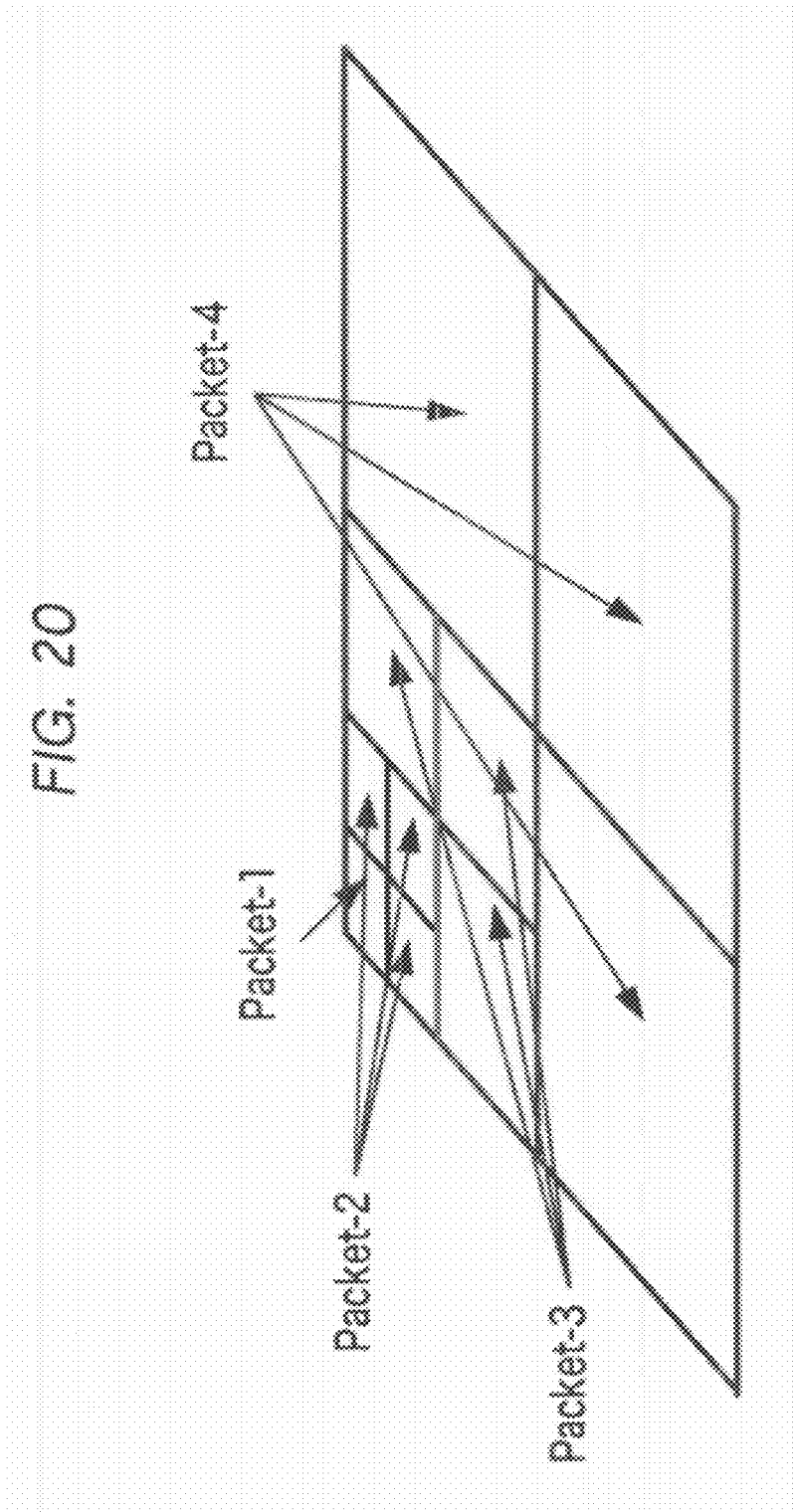
FIG. 20 is a diagram describing an example of the configuration of a packet.

FIG. 20 illustrates the concept of the packet. In the example illustrated in FIG. 20, it is shown that the wavelet transformation is performed three times. As a result, four packets including from the lowest band packet Packet-1 to the highest band packet Packet-4 are generated. Therefore, the coded code streams of all code blocks existing within each sub-band of each packet are packaged packet by packet.

The generated packet is output to the outside of the encoding unit 113 as indicated by arrow 345, and is supplied to the rate control unit 114 (FIG. 1).

In addition, the encoding unit may be configured as four encoding units including encoding units 113-1 to 113-4. In this case, since each of the encoding units 113-1 to 113-4 has the same configuration as the encoding unit 113 described above, the description thereof is not repeated.

[Bit-plane Development]

The most distinctive feature of the encoding according to the JPEG2000 system is encoding bit-plane by bit-plane. The coefficient data is expressed as two-dimensional data in JPEG and MPEG, but may be expressed as a plurality of planes of two-dimensional binary data in JPEG2000.

When component image data and depth data are separately encoded like conventional arts, each target rate is determined beforehand, and then encoded. Therefore, there are many cases where it is difficult to realize a highest efficient combination of encoding rates of the component image data and the depth data, and it is difficult to improve the encoding efficiency. On the other hand, the encoding unit 113 performs encoding while controlling the encoding rates of the component image data and the depth data at the same time by combining the component image data and the depth data.

Figure 21:
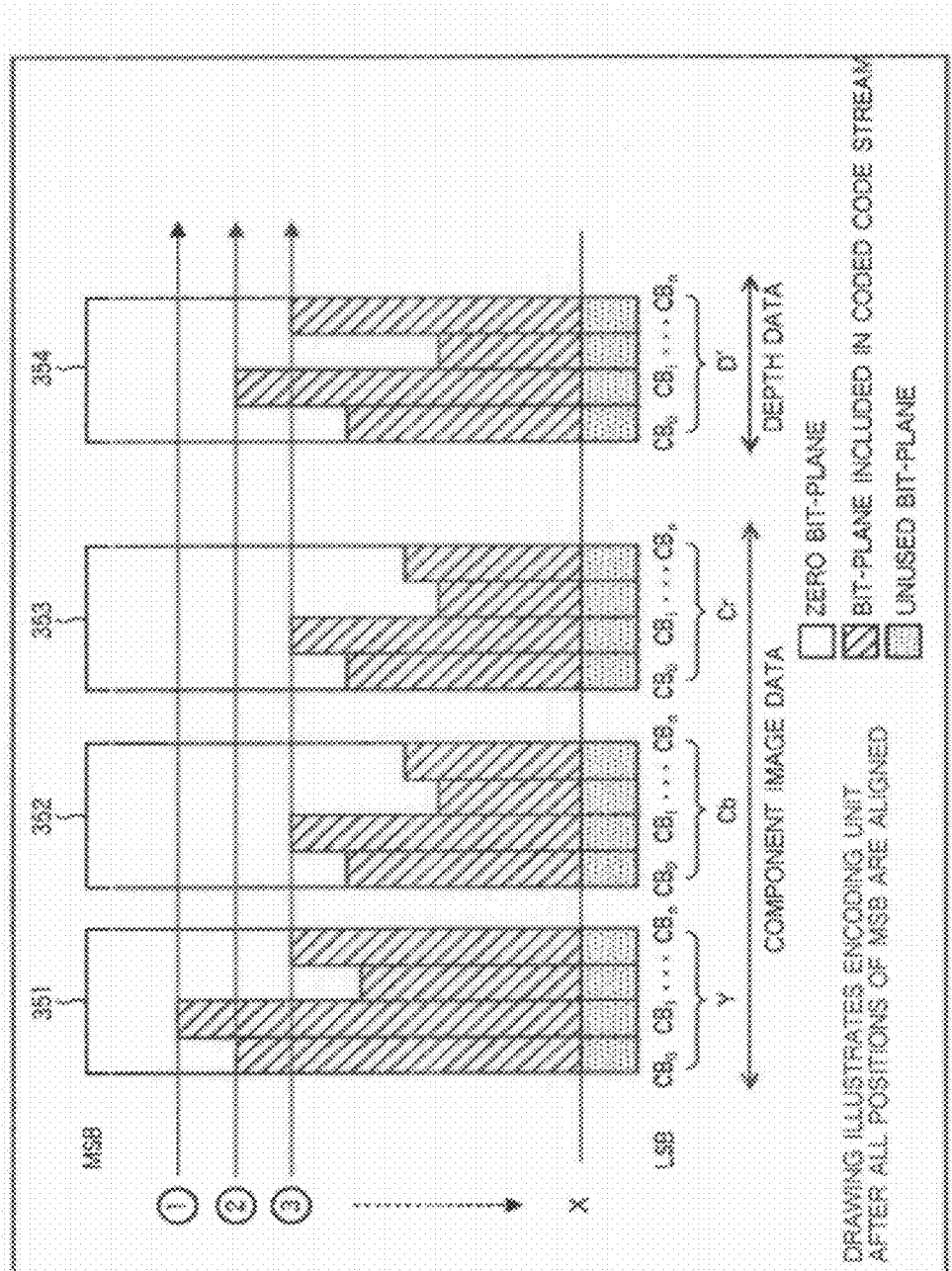
FIG. 21 is a diagram describing an appearance of bit-plane development.

FIG. 21 illustrates behavior of rate control after the bit depth of the depth data is adjusted to match the bit depth of the component image data. The encoder unit 113 performs the encoding basically in descending order of importance, that is, from the highest importance (bit on the MSB side) to the lowest importance (bit on the LSB side), largely different from the rate control method using an existing RD (Rate-Distortion) characteristic.

The encoder unit 113 performs its process by treating the component image data and the depth data as one component.

That is, the encoder unit 113 encodes the component image data and the depth data as component data of four components including the brightness data Y, the color difference data Cb, the color difference data Cr, and the depth data D'.

In an example illustrated in FIG. 21, the EBCOT unit 321 first performs the EBCOT on the bit-plane at the highest bit position within the brightness data Y. Since the EBCOT is not performed on the zero bit-plane where only coefficients other than 0 exist, the actually first target of the EBCOT is the bit-plane at a bit position of number "1" which is the highest bit position (the position near MSB). In addition, in FIG. 21, circled numbers are numbers representing bit positions.

In an example illustrated in FIG. 21, there is no bit-plane in which only a code block $CB_1$ of the brightness data has coefficient of value "1" at the bit position of number "1". Therefore, the EBCOT unit 321 performs the EBCOT only on the bit-plane of the code block $CB_1$ of the brightness data.

For the same bit position, the EBCOT is performed in order of the bit-plane of the brightness data Y, the bit-plane of the color difference data Cb, the bit-plane of the color difference data Cr, and the bit-plane of the depth data D'.

When the process for the bit position of number "1" ends, the process target moves to the following bit position (bit position one bit lower than that). That is, the bit-plane at the bit position of number "2" becomes the target of the EBCOT.

In the example illustrated in FIG. 21, for the bit position of number "2", the EBCOT is performed in order of the bit-plane of the code block $CB_0$ and the bit-plane of the code block $CB_1$ within the brightness data Y. Next, since the color difference data Cb and the color difference data Cr do not have bit-planes which have coefficients of value "1", the bit-plane of the code block $CB_1$ of the depth data D' becomes the next target of the EBCOT.

When the process for the bit position of number "2" ends, the process target moves to the bit position of number "3". In the example illustrated in FIG. 21, for the bit position of number "3", the target of the EBCOT moves in order of the bit-planes of the code blocks $CB_0$, $CB_1$, and $CB_n$ of the brightness data Y, the code block $CB_1$ of the color difference data Cb, the code block $CB_1$ of the color difference data Cr, and the code blocks $CB_1$, $CB_n$ of the depth data.

In this way, the EBCOT progresses, changing the process target bit by bit in a direction from the bit position of number "1" to the bit position of number "X", and from the highest bit to the lowest bit.

In addition, while the EBCOT is repeated in this way, the code amount addition unit 308 adds up the generated code amounts as described above.

In addition, in FIG. 21, for convenience of description, the description about sub-bands is not made regarding any of the brightness data Y, the color difference data Cb, the color difference data Cr, and the depth data D'. However, as illustrated in FIG. 16, code blocks actually exist in all of the sub-bands generated after the wavelet transformation. Therefore, only the code blocks within the sub-band become the target of the rate control illustrated in FIG. 21.

As described above, for JPEG2000 system, the encoding unit 113 searches all of the brightness data Y, the color difference data Cb, the color difference data Cr, and the depth data D' for the bit-planes that are not the zero bit-plane, in descending order of the bit position. Therefore, especially when the bit depth of the depth data is shallow compared with the image data, the priority of the depth data might be extremely lowered.

As described above, since the bit shift change is performed so that the bit depth of the depth data matches the bit depth of the image data, the image encoding apparatus 100 can reduce excessive priority bias among components when the target of the EBCOT is selected. As a result, for example, it is possible to suppress occurrence of a trouble that the depth data is hardly included in the coded data.

[Configuration of Decoding Unit]

Figure 22:
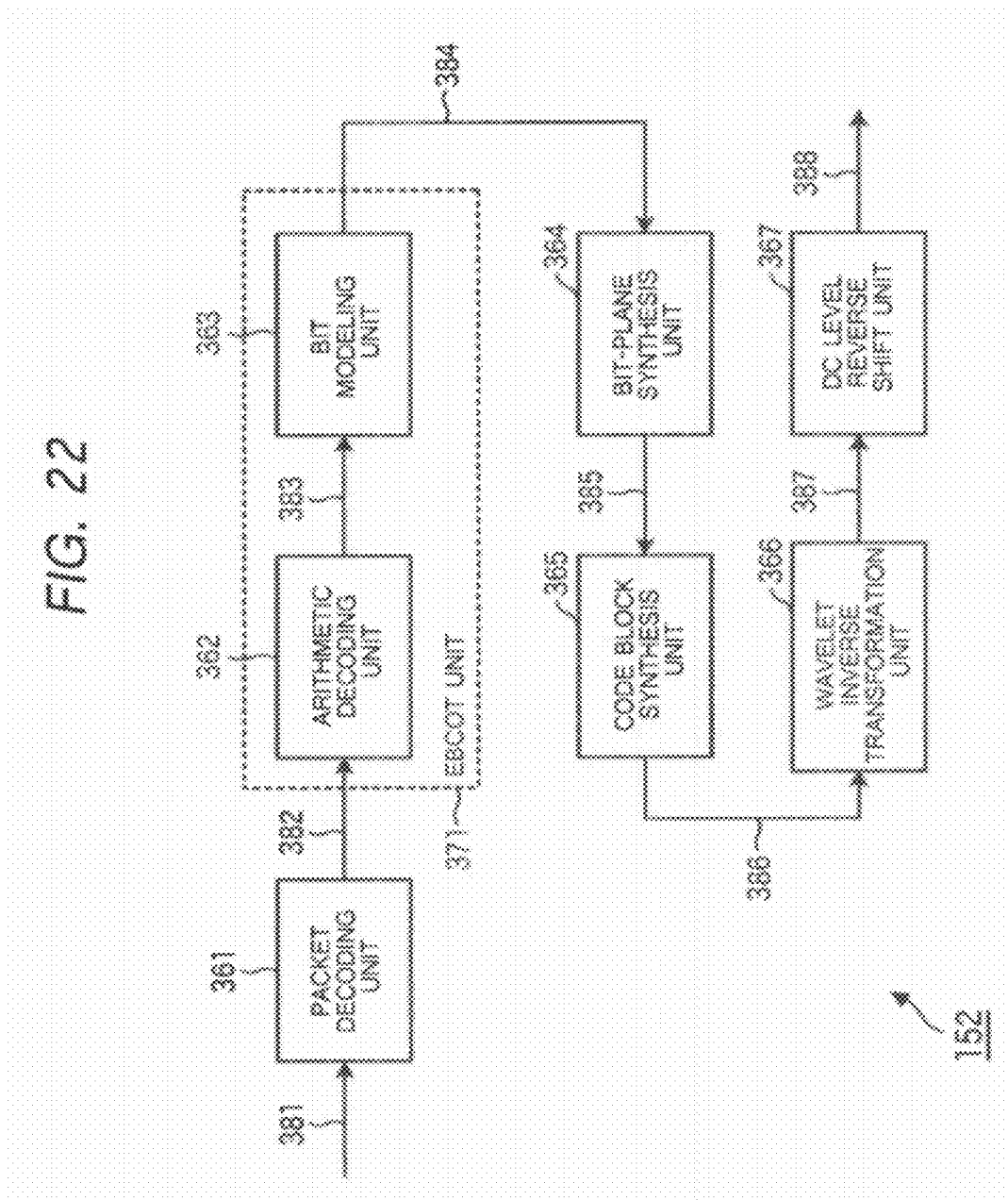
FIG. 22 is a block diagram illustrating another example of the configuration of the decoding unit of FIG. 4.

Next, the decoding unit 152 (see FIG. 4) corresponding to the encoding unit 113 is described. FIG. 22 is a block diagram illustrating an example of the main configuration of the decoding unit 152. As illustrated in FIG. 22, the decoding unit 152 can decode the coded data which is encoded according to the JPEG2000 system. That is, the decoding unit 152 can decode the coded data encoded by the encoding unit 113 illustrated in FIG. 13.

In FIG. 22, the decoding unit 152 includes a packet decoding unit 361, an arithmetic decoding unit 362, a bit modeling unit 363, a bit-plane synthesis unit 364, a code block synthesis unit 365, a wavelet inverse transformation unit 366, and a DC level reverse shift unit 367.

The packet decoding unit 361 decodes the packet supplied from the image encoding apparatus 100 as indicated by arrow 381, and supplies the code stream to the arithmetic decoding unit 362 as indicated by arrow 382.

The arithmetic decoding unit 362 and the bit modeling unit 363 function as the EBCOT unit 371, and performs entropy decoding called EBCOT stipulated in the JPEG2000 standard on the input code stream.

The arithmetic decoding unit 362 decodes the code stream by a method corresponding to the arithmetic encoding unit 307, and supplies the context to the bit modeling unit 363 as indicated by arrow 383. The bit modeling unit 363 generates the wavelet coefficients developed in the bit-plane by a method corresponding to the bit modeling unit 306. The bit modeling unit 363 supplies the coefficient data to the bit-plane synthesis unit 364 for each bit-plane generated as indicated by arrow 384.

The bit-plane synthesis unit 364 synthesizes the wavelet coefficients developed in the bit-plane. The bit-plane synthesis unit 364 supplies the wavelet coefficients used to synthesize the bit-plane to the code block synthesis unit 365 as indicated by arrow 385.

The code block synthesis unit 365 generates the coefficient data of each code block by using the supplied bit-plane, synthesizes them, and generates the coefficient data for each sub-band. The code block synthesis unit 365 supplies it to the wavelet inverse transformation unit 366 as indicated by arrow 386.

The wavelet inverse transformation unit 366 performs wavelet inverse transformation on the supplied wavelet coefficients, and generates the baseband image data. The wavelet inverse transformation unit 366 supplies the generated baseband image data to the DC level reverse shift unit 367 as indicated by arrow 387.

The DC level reverse shift unit 367 performs the DC level reverse-shift process on the DC components of the image data to return the DC components to the original state by an amount corresponding to the shift performed in the DC level shift unit 301, as necessary. The DC level reverse shift unit 367 outputs the image data obtained through the DC level reverse-shift process to the outside of the decoding unit 152 as indicated by arrow 388. More specifically, the component image data is output to the outside of the image decoding apparatus 150, and the depth data is supplied to the bit shift changing unit 153.

In addition, the decoding unit may be configured as four decoding units including decoding unit 152-1 to 152-4. In this case, since each of the decoding units 152-1 to 152-4 has the configuration similar to that of the decoding unit 152 described above, a description thereof is not repeated.

[Flow of Encoding Process]

Next, an example of the flow of an encoding process is described. First of all, an example of the flow of the encoding process performed by the encoding unit 113 is described referring to the flowchart of FIG. 23. This encoding process corresponds to step S105 and step S106 in FIG. 6.

When the encoding process is begun, in step S301, the encoding unit 113 acquires image data and depth data from an input system 331.

In step S302, the DC level shift unit 301 shifts the DC level of the image data and the depth data which are input in step S301. In step S303, the wavelet transformation unit 302 performs wavelet transformation on the image data and the depth data which has been DC-level-shifted in step S302.

In step S304, for a lossy coding system, the quantization unit 303 quantizes the wavelet coefficients generated from the image data and the depth data in step S303. For a lossless coding system, this process is not performed.

In step S305, the code blocking unit 304 divides the coefficient data of the image data and the depth data in units of a code block. In step S306, the bit-plane development unit 305 develops the coefficients in bit-planes for each code block divided in step S305.

In step S307, the EBCOT unit 221 performs entropy encoding on the coefficients of the image data and the depth data which have been developed in bit-planes in step S306.

In step S308, the rate control unit 309 controls the rate of the generated code amount by using a code amount added in the code amount addition unit 308 and a target code amount supplied from the rate control unit 114.

In step S309, the header generation unit 310 generates packet headers. In step S310, the packet generation unit 311 generates packets. In step S311, the encoder unit 113 outputs the packets outside.

When the process of step S311 ends, the encoding processing ends. In addition, the encoding process is repeatedly executed for each predetermined data unit until the supply of the image data and the depth data is stopped or an instruction of stopping the supply is received.

When the encoding unit is configured as encoding units 113-1 to 113-4, each of the encoding units 113-1 to 113-4 performs a similar process as the encoding unit 113.

[Flow of Entropy Encoding Process]

Figure 23:
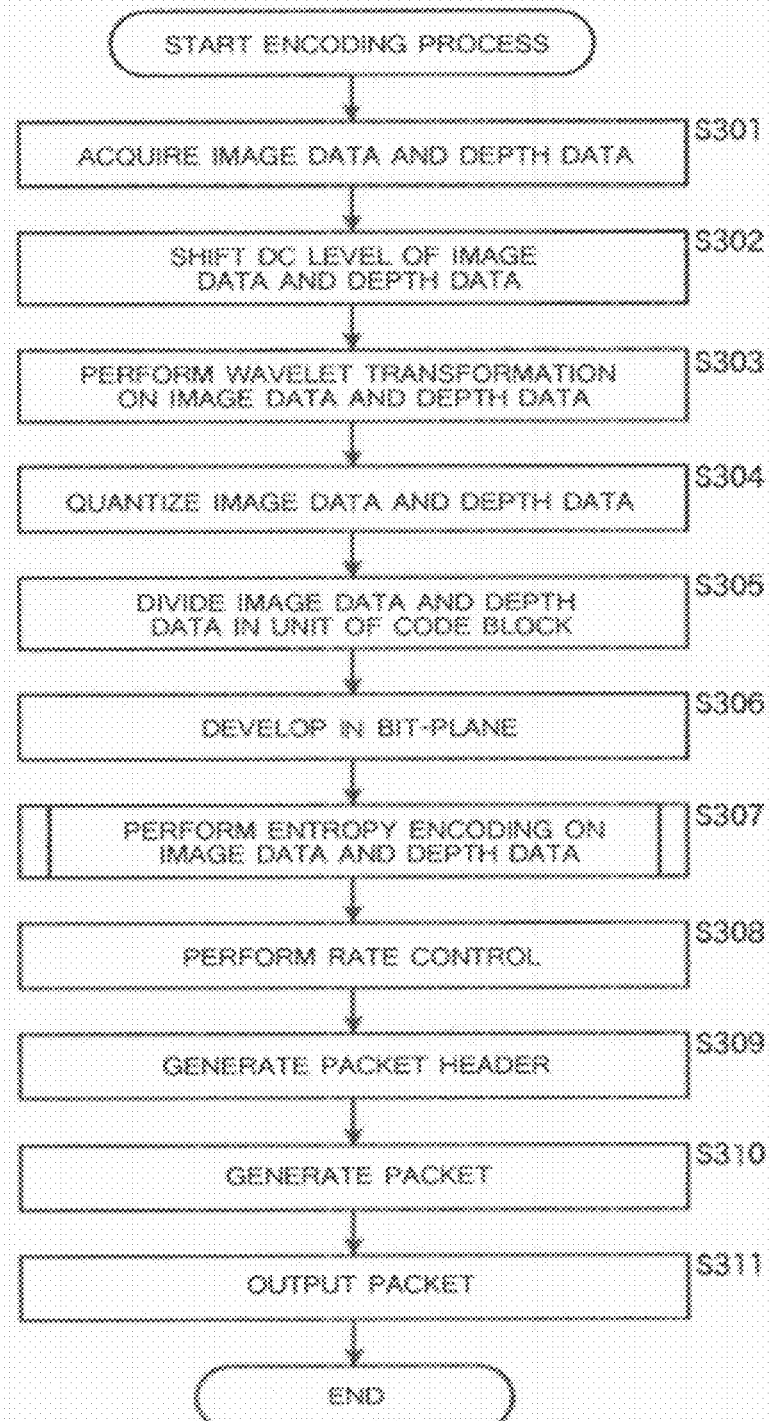
FIG. 23 is a flowchart describing another example of the flow of the encoding process.
Figure 24:
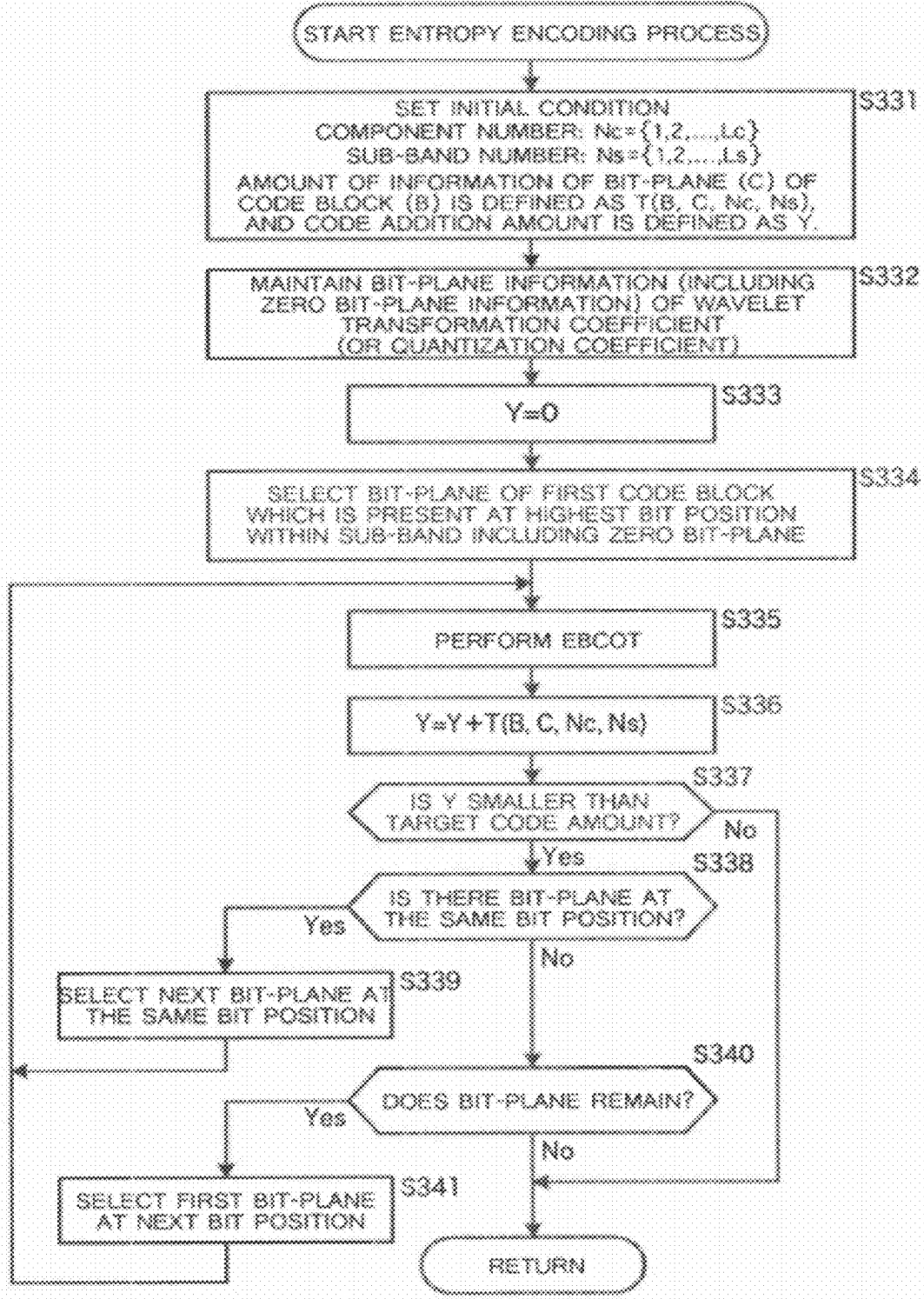
FIG. 24 is a flowchart describing an example of the flow of an entropy encoding process.

Next, an example of the flow of the entropy encoding process executed in step S307 of FIG. 23 is described referring to the flowchart of FIG. 24.

When the entropy encoding process is begun, the EBCOT unit 321 sets initial conditions in step S331. More specifically, the EBCOT unit 321 sets the component of the encoding target to Nc={1, 2, . . . , Lc}, sets the sub-band to Ns={1, 2, . . . , Ls}, assumes that an amount of information of the bit-plane (C) of the code block (B) is T(B, C, Nc, Ns), and assumes that a cumulative addition code amount is Y.

In step S332, at a point in time when the operation in the bit-plane development unit 305 of FIG. 13 ends, the EBCOT unit 321 retains bit-plane information (including zero bit-plane information) on the wavelet transformation coefficients or the quantized coefficients in a predetermined memory.

In step S333, the EBCOT unit 321 sets Y=0 as an initial value. In step S334, the EBCOT unit 321 selects the bit-plane of the first code block which is at the highest bit position within the sub-band including the zero bit-plane.

In step S335, the EBCOT unit 321 performs the EBCOT on the selected bit-plane. In step S336, the code amount addition unit 308 adds the amounts of the codes generated as a result of the process of step S335 by the following expression.

$$Y=Y+T(B, C, Nc, Ns) \qquad (1)$$

In step S337, the rate control unit 309 determines whether the addition code amount Y obtained by the addition of Expression (1) is below the target code amount acquired from the rate control unit 114. The rate control unit 309 proceeds to step S338 when it is determined that the addition code amount Y is below the target code amount.

In step S338, the EBCOT unit 321 determines whether there are any other bit-planes at the same bit position. The EBCOT unit 321 proceeds to step S339 when it is determined that there are any other bit-planes. In step S339, the EBCOT unit 321 selects the following bit-plane at the same bit position. The EBCOT unit 321 returns the process to step S335, and performs the EBCOT on the selected bit-plane.

Moreover, in step S338, the EBCOT unit 321 causes the process to proceed to step S340 when it is determined that there are no other bit-planes at the same bit position.

In step S340, the EBCOT unit 321 determines whether unprocessed bit-planes remain at a bit position one digit lower than the current bit position. When it is determined that there are unprocessed bit-planes, the process target of the EBCOT unit 321 moves to the bit-plane at a bit position one digit lower, and the EBCOT unit 321 selects the bit-plane of the first code block. The EBCOT unit 321 returns the process to step S335, and performs the EBCOT on the selected bit-plane.

Moreover, in step S340, the EBCOT unit 321 ends the entropy encoding process, returns the process to step S307 in FIG. 23, and performs the process of step S308 and the subsequent steps when unprocessed bit-planes do not exist.

In addition, in step S337, the rate control unit 309 ends the entropy encoding process, returns the process to step S307 in FIG. 23, and performs the process of step S308 and the subsequent steps when it is determined that addition code amount Y exceeds the target code amount.

[Flow of Decoding Process]

Figure 25:
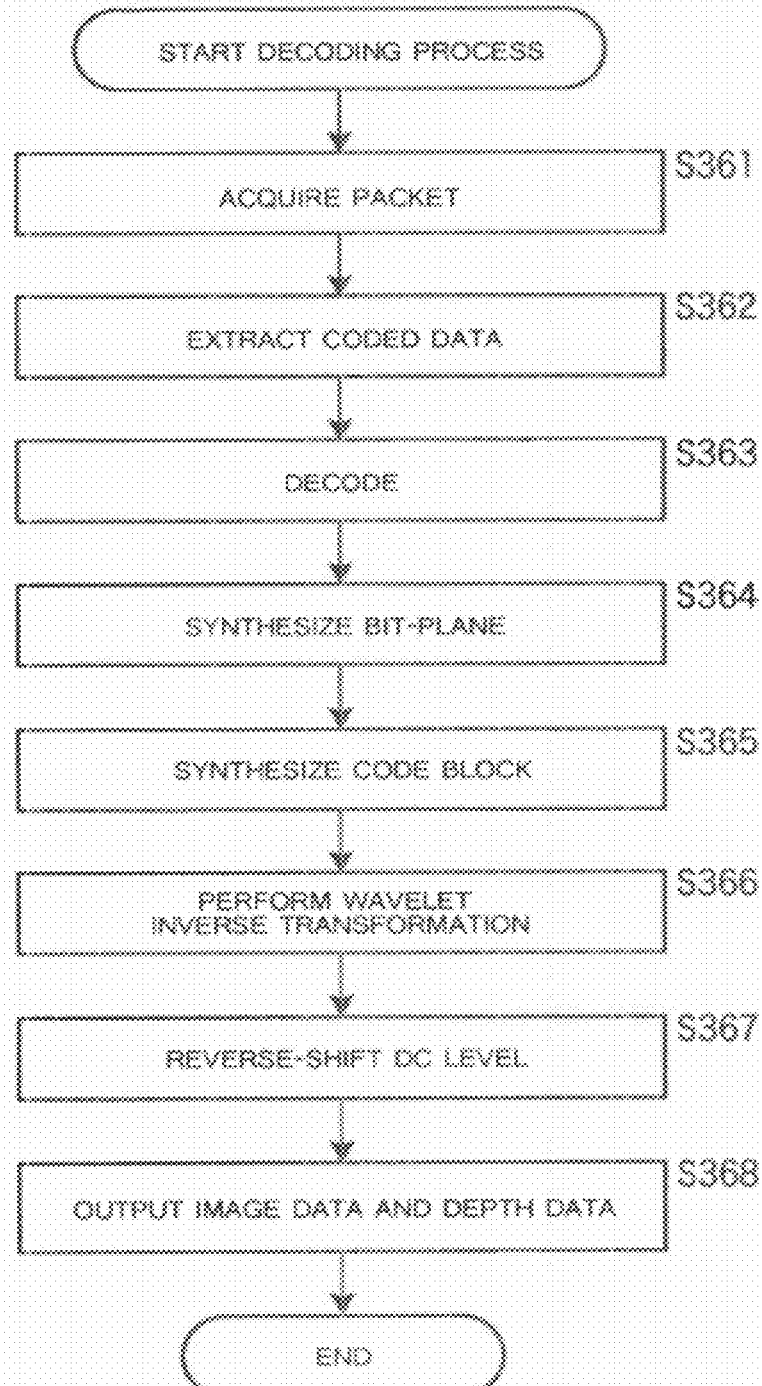
FIG. 25 is a flowchart describing an example of the flow of a decoding process.

FIG. 25 is a flowchart describing an example of the flow of a decoding process. This decoding process corresponds to step S123 in FIG. 7.

When the decoding process is begun, in step S361, the decoding unit 152 acquires packets of coded data from the input system 381. In step S362, packet decoding unit 361 extracts the coded data from the packet acquired in step S361.

In step S363, the EBCOT unit 371 decodes the coded data which is extracted in step S362. In step S364, the bit-plane synthesis unit 364 synthesizes bit-planes of the coefficient data which is obtained by the process of step S363, and generates the coefficient data for each code block.

In step S365, the code block synthesis unit 365 synthesizes the code block of the coefficient data generated by the process of step S364, and generates the coefficient data of each sub-band.

In step S366, the wavelet inverse transformation unit 366 performs the wavelet inverse transformation on the coefficient data of each sub-band generated by the process of step S365, and generates the baseband image data. In step S367, the DC level reverse shift unit 367 reversely shifts the DC level of the baseband image data generated by the process of step S366.

In step S368, the decoding unit 152 outputs the image data which has been subjected to the DC level reverse shift process in step S367 from the output system 388 as decoded image data. For example, the decoded image data is output, for example, to a display (not illustrated), and the image is displayed.

When the process of step S368 ends, the decoding unit 152 ends the decoding process. The decoding unit 152 repeats such a decoding process for each process unit.

When the decoding unit is configured as decoding units 152-1 to 152-4, each of the decoding units 152-1 to 152-4 performs a similar process to the decoding unit 152.

As mentioned above, an encoding apparatus/a decoding apparatus of the JPEG2000 system can be used as the encoder unit 113 (encoder units 113-1 to 113-4) and the decoder unit 152 (decoder units 152-1 to 152-4). In this case, the image encoding apparatus 100 can encode the image data and the depth data which can give a stereoscopic vision more efficiently. Moreover, the image decoding apparatus 150 can decode the image data and the depth data which can give a stereoscopic vision which have been encoded in this way speedily and more suitably.

[Order of Selection of Sub-band]

Incidentally, the above description has been made in connection with a case where each data of the component image data is selected in descending order of priority, that is, in order of the brightness data Y, the color difference data Cb, the color difference data Cr, and the depth data D' as a process target and the EBCOT is performed (FIG. 21).

The selection of the process target is performed in the similar order within each component. For example, the code blocks of the sub-band with higher priority are preferentially selected.

Figure 26:
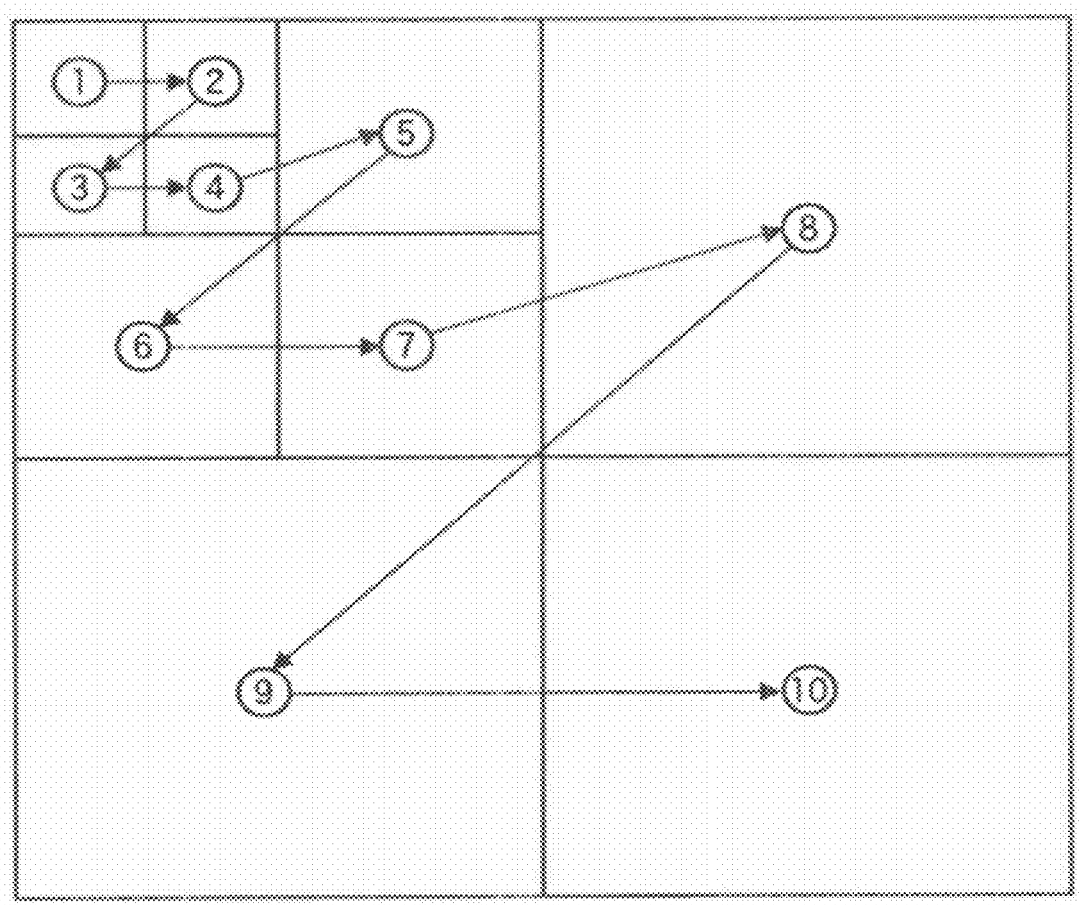
FIG. 26 is a diagram illustrating order of selection of sub-bands.

FIG. 26 is a diagram illustrating the order of selection priority for each sub-band. As described above, more energy generally concentrates on the sub-band with lower band components. Therefore, the sub-band of the lower band components is more important and has higher priority.

Therefore, for example in a case where a bit-plane at a certain bit position is selected within one component, the bit-plane of the code block of the each sub-band may be selected in the order from the low band component to the high band component. The circled numbers illustrated in FIG. 26 represents the preferential order of each subplace temperature. In other words, when a bit-plane that is not the zero bit-plane exists at a certain bit position, the bit-plane of the code block of the sub-band with a lower number is the most preferentially selected.

Of course, since the way to put the priority of each sub-band is arbitrary, the preferential order of the selection of this each sub-band is also arbitrary. For example, when the description is made using the numbers illustrated in FIG. 26, each sub-band may be selected in order of 1→3→2→4→5→ ..., or 1→2→4→3→5→ ..., or 1→3→4→2→5→ .... Of course, it may be different order from the above.

The selection in such order is made within each component. At this point, the preferential order of the sub-band may be different from component to component.

Moreover, weighting factors that reflect the degree of importance for each sub-band may be defined, and the quantized coefficients may be multiplied by the weighting factors to correct the values.

Figure 27:
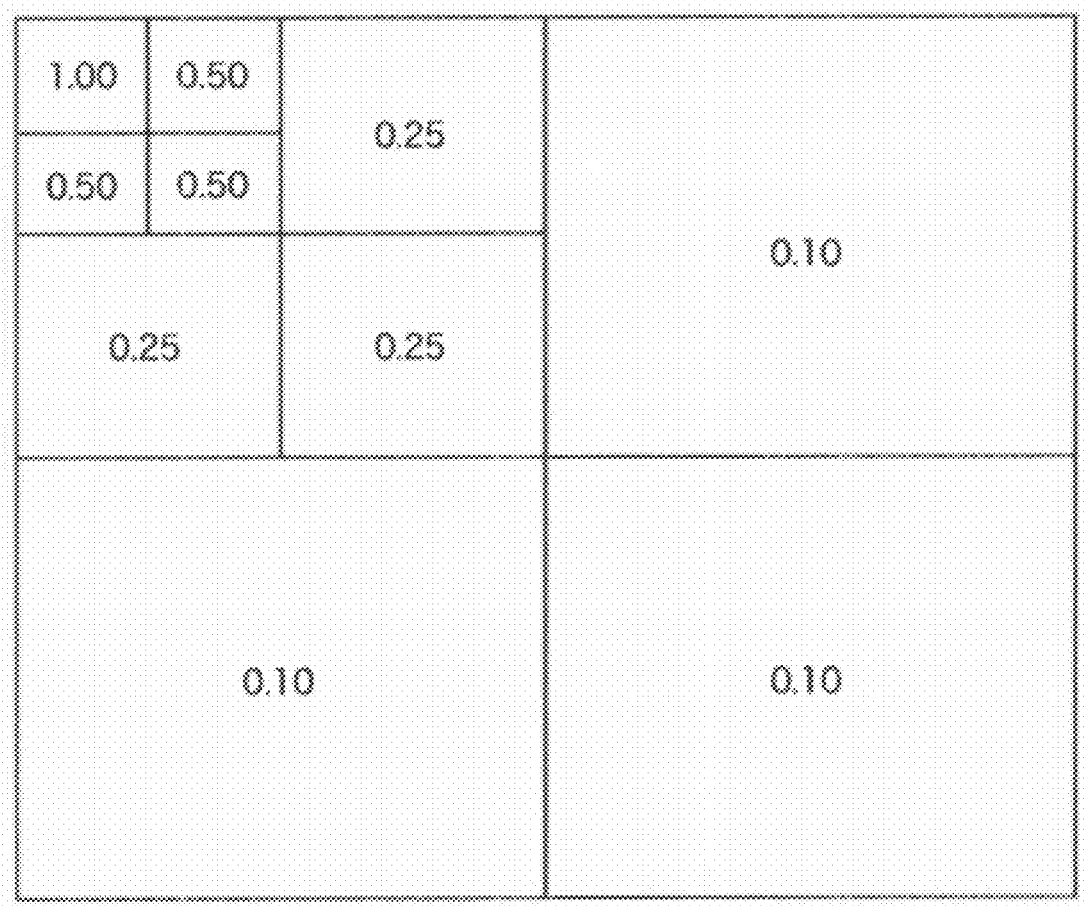
FIG. 27 is a diagram describing an example of weighting sub-bands.

FIG. 27 is a diagram illustrating an example of weighting factors defined for respective sub-bands. As for the example of FIG. 27, since the coefficient of the sub-band of the lowest band (the sub-band in a left upper portion of the drawing) is "1.0", the value does not change for this sub-band even if the quantized coefficient is multiplied by the weighting factor.

On the other hand, for other sub-bands, the higher the band, the lower value the weighting factor has. Therefore, for these sub-bands, the values are decreased when the quantized coefficients are multiplied by the weighting factors. That is, the number of bit-planes of non-zeros decreases. The higher the band, the higher the degree. As described above, since the selection of the process target is made in the order from the upper bit to the lower bit, that is, in a direction from the upper bit to the lower bit, the order selected as a process target is lower as the sub-band has higher band components.

Thus, the order selected as the process target of the EBCOT can be controlled by correcting the value of the quantized coefficient by using the weighting factor.

Incidentally, as described above, when there is a plurality of components, the priority of each component is in order of the brightness data Y, the color difference data Cb, the color difference data Cr, and the depth data D'.

Research reports on the reason come from various organizations. That is, the reason is that a setting the code amount which allocates a larger code amount to the component image data than the depth data contributes to an overall improvement in image quality.

In the depth data, there is a possibility that the coding efficiency changes depending on the band of the sub-band. Moreover, a case where a visual influence on the decoded image increases is also considered. Therefore, even for the depth data with low priority, it is desirable that the priority of each sub-band is suitably controlled according to the apparatus, the contents of an image, or the usage of an image.

In general, when importance is put on a lower band of the sub-band of the depth data, there is a possibility that ringing occurs at a boundary portion because the boundary line between different subjects (for example, between a person and the background, or the like) becomes dim. Conversely, when importance is put on a higher band, since a planar portion of the depth image, that is, a portion in which undulations do not exist is generated, there is a possibility that undulations are generated in the decoded image.

<2. Second Embodiment>
[Configuration of Image Encoding Apparatus]

When an encoder of the JPEG2000 system is used as the encoding unit described above, the bit shift change of the depth data may be performed in the encoding unit.

Figure 28:
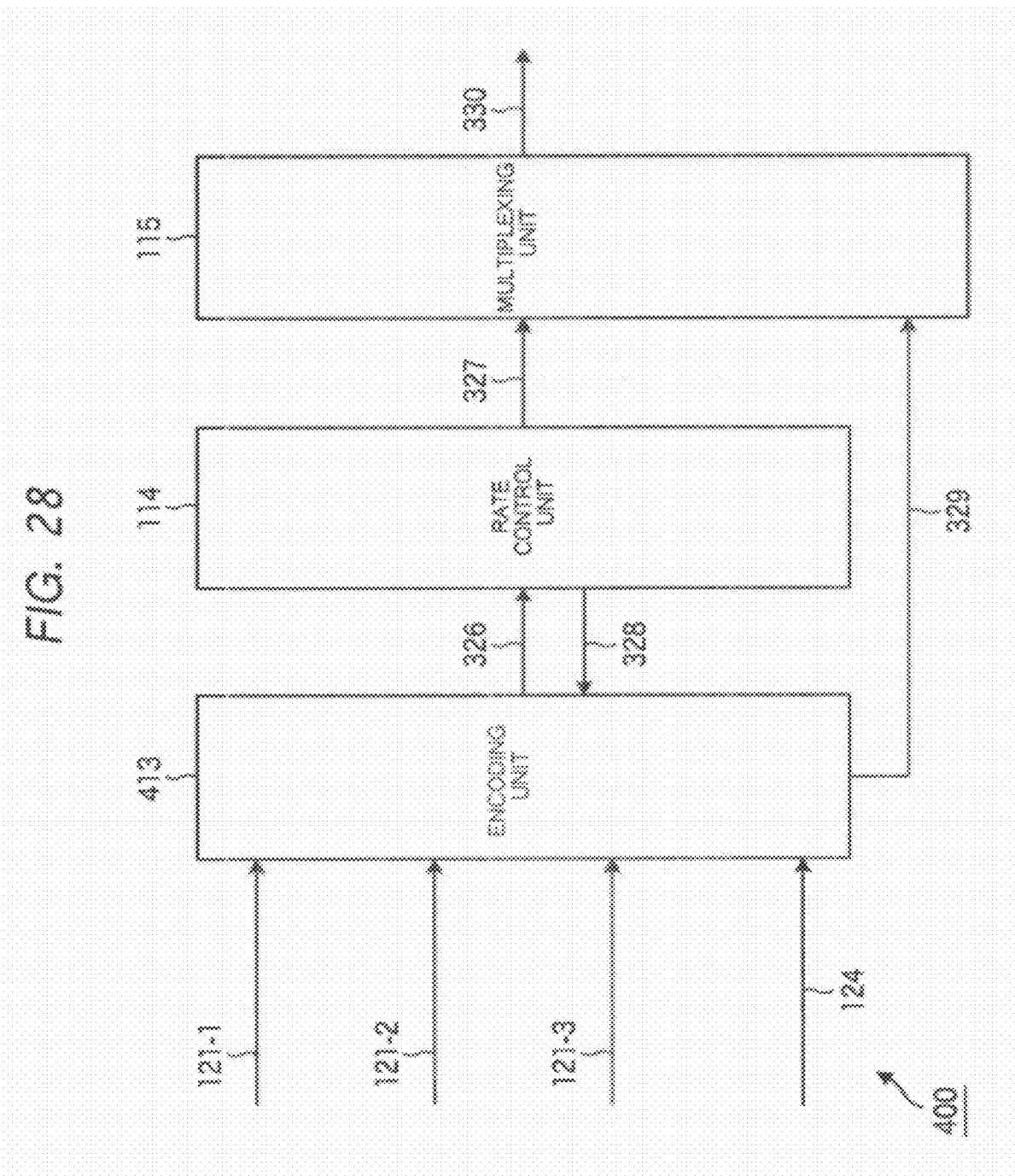
FIG. 28 is a block diagram illustrating another example of the configuration of the image encoding apparatus to which the invention is applied.

FIG. 28 is a block diagram illustrating another example of the configuration of the image encoding apparatus to which the invention is applied.

An image encoding apparatus 400 illustrated in FIG. 28 is an apparatus similar to the image encoding apparatus 100 of FIG. 1, and has a configuration basically similar to that of the image encoding apparatus 100. However, the image encoding apparatus 400 may not include the bit depth detection unit 111 and the bit shift changing unit 112, but may include an encoding unit 413 instead of the encoding unit 113.

The encoding unit 413 performs a detection of bit depths of image data and depth data D and a bit shift change of the depth data D inside thereof. Accordingly, component image data (brightness data Y (arrow 121-1), color difference data Cb (arrow 121-2), and color difference data Cr (arrow 121-3)) which has been input to the image encoding apparatus 400 is supplied to the encoding unit 413. In addition, the depth data D which is externally input is also supplied to the encoding unit 413 (arrow 124).

The encoding unit 413 encodes the supplied component image data and depth data D according to the JPEG2000 system, supplies coded data that is the result of the encoding to the rate control unit 114 (arrow 326), and acquires rate control information that specifies a target code amount, from the rate control unit 114 (arrow 328). Moreover, the encoding unit 413 detects the bit depths of the image data and the depth data D, shifts the bits of the depth data D according to the detection result, and supplies bit shift change information that indicates a shift amount to a multiplexing unit 115 (arrow 329).

[Configuration of Encoding Unit]

Figure 29:
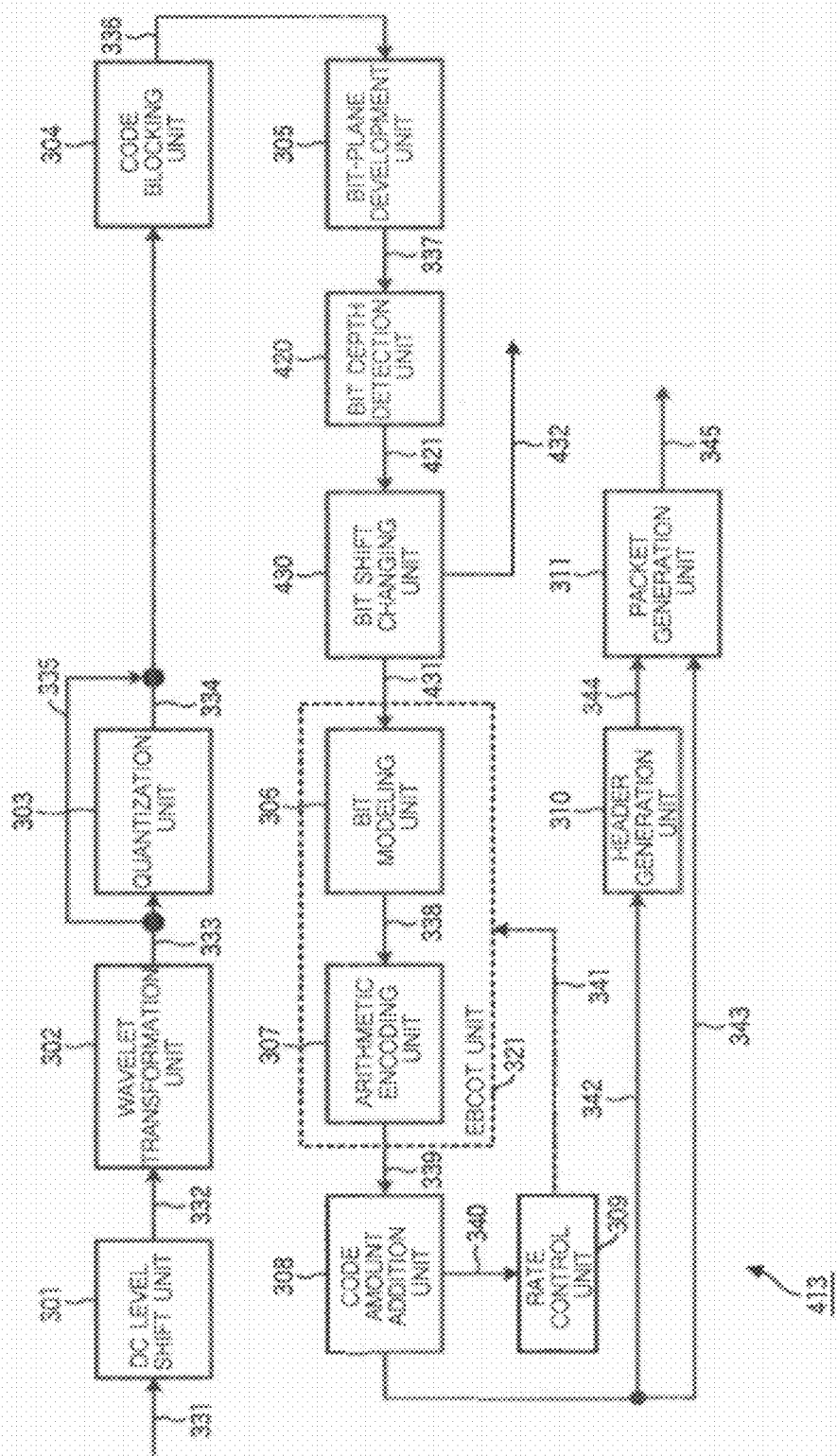
FIG. 29 is a block diagram describing an example of the main configuration of an encoding unit of FIG. 28.

Next, details of the encoding unit 413 are described. FIG. 29 is a block diagram describing an example the main configuration of the encoding unit 413 of FIG. 28.

The encoding unit 413 has a configuration basically similar to that of the encoding unit 113 referring to FIG. 13 and performs a process similar to that of the encoding unit 113. However, the encoding unit 413 includes a bit depth detection unit 420 and a bit shift changing unit 430 between a bit-plane development unit 305 and an EBCOT unit 321.

The bit depth detection unit 420 has a configuration basically similar to that of the bit detection unit 111, and performs a similar process thereof. However, coefficient data of the image data and the depth data D which is developed in bit-planes is supplied from a bit-plane development unit 305 to the bit depth detection unit 420 (arrow 337). The bit depth detection unit 420 detects the bit depth of each item of the coefficient data. The bit depth detection unit 420 supplies each coefficient of the coefficient data which is developed in bit-planes and the detection results thereof (information that indicates the bit depths of the image data and the depth data D) are supplied to the bit shift changing unit 430 (arrow 421).

The bit shift changing unit 430 shift-changes bits of the coefficient data of the depth data D among each coefficient of the coefficient data, which is developed in bit-planes, supplied from the bit depth detection unit 420. This shift changing method is the same as that of the bit shift changing unit 112 except that the process target is not baseband data but the coefficient data which has been subjected to wavelet transformation.

However, in this case, since bits of the coefficient data are shifted, there is a possibility that the shift amount may be different from the case of the first embodiment. The bit shift changing unit 430 shift-changes the bits of the coefficient data of the depth data D so that the bit depth of the coefficient data of the depth data D matches the bit depth of the coefficient data of the component image data.

The bit shift changing unit 430 supplies the coefficient data of the component image data to an EBCOT unit 321 without shift changing the bits (arrow 431). Moreover, the bit shift changing unit 430 supplies the coefficient data of depth data D' obtained as a result of the shift changing to the EBCOT unit 321 (arrow 431). In addition, the bit shift changing unit 430 supplies bit shift-change information that indicates a shift amount of the coefficient data of the depth data D to a multiplexing unit 115 (arrow 432).

In this case, the shift changing includes all of shift up, shift down, and no-shift changing (0 bit shift).

Each of other processes is the same as the case of the encoding unit 113 illustrated in FIG. 13.

[Example of Shift Up]

Figure 30:
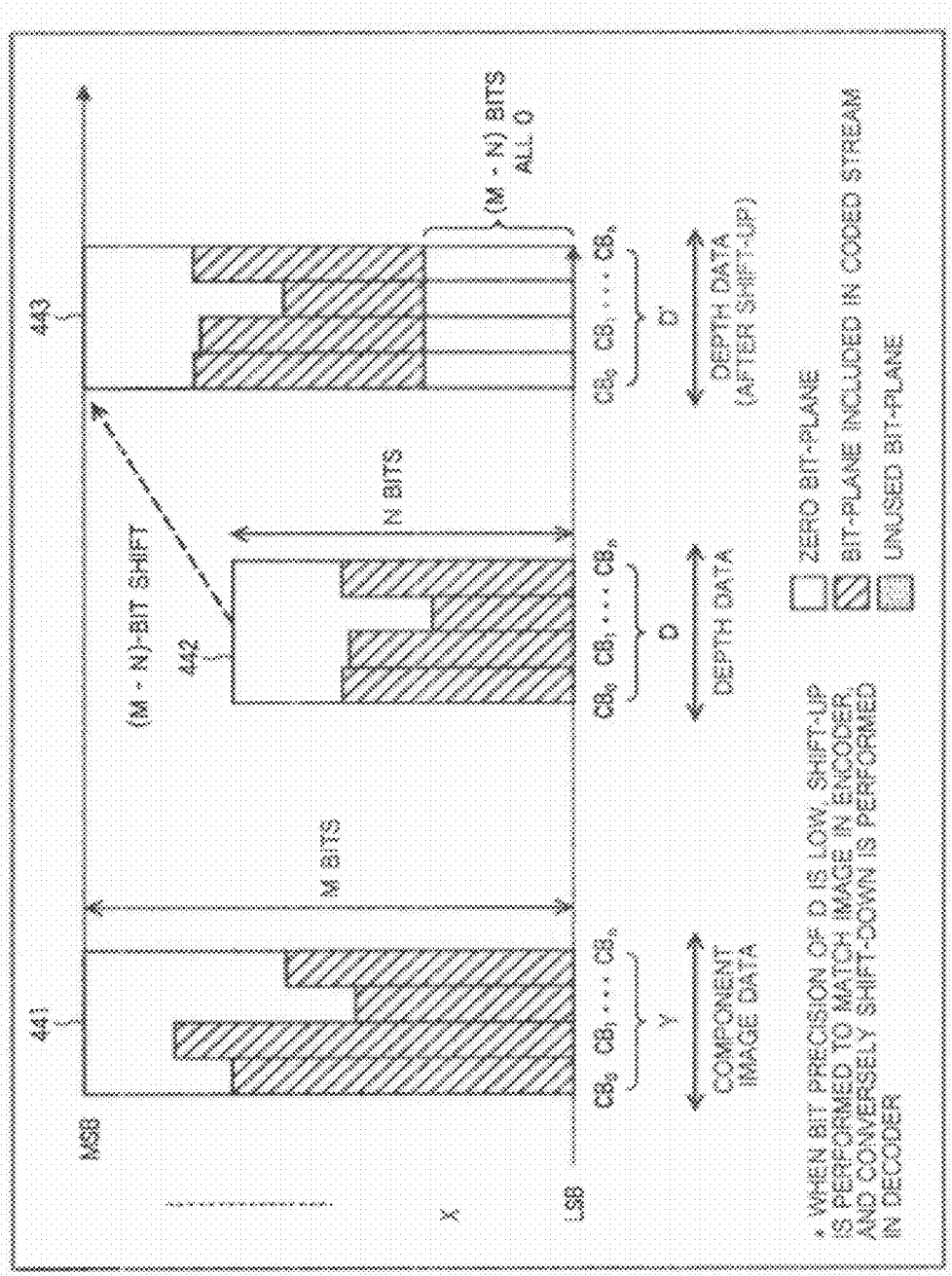
FIG. 30 is a diagram describing an example of a shift-up operation.

FIG. 30 is a diagram describing an example of the shift up of this case.

As illustrated in FIG. 30, when coefficient data 441 of the component image data (herein, only brightness data Y is illustrated for convenience of description) is M bits, and the coefficient data of the depth data D is N bits (M>N), the bit shift changing unit 430 shifts up the coefficient data of the depth data D by a shift amount of (M−N) bits, and fills (M−N) bits at lower bit positions with zero (Depth data D). The bit shift changing unit 430 supplies coefficient data 443 of this depth data D' to the EBCOT unit 321.

When performing shift changing within the encoding unit in this way, for example, at the time of reading the coefficient data which is stored in a buffer or the like, the coefficient data may be handled assuming that it has been shift-changed, and it may be stored actually without increasing a data amount. Therefore, by performing the shift changing within the encoding unit, a memory capacity to store the coefficient data at least before the EBCOT is performed may be suppressed. Moreover, since omission of the bit shift changing unit 112 is allowed, it is possible to suppress an increase in circuit size and cost.

[Configuration of Image Decoding Apparatus]

Figure 31:
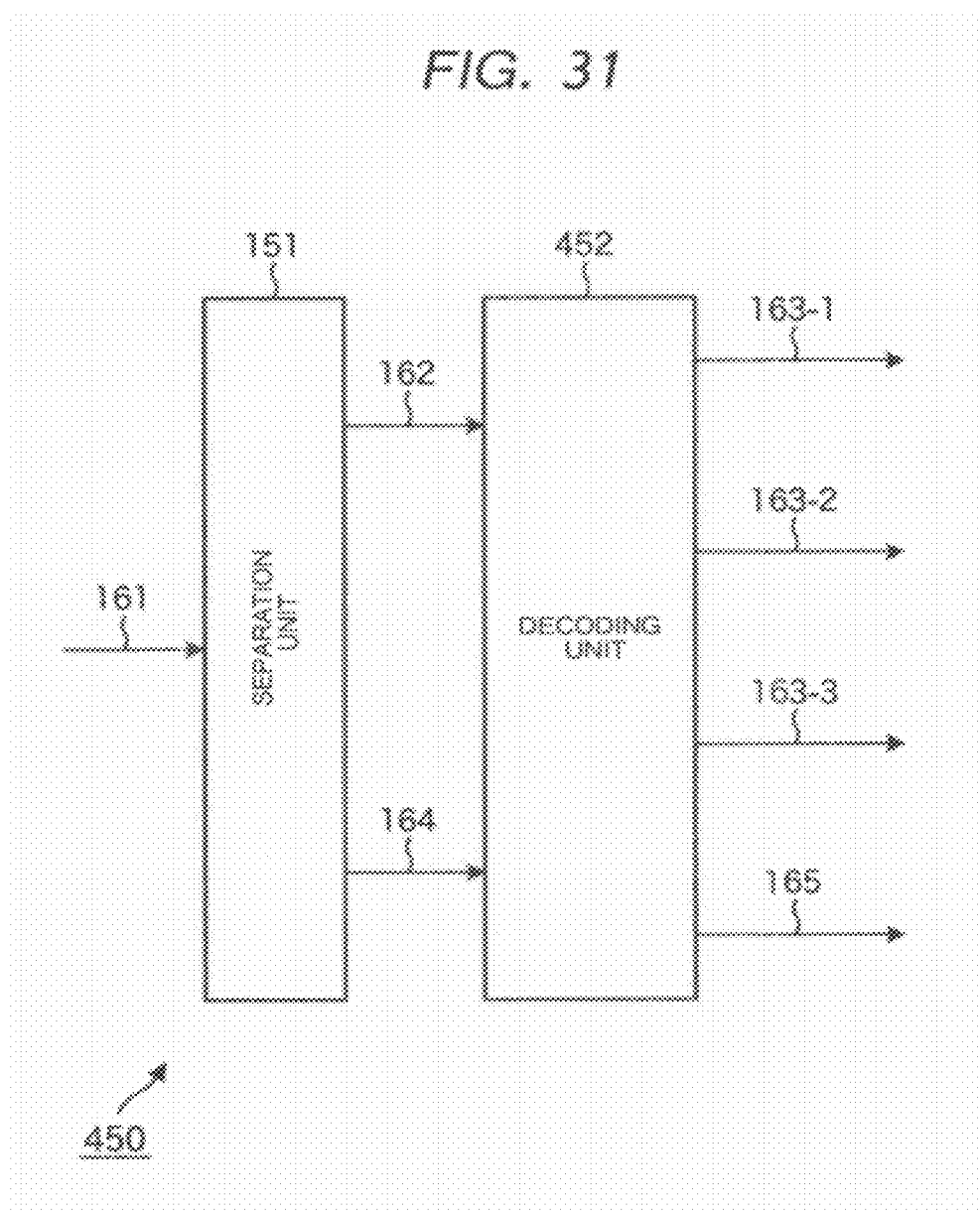
FIG. 31 is a block diagram illustrating other example of the configuration of the image decoding apparatus to which the invention is applied.

FIG. 31 illustrates an example of the configuration of an image decoding apparatus corresponding to the image encoding apparatus. In FIG. 31, although an image decoding apparatus 450 has the configuration basically similar to the image decoding apparatus 150 of FIG. 4, the bit shift changing unit 153 is omitted, and a decoding unit 452 is included instead of the decoding unit 152. In this case, the separation unit 151 separates bit shift change information from the image data and the depth data. The separation unit 151 supplies the image data, the depth data, and the bit shift change information to the decoding unit 452 (arrow 162 and arrow 163).

That is, the decoding unit 452 shift-changes bits of the depth data D' inside thereof. The decoding unit 452 outputs not only the component image data (arrow 163-1 to arrow 163-3) but also the depth data D' which has been subjected to shift changing (arrow 165).

[Configuration of Decoding Unit]

Figure 32:
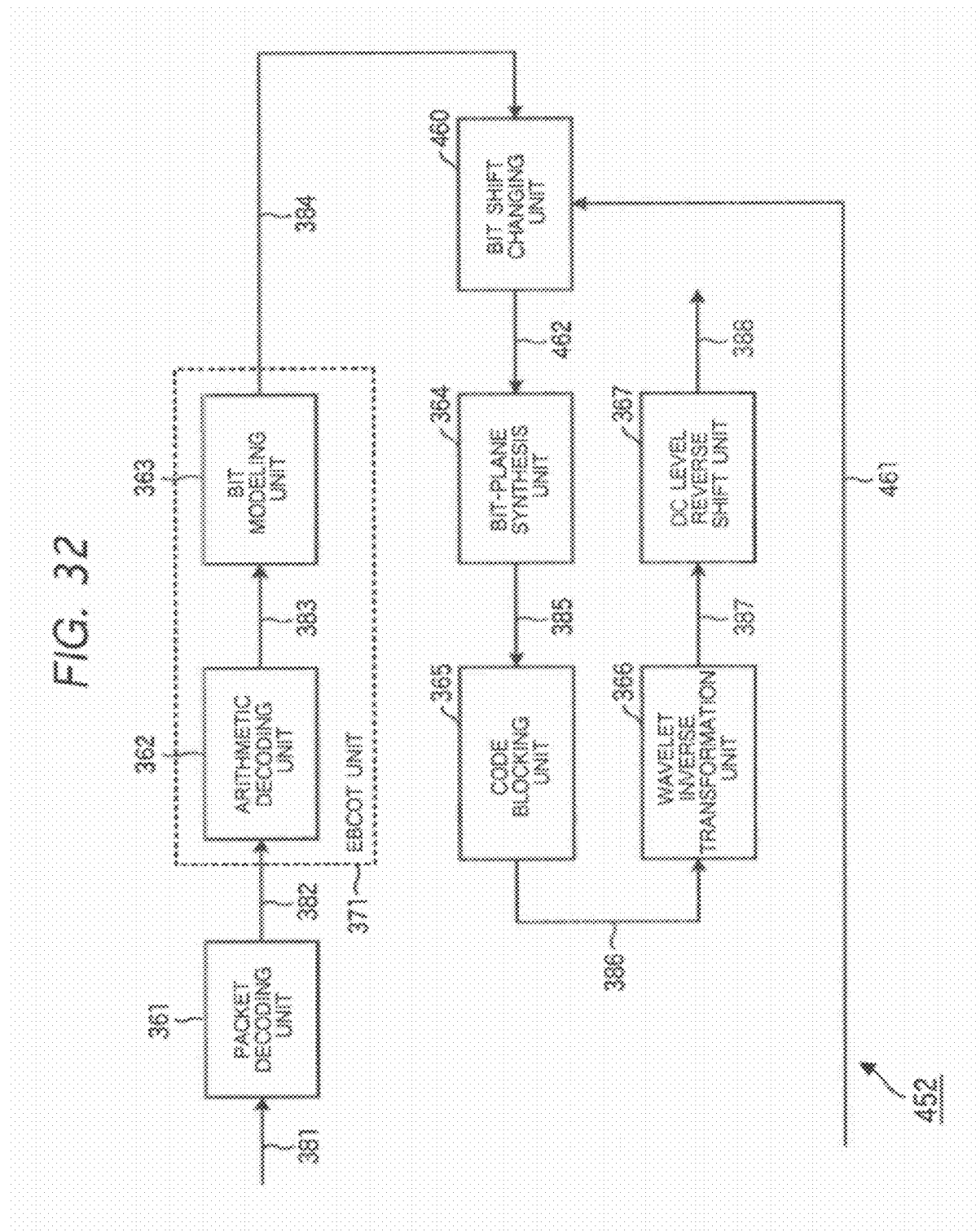
FIG. 32 is a block diagram describing an example of the main configuration of a decoding unit of FIG. 32.
Figure 33:
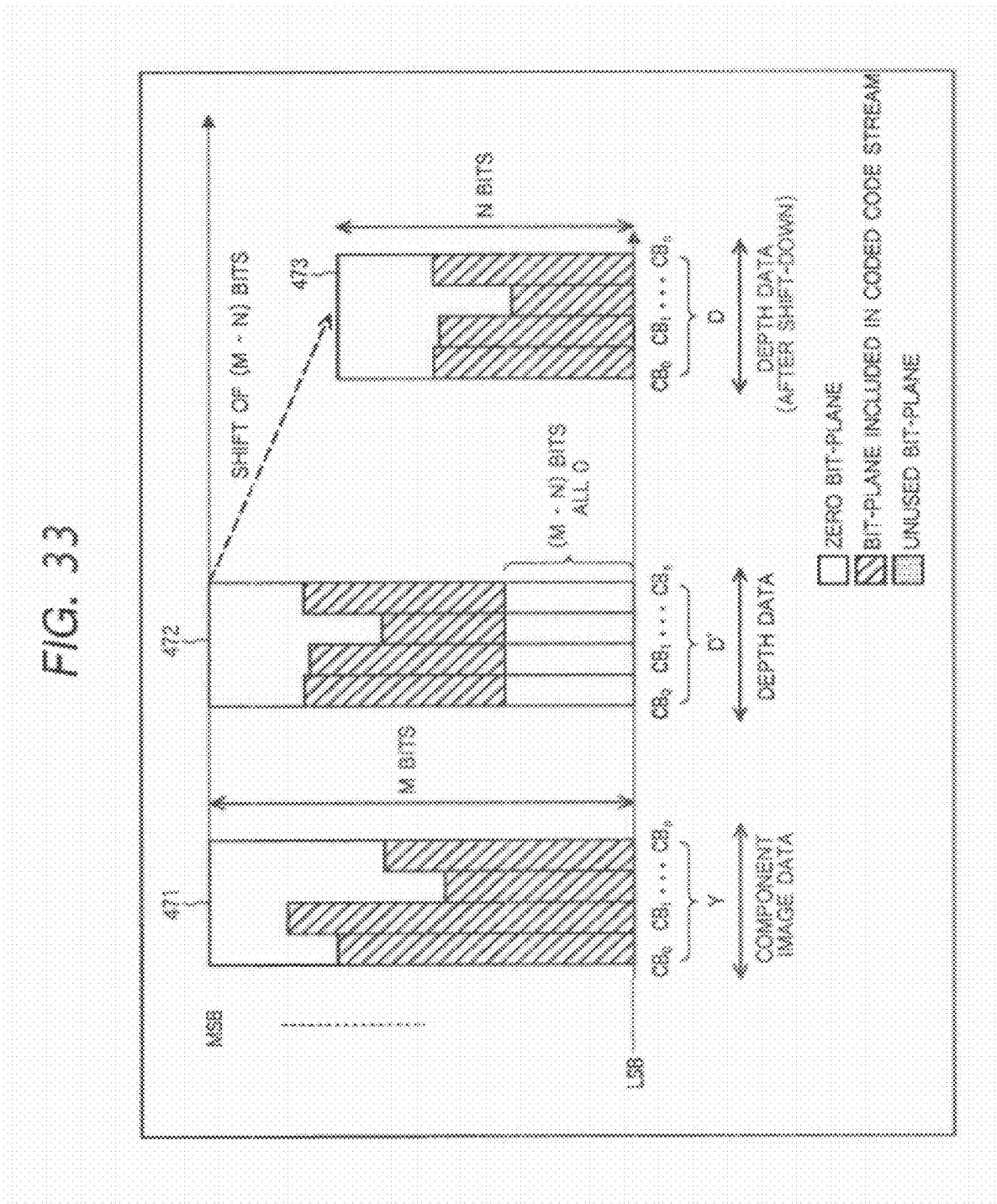
FIG. 33 is a diagram describing an example of a shift-down operation.

FIG. 32 is a block diagram describing an example of the main configuration of the decoding unit 452 of FIG. 31.

The decoding unit 452 illustrated in FIG. 32 has a configuration basically similar to that of the decoding unit 152 illustrated in FIG. 22. However, the decoding unit 452 includes a bit shift changing unit 460 between an EBCOT unit 371 and a bit-plane synthesis unit 364.

This bit shift changing unit 460 performs a process basically similar to that of the bit shift changing unit 153 except that the process target is the coefficient data of the depth data D'. The bit shift changing unit 460 shift-changes the coefficient data of the depth data D' in a reverse direction to the shift changing performed by the bit shift changing unit 430 by a shift amount indicated in the bit shift change information supplied from a decomposing unit 151 (arrow 461=arrow 164).

The bit shift changing unit 460 supplies the depth data D which has been shift-changed to the bit-plane synthesis unit 364 (arrow 462).

[Example of Shift Down]

For example, when the coefficient data of the depth data D is shifted up by (M−N) bits, the bit shift changing unit 460 deletes the (M−N) bits, which are lower bits of the coefficient data of the depth data D', filled with zero and shift down the upper N bits.

When the shift changing is performed inside the decoding unit, the depth data which has been shift-changed inside the encoding unit can be restored to the original bit depth.

[Flow of Encoding Process]

Figure 34:
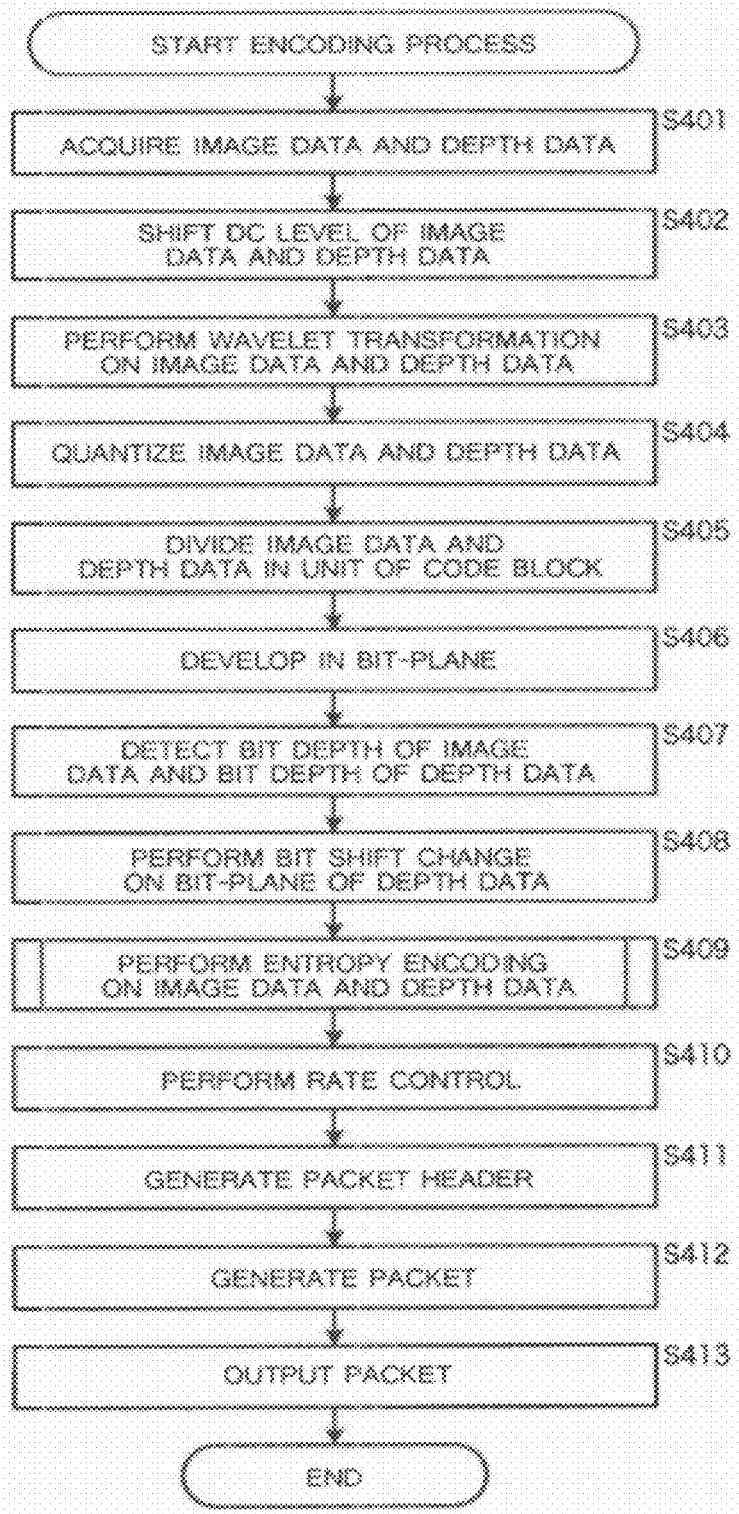
FIG. 34 is a flowchart describing another example of the flow of the encoding process.

Next, an example of the flow of each process is described. First of all, an example of the flow of the encoding process executed by the encoding unit 413 is described referring to the flowchart of FIG. 34.

Figure 6:
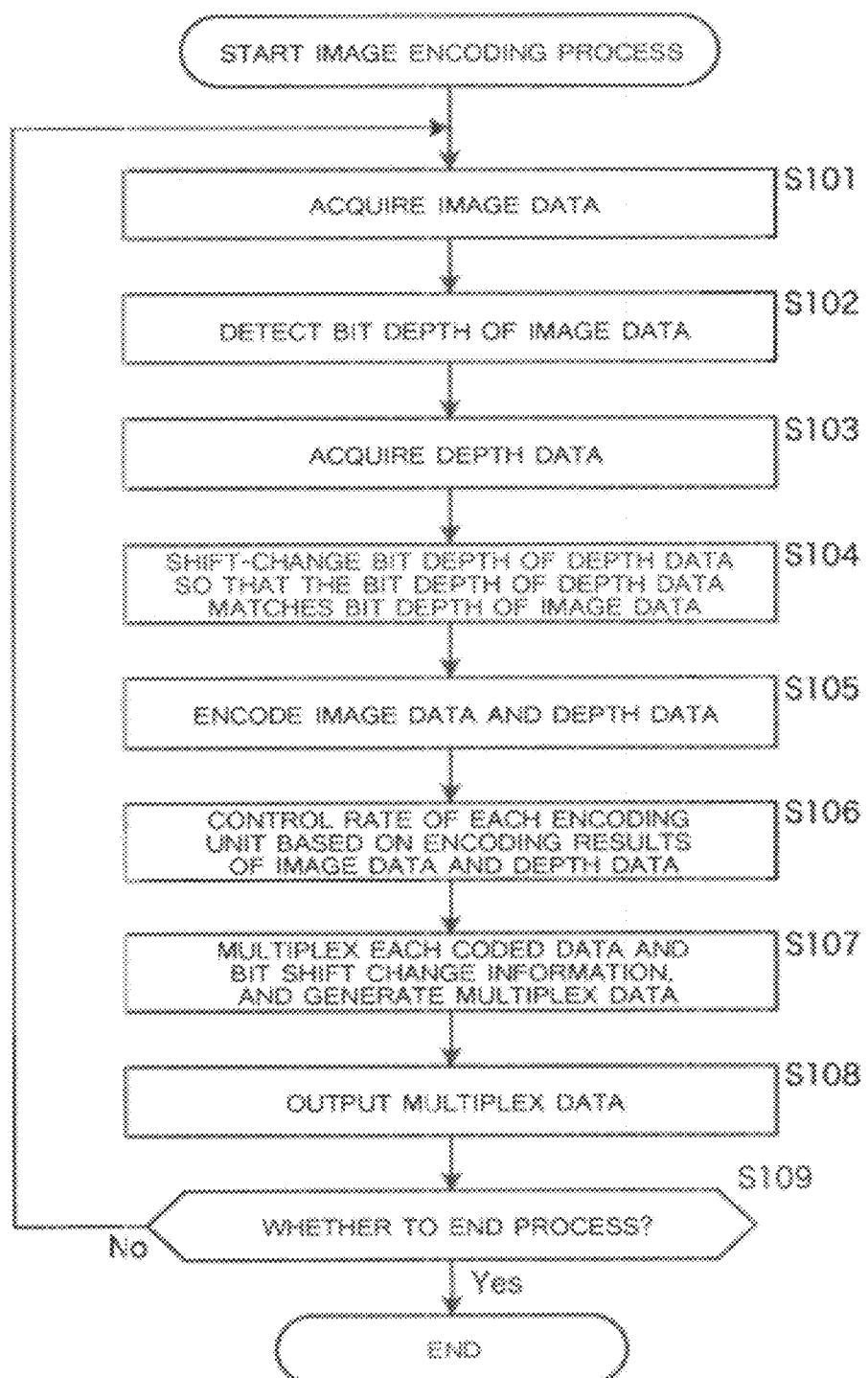
FIG. 6 is a flowchart describing an example of the flow of an image encoding process.

Since the image encoding process executed by the image encoding apparatus 400 is the same as the image encoding process described referring to FIG. 6 except that the process of step S104 is omitted, a description thereof is not repeated.

Moreover, the encoding process by the encoding unit 413 is also similar to the encoding process described referring to FIG. 23 basically. However, in step S407, the bit depth detection unit 420 detects each of the bit depths of the coefficient data of the image data and the coefficient data of the depth data which have been developed in bit-planes in step S406.

In step S408, the bit shift changing unit 430 shift-changes bits of the coefficient data of the depth data D based on the bit depth of each coefficient data detected in step S407 so that the bit depth of the coefficient data of the depth data D matches the bit depth of the coefficient data of the image data. In step S408, the EBCOT unit 321 performs entropy encoding on the image data, and the depth data D' which has been shift-changed.

Each process in steps S401 to S406 and steps S409 to S413 is performed in a similar manner to each process in steps S301 to S311 of FIG. 23.

[Flow of Decoding Process]

Figure 35:
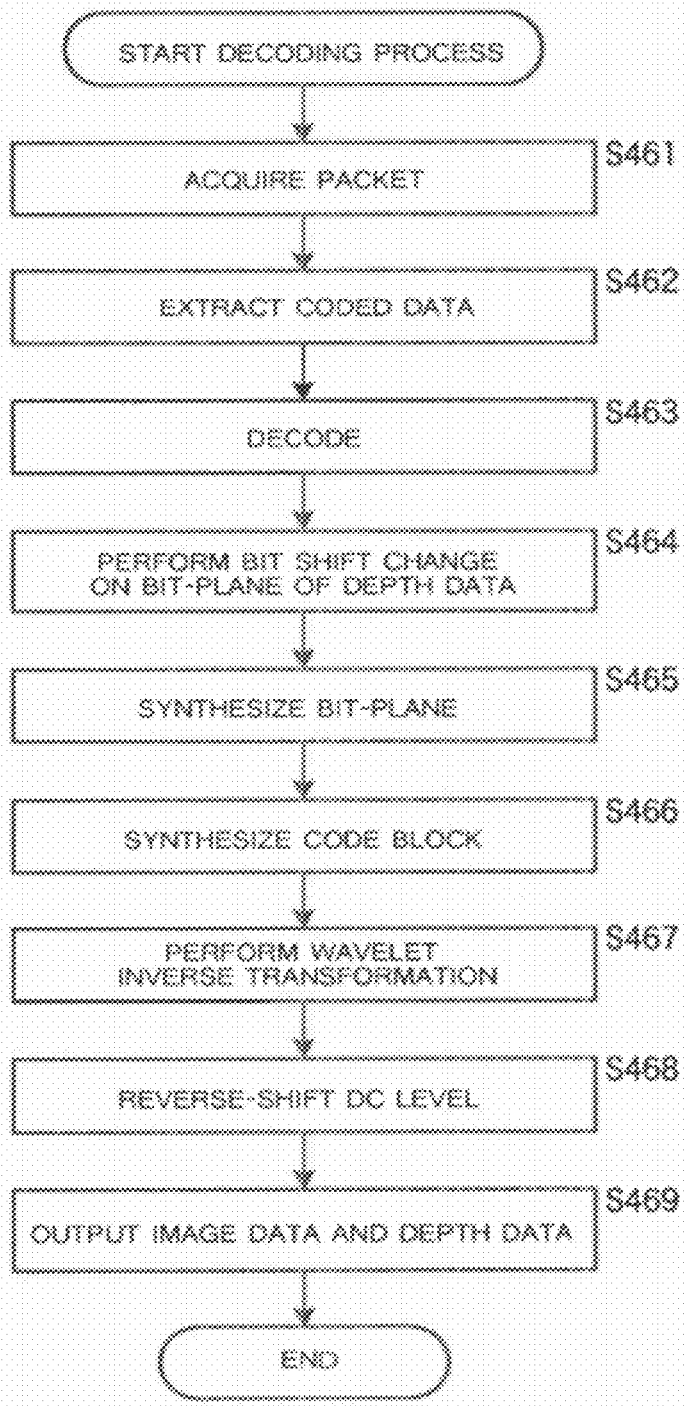
FIG. 35 is a flowchart describing another example of the flow of the decoding process.

Next, an example of the flowchart of the decoding process performed by the decoding unit 452 is described referring to the flowchart of FIG. 35. Since the image decoding process executed by the image decoding apparatus 450 is similar to the image decoding process described referring to FIG. 7 except that the process of step S124 is omitted, a description thereof is not repeated.

Moreover, the decoding process by the decoding unit 452 is also similar to the decoding process described referring to FIG. 25 basically. However, in step S464, the bit shift changing unit 460 shift-changes the bits of the coefficient data of the depth data D which has been decoded in step S463.

In step S465, the bit-plane synthesis unit 364 synthesizes the bit-planes for each of the image data and the depth data D.

Each process in steps S461 to S463 and steps S465 to S469 is performed in a similar manner to each process in steps S361 to S368 of FIG. 25.

As described above, the bit shift of the coefficient data may be performed in the encoder unit 413 and the decoder unit 452. In this case, the image encoding apparatus 400 may encode the image data and the depth data which can give a stereoscopic vision more efficiently. Moreover, the image decoding apparatus 450 may decode the image data and the depth data, which can give a stereoscopic vision which has been encoded in the way described above, speedily and more suitably.

<3. Third Embodiment>

[Configuration of Image Encoding Apparatus]

Figure 36:
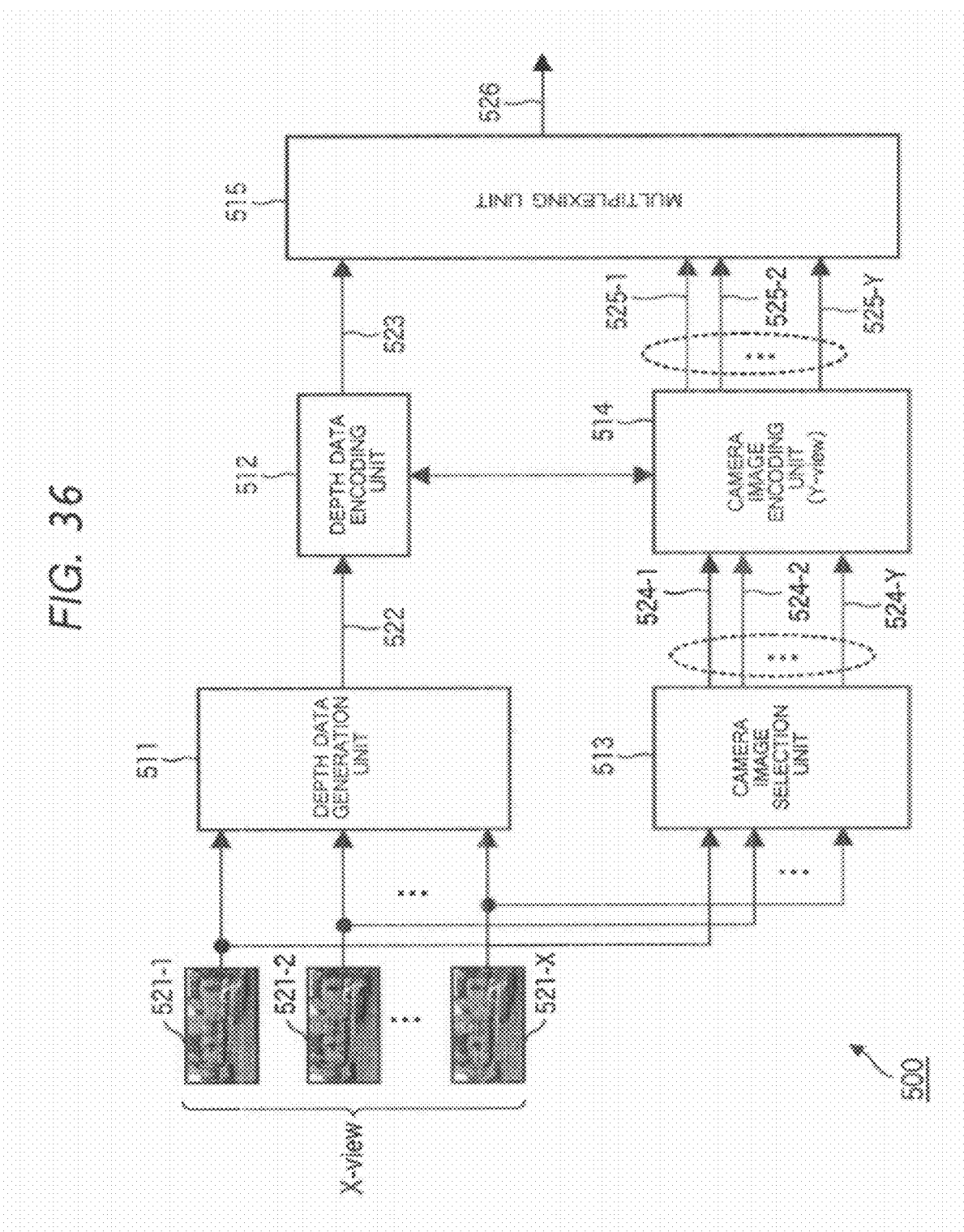
FIG. 36 is a block diagram illustrating a further example of the configuration of the image encoding apparatus to which the invention is applied.

FIG. 36 is a block diagram illustrating a further example of the configuration of the image encoding apparatus to which the invention is applied. As illustrated in FIG. 36, an encoder described above may be applied to an actual 3D image input/encoding system.

An image encoding apparatus 500 of FIG. 36 is an apparatus which receives and encodes a 3D image. A depth data generation unit 511 of the image encoding apparatus 500 receives X camera images and X output images (521-1, 521-2, ..., and 521-X), compares pictures of the same time point within these images in units of a pixel, and generates depth data 522 of the pictures of that time point. The generated depth data may be expressed as bitmap data of grey scale for example as described above referring to FIG. 2B.

As for the method by which the depth data generation unit 511 generates the depth data, many study results are reported from a plurality of institutions. For example, in Proceedings of SPIE: "Algorithm for dynamic 3D object generation from multi-viewpoint image" (5599, 2004, 153, 161) by K. Tomiyama, Y. Orihira, M. Katayama, and Y. Iwadate), a technique is reported in which a 3D shape of an image of a subject is automatically predicted and generated from images of a plurality of parallaxes.

The depth data generation unit 511 generates the depth data by using such a technique for example.

Next, depth data 522 is supplied to the depth data encoding unit 512. The depth data encoding unit 512 encodes the depth data 522 as described in other embodiments described above, and generates a code stream 523.

Moreover, X output images (521-1, 521-2, . . . , and 521-X) are supplied to a camera image selection unit 513. The camera image selection unit 513 selects Y images from among X output images. Y camera images (524-1, 524-2, . . . , 524-Y) are supplied to a camera image encoding unit 514. The camera image encoding unit 514 encodes the Y camera images as described in other embodiments described above, and generates code streams 525-1 to 525-Y.

At this point, the depth data encoding unit 512 and the camera image encoding unit 514 may exchanges information on their code generation amounts, and jointly perform control of rates of both the image data and the depth data.

The code stream 523 is supplied to the multiplexing unit 515. Furthermore, the code streams 525-1 to 525-Y are supplied to the multiplexing unit 515.

In addition, the multiplexing unit 515 further acquires the bit shift change information from the depth data encoding unit 512. The multiplexing unit 515 multiplexes the code stream 523 and the code streams 525-1 to 525-Y, and generates multiplex data 526. Multiplex data 526 is output outside of image encoding apparatus 500.

Moreover, the above description relates to a technique which selects Y images from among X images. However, it is an effective way to select only key images from among the X images because an amount of information is large, for example, when the value of X is large. As the method of selecting the images, it is an effective way to select every other images or to preferentially select images in which an image of a subject (for example, a person, a car, or the like) is included.

By thinning out and decreasing the number of target images in this way, it is possible to not only reduce the processing load of the encoder but also to reduce the processing load of the decoder to be described later, and as a result it is possible to reduce the data amount of the entire code stream. For example, there is an effect of achieving a quick transmission when the data is transmitted over a network.

According to the study results from a plurality of organizations, in estimating and generating the depth data of the image with high precision, generally, as the number of images with different parallaxes is increased, the precision becomes higher. Therefore, the larger amount the data of X of FIG. 36 is, the better. However, as described above, encoding and transmitting all the X images are not efficient. It is effective to thin the data. Supplementing the thinned out portion in the image may be performed by a decoder described later.

Moreover, in addition to the configuration of FIG. 36, with the following configuration: the bit depth of the camera image is detected; the detected bit depth is compared with the bit depth of the depth data; the bit shift is performed so that the bit depth of the depth data to match the bit depth of the camera image; image data of total (Y+1) pieces in which Y pieces of image data and the depth data which has been bit-shifted are combined and then encoded; a bit shift value is sent from the multiplexing unit, the depth data and the camera image can be encoded with the same encoding means.

[Configuration of Image Decoding Apparatus]

Figure 37:
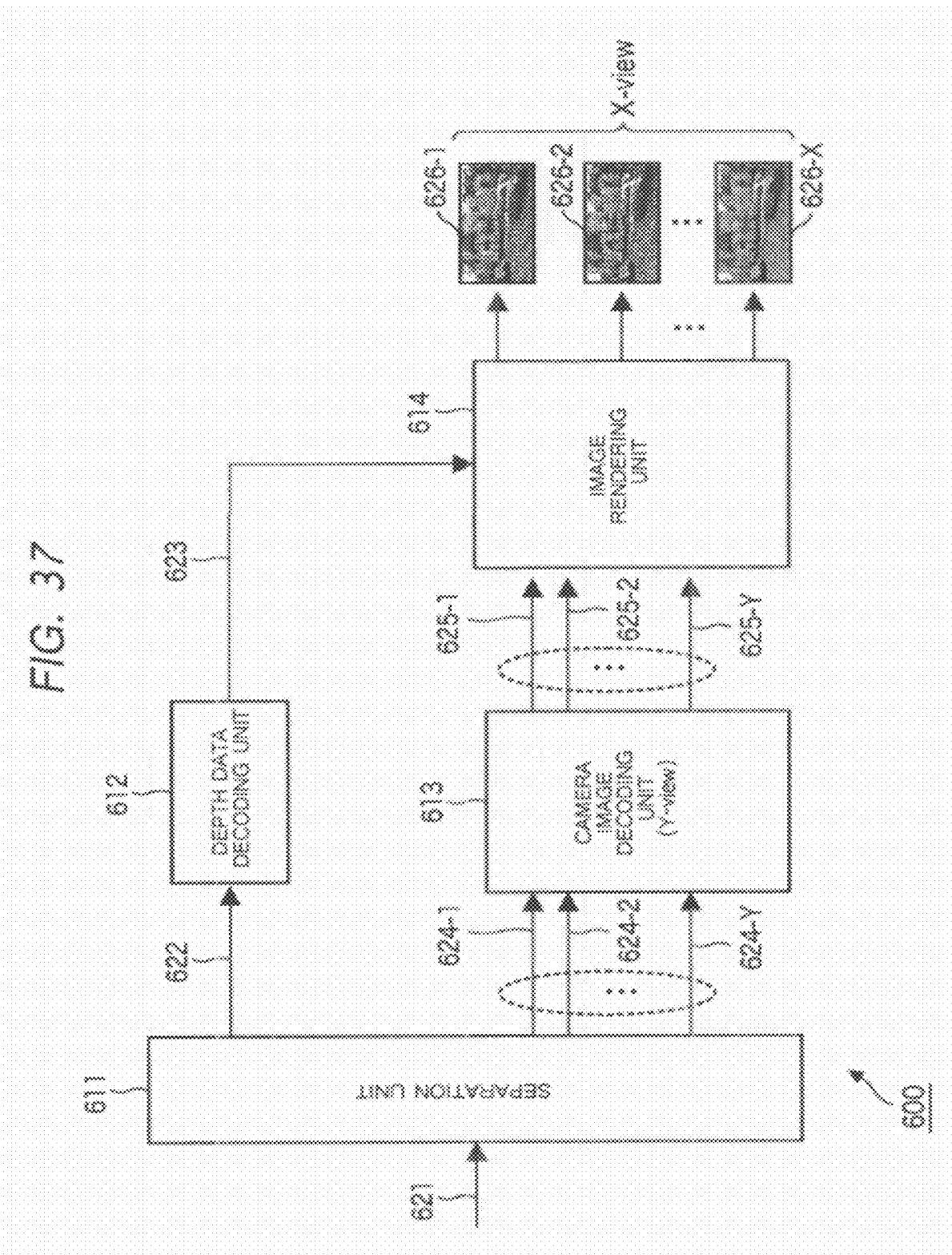
FIG. 37 is a block diagram illustrating a further example of the configuration of the image decoding apparatus to which the invention is applied.

FIG. 37 is a block diagram illustrating a further example of the configuration of the image decoding apparatus to which the invention is applied. An image decoding apparatus 600 illustrated in FIG. 37 is an apparatus corresponding to the image encoding apparatus 500 of FIG. 36, and is an apparatus that decodes coded data obtained by encoding three-dimensional image data. The image decoding apparatus 600 includes a separation unit 611, a depth data decoding unit 612, a camera image decoding unit 613, and an image rendering unit 614.

When the multiplexed code stream 621 is supplied, the separation unit 611 separates it into a code stream 622 of the depth data, and code streams of Y camera images (624-1, 624-2, . . . , 624-Y). The Y code streams (624-1, 624-2, . . . , 624-Y) of the camera images are supplied to the camera image decoding unit 613, and the code stream 622 of the depth data is supplied to the depth data decoding unit 612.

The camera image decoding unit 613 decodes the code streams (624-1, 624-2, . . . , 624-Y) of the Y camera images by using a decoding method corresponding to the encoding method of the camera image encoding unit 514, and generates Y camera images (625-1, 625-2, . . . , 625-Y). The Y camera images (625-1, 625-2, . . . , 625-Y) are supplied to the image rendering unit 614.

Moreover, the code stream 622 of the depth data is supplied to the depth data decoding unit 612. The depth data decoding unit 612 decodes the code stream 622 of the depth data by using a decoding method corresponding to the encoding method of the depth data encoding unit 512.

The depth data decoding unit 612 supplies depth data 623, which is obtained through the decoding, to the image rendering unit 614.

The image rendering unit 614 synthesizes X camera images by using the Y camera images (625-1, 625-2, . . . , 625-Y) and the depth data 623 (X>Y). The method of synthesizing the X camera images is arbitrary, but there is a known technique, for example, reported in SPIE-IS&T/Vol. 5291: "Depth-Image-Based Rendering (DIBR), Compression and Transmission for a New Approach on 3D-TV" by Christoph Fehn (HHI).

Although the conventional art separately encodes the component image data and the depth data, according to the above description, the bit depth of the depth data is adjusted so as to match the bit depth of the component image data, and then encoding thereof is performed by the same encoding means while simultaneously controlling the encoding rates thereof. Accordingly, encoding can be performed speedily and efficiently (with improved quality) compared with the conventional separate encoding technique.

Moreover, in the encoding according to JPEG2000 which uses bit-planes, after coefficients which have been subjected to wavelet transformation are developed in bit-planes, bit shifting is performed in units of a code block, and alignment of positions of MSBs is performed. Accordingly, the encoding rate of the bit-planes of the depth data and the encoding rate of the bit-planes of the component image are simultaneously performed.

<4. Fourth Embodiment>

[Personal Computer]

A series of processes mentioned above can be executed with hardware, or with software. In this case, for example, it may be configured by using a personal computer illustrated in FIG. 38.

Figure 38:
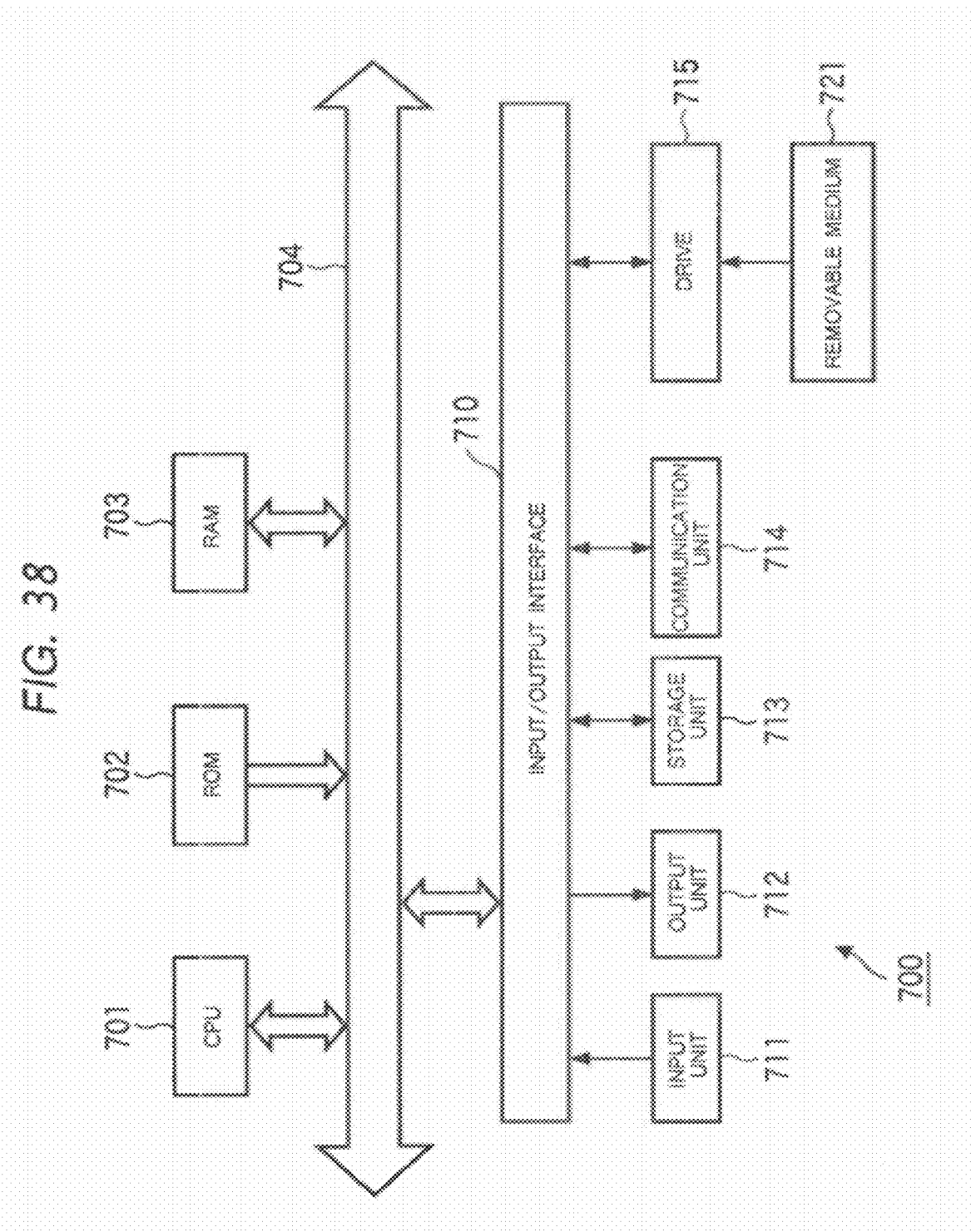
FIG. 38 is a block diagram illustrating an example of the main configuration of a personal computer to which the invention is applied.

In FIG. 38, a CPU 701 of a personal computer 700 executes various processes according to a program stored in a ROM (Read Only Memory) 702, or a program which is loaded from a storage unit 713 into a RAM (Random Access Memory) 703. Data and the like which are necessary for the CPU 701 to execute the various processes are also suitably stored in the RAM 703.

The CPU 701, the ROM 702, and the RAM 703 are connected to each other via a bus 704. An input/output interface 710 is also connected to the bus 704.

An input unit 711 including a keyboard, a mouse, and the like; a display including a CRT (Cathode Ray Tube), an LCD (Liquid Crystal Display), or the like; an output unit 712 including a speaker and the like; a storage unit 713 configured by using a hard disc or the like; and a communication unit 714 configured by using a modem or the like are connected to the input/output interface 710. The communication unit 714 performs a communication process over a network including the Internet.

A drive 715 is also connected to the input/output interface 710 as necessary, a removable medium 721, such as a magnetic disc, an optical disc, a magneto-optical disc, and a semiconductor memory is appropriately mounted therein, and a computer program read from them is installed in the storage unit 713 as necessary.

When a series of processes described above is executed with software, a program that forms the software is installed from a network or a recording medium.

The recording medium may be configured, for example, by using a removable medium 721 with a program recorded therein, which is distributed to deliver the program to users, independently of a main body of an apparatus as illustrated in FIG. 38, such as a magnetic disc (including a flexible disc), an optical disc (including a CD-ROM (Compact Disc-Read Only Memory), and a DVD (Digital Versatile Disc)), a magneto-optical disc (including an MD (Mini Disc)), or a semiconductor memory. Alternatively, the recording medium may be configured by using a ROM 702 with a program recorded therein or a hard disc included in the storage unit 713, which is distributed to the users as a built-in form as embedded in a main body of an apparatus beforehand.

The program executed by the computer may be a program which performs processes in a time series manner along the procedure described in the specification of the present application, or may be a program which performs processes in parallel or at necessary timing for example when there is a call.

Moreover, step described in a program which is recorded in a recording medium may include not only ones which are performed in time series manner along the described procedure, but also ones which are executed in parallel or individually without having to be executed in a time series manner.

Moreover, in the specification of the present application, the term "system" represents the entirety of an apparatus configured by including a plurality of devices (apparatuses).

Moreover, the configuration described in the above description as one apparatus (or one processing unit) may be divided so as to become a configuration in which a plurality of devices (or processing units) is included. Conversely, the configuration described to include a plurality of apparatuses (or processing units) may be integrated so as to become a configuration in which one apparatus (processing unit) is included. Moreover, a configuration other than ones described above may be added to each apparatus (or processing unit). In addition, if the configuration and operation as the entire system are substantially the same, a part of the configuration of a certain apparatus (or a certain processing unit) may be included in the configuration of another apparatus (or another processing unit). That is, embodiments of the invention are not limited to the embodiment described above, and various changes thereto within a scope without departing from the gist of the invention are possible.

The invention may be applied to, for example, a digital cinema editing apparatus, an archive system, an image transmission apparatus for a broadcasting station, an image database, a medical image recording system, a network server, an Internet-based image transmission apparatus, a wireless transmission apparatus, a secondary video distribution apparatus from a movie theater, a non-linear editing apparatus, a game machine, a television system, an HDD recorder, a PC-based authoring tool, a software module, and the like.

Reference Signs List
100 Image encoding apparatus
111 Bit depth detection unit
112 Bit shift changing unit
113 Encoding unit
114 Rate control unit
115 Multiplexing unit
150 Image decoding apparatus
151 Separation unit
152 Decoding unit
153 Bit shift changing unit
400 Image processing apparatus
413 Encoding unit
430 Bit shift changing unit
450 Image decoding apparatus
452 Decoding unit
460 Bit shift changing unit

The invention claimed is:

1. An image processing apparatus comprising:
circuitry configured to
encode image data and depth data according to a predetermined encoding system, the depth data indicating positions in a depth direction over an entire area within an image of the image data and allowing an image having parallaxes and being stereoscopically visible to be generated from the image of the image data;
perform both a rate control of a code generation amount in the encoding the image data and a rate control of a code generation amount in the encoding the depth data, by using both an encoding result of the image data and an encoding result of the depth data; and
shift-change the depth data by an amount corresponding to a difference between a bit depth of the image data and a bit depth of the depth data.

2. The image processing apparatus according to claim 1, wherein the circuitry is further configured to detect the bit depth of the image data.

3. The image processing apparatus according to claim 2, wherein
the circuitry shifts up the depth data by an amount of the difference and performs zero-filling which fills coefficients of value "0" in lower position bits than the depth data which is shifted up.

4. The image processing apparatus according to claim 2, wherein
the circuitry deletes data corresponding to an amount of the difference, from a lowest bit of the depth data, and shifts down upper bits of the depth data which are not deleted, by the amount of the difference.

5. The image processing apparatus according to claim 2, wherein the circuitry is further configured to multiplex coded data of the image data, and shift change information that indicates a shift amount of the shift changing.

6. The image processing apparatus according to claim 1, wherein, in the encoding, the circuitry is configured to perform orthogonal transformation on the image data and the depth data for each macro block with a predetermined size; and perform entropy encoding on coefficient data obtained through the orthogonal transformation on the image data and the depth data.

7. The image processing apparatus according to claim 1, wherein, in the encoding, the circuitry is configured to perform wavelet transformation on the image data and the depth data;

divide coefficient data, obtained through the wavelet transformation on the image data and the depth data, in units of a code block with a predetermined size;

develop the coefficient data of each code block, obtained through the division, in bit-planes; and perform entropy encoding on the bit-planes of the coefficient data of the image data and the depth data, the developed bit-planes being rearranged in the order of importance.

8. The image processing apparatus according to claim 7, wherein, in the encoding, the circuitry is configured to shift-change the depth data by an amount corresponding to a difference between a bit depth of coefficient data of the image data and a bit depth of coefficient data of the depth data obtained through the wavelet transformation.

9. The image processing apparatus according to claim 8, wherein the circuitry is further configured to multiplex coded data of the image data, and shift change information that indicates a shift amount of the shift changing.

10. The image processing apparatus according to claim 1, wherein the image data is component image data including brightness Y, color difference Cb, and color difference Cr, and the depth data is bitmap data of grey scale.

11. An image processing method for an image processing apparatus, the method comprising:

encoding image data and depth data according to a predetermined encoding system, the depth data indicating positions in a depth direction over an entire area within an image of the image data and allowing an image having parallaxes and being stereoscopically visible to be generated from the image of the image data;

performing a rate control of a code generation amount in encoding the image data and a rate control of a code generation amount in encoding the depth data, by using both an encoding result of the image data and an encoding result of the depth data; and shift-changing, by the image processing apparatus, the depth data by an amount corresponding to a difference between a bit depth of the image data and a bit depth of the depth data.

12. A non-transitory computer-readable storage medium storing computer-readable instructions thereon, which, when executed by a computer, cause the computer to perform a method, the method comprising:

encoding image data and depth data according to a predetermined encoding system, the depth data indicating positions in a depth direction over an entire area within an image of the image data and allowing an image having parallaxes and being stereoscopically visible to be generated from the image of the image data;

performing both a rate control of a code generation amount in encoding the image data and a rate control of a code generation amount in encoding the depth data by using both an encoding result of the image data and an encoding result of the depth data; and shift-changing, by the image processing apparatus, the depth data by an amount corresponding to a difference between a bit depth of the image data and a bit depth of the depth data.

13. An image processing apparatus comprising:
circuitry configured to separate shift change information from multiplex data obtained by multiplexing coded data obtained by encoding image data;

coded data which is obtained by shift changing depth data by a predetermined shift amount and encoding the shift-changed depth data, the depth data indicating positions in a depth direction over the entire area within an image of the image data and allowing an image having parallaxes and being stereoscopically visible to be generated from the image of the image data; and shift change information which indicates the shift amount;

decode the coded data according to a predetermined decoding system; and shift-change depth data which has been shift-changed after being decoded, in a direction opposite to a direction of the shift-changing, by the shift amount indicated by the separated shift change information.

14. The image processing apparatus according to claim 13, wherein the circuitry deletes data corresponding to the shift amount from a lowest bit of the depth data, and shift downs upper bits of the depth data which are not deleted by the shift amount.

15. The image processing apparatus according to claim 13, wherein the circuitry shifts up the depth data by the shift amount, and performs zero-filling which inserts coefficients of value "0" as lower position bits than the depth data which has been shifted up.

16. The image processing apparatus according to claim 13, wherein, in the decoding, the circuitry is configured to perform on entropy decoding on coded data obtained by encoding image data, and coded data which is obtained by shift changing depth data and encoding the shift-changed depth data; and perform inverse orthogonal transformation on coefficient data obtained by the orthogonal transformation of the image data and on coefficient data obtained by orthogonal transformation of the depth data, the coefficient data being obtained by entropy decoding.

17. The image processing apparatus according to claim 13, wherein, in the decoding, the circuitry is configured to perform entropy decoding on coded data obtained by encoding image data, and coded data obtained by shift-changing depth data and encoding the shift-changed depth data;

synthesize the bit-planes of coefficient data, the coefficient data being obtained through the entropy decoding and being developed in the bit-planes;

synthesize the coefficient data for each code block with a predetermined size, which is obtained by the synthesizing the bit-planes; and performing wavelet inverse transformation on the coefficient data for each sub-band obtained through the synthesizing the coefficient data and obtaining the image data and the depth data.

18. An image processing method for an image processing apparatus, the method comprising:

separating shift change information from multiplex data obtained by multiplexing
coded data obtained by encoding image data;
coded data which is obtained by shift-changing the depth data by a predetermined shift amount and encoding the shift-changed depth data, the depth data indicating positions in a depth direction over an entire area within an image of the image data and allowing an image having parallaxes and being stereoscopically visible to be generated from the image of the image data; and
the shift change information that indicates the shift amount;
decoding the coded data according to a predetermined decoding system; and
by the image processing apparatus, shift-changing depth data which has been shift-changed after being decoded, in a direction opposite to a direction of the shift-changing, by the shift amount indicated by the shift change information separated from the coded data.

19. A non-transitory computer-readable storage medium storing computer-readable instructions thereon, which, when executed by a computer, cause the computer to perform a method, the method comprising:
separating shift change information from multiplex data obtained by multiplexing
coded data obtained by encoding image data;
coded data which is obtained by shift-changing depth data by a predetermined shift amount and encoding the shift-changed depth data, the depth data indicating positions in a depth direction over an entire area within an image of the image data and allowing an image having parallaxes and being stereoscopically visible to be generated from the image of the image data; and
the shift change information that indicates the shift amount;
decoding the coded data according to a predetermined decoding system; and
shift-changing shift-changed depth data obtained through the decoding in a direction opposite to a direction of the shift-changing, by the shift amount indicated by the separated shift change information.

* * * * *